US011097808B2

(12) United States Patent
Sugimoto

(10) Patent No.: US 11,097,808 B2
(45) Date of Patent: Aug. 24, 2021

(54) BICYCLE SPROCKET

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 215 days.

(21) Appl. No.: 16/395,245

(22) Filed: Apr. 26, 2019

(65) Prior Publication Data

US 2019/0248446 A1 Aug. 15, 2019

Related U.S. Application Data

(62) Division of application No. 15/361,062, filed on Nov. 24, 2016, now Pat. No. 10,407,127.

(51) Int. Cl.
*B62M 9/12* (2006.01)
*F16H 55/30* (2006.01)

(52) U.S. Cl.
CPC ............... *B62M 9/12* (2013.01); *F16H 55/30* (2013.01)

(58) Field of Classification Search
CPC .......... B62M 9/10; B62M 9/105; B62M 9/12; F16H 55/30
See application file for complete search history.

(56) References Cited

U.S. PATENT DOCUMENTS 5,162,022 A * 11/1992 Kobayashi ............... B62M 9/10 474/155
2009/0215565 A1* 8/2009 Braedt ..................... B62M 9/12 474/160
2010/0081531 A1 4/2010 Esquibel
2014/0338494 A1 11/2014 Sugimoto et al.
2015/0210352 A1 7/2015 Sugimoto
2016/0280325 A1 9/2016 Watarai et al.
2016/0347409 A1* 12/2016 Watarai .................... B62M 9/02
2017/0016524 A1* 1/2017 Cheng ...................... B62M 9/00
2017/0146109 A1 5/2017 Reiter et al.
(Continued)

FOREIGN PATENT DOCUMENTS

CN 101712365 5/2010
CN 104163227 11/2014
(Continued)

OTHER PUBLICATIONS

Office Action with Form PTO-892 Notice of References Cited issued by the U.S. Patent and Trademark Office for the U.S. Appl. No. 15/361,062, dated Jan. 4, 2019.

*Primary Examiner* — Michael R Mansen
*Assistant Examiner* — Robert T Reese
(74) *Attorney, Agent, or Firm* — Mori & Ward, LLP

(57) ABSTRACT

A bicycle sprocket comprises a sprocket body, a plurality of sprocket teeth, at least one shifting facilitation area, at least one driving facilitation area, and at least one bump portion. The at least one shifting facilitation area is to facilitate at least one of a first shifting operation in which a bicycle chain is shifted from the bicycle sprocket toward a smaller sprocket adjacent to the bicycle sprocket in an axial direction parallel to a rotational center axis of the bicycle sprocket without another sprocket between the bicycle sprocket and the smaller sprocket, and a second shifting operation in which the bicycle chain is shifted from the smaller sprocket toward the bicycle sprocket. The at least one bump portion is provided in the at least one driving facilitation area.

4 Claims, 68 Drawing Sheets

(56) References Cited

U.S. PATENT DOCUMENTS

| | | | |
|---|---|---|---|
| 2017/0355422 | A1 | 12/2017 | Sugimoto |
| 2018/0079467 | A1 | 3/2018 | Hirose et al. |
| 2018/0178882 | A1 | 6/2018 | Vonend |

FOREIGN PATENT DOCUMENTS

| | | |
|---|---|---|
| DE | 10 2015 000 911 | 7/2015 |
| DE | 10 2017 111 814 | 12/2017 |

* cited by examiner

BICYCLE SPROCKET

CROSS-REFERENCE TO RELATED APPLICATIONS

The present application is a divisional application of the U.S. patent application Ser. No. 15/361,062 filed Nov. 24, 2016. The contents of this application are incorporated herein by reference in their entirety.

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body, a plurality of sprocket teeth, at least one shifting facilitation area, at least one driving facilitation area, and at least one bump portion. The plurality of sprocket teeth is provided on an outer periphery of the sprocket body. The at least one shifting facilitation area is to facilitate at least one of a first shifting operation in which a bicycle chain is shifted from the bicycle sprocket toward a smaller sprocket adjacent to the bicycle sprocket in an axial direction parallel to a rotational center axis of the bicycle sprocket without another sprocket between the bicycle sprocket and the smaller sprocket, and a second shifting operation in which the bicycle chain is shifted from the smaller sprocket toward the bicycle sprocket. The at least one bump portion has a contact surface configured to move the bicycle chain toward the smaller sprocket in the second shifting operation. The at least one bump portion is provided in the at least one driving facilitation area.

With the bicycle sprocket according to the first aspect, the at least one bump portion reduces interference between the bicycle chain and one of the plurality of sprocket teeth when the bicycle chain is shifted from the smaller sprocket toward the bicycle sprocket. Accordingly, it is possible to smoothly shift the bicycle chain from the smaller sprocket toward the bicycle sprocket.

In accordance with a second aspect of the present invention, the bicycle sprocket according to the first aspect is configured so that the plurality of sprocket teeth includes at least one first tooth having a first chain engaging width defined in the axial direction, and at least one second tooth having a second chain engaging width defined in the axial direction, the second chain engaging width being smaller than the first chain engaging width. The at least one bump portion is provided on a downstream side of one of the at least one first tooth in a driving rotational direction in which the bicycle sprocket is rotated during pedaling.

With the bicycle sprocket according to the second aspect, the at least one first tooth improves chain-holding performance of the bicycle sprocket while the at least one bump portion reduces interference between the bicycle chain and one of the plurality of sprocket teeth when the bicycle chain is shifted from the smaller sprocket toward the bicycle sprocket.

In accordance with a third aspect of the present invention, the bicycle sprocket according to the second aspect is configured so that the first chain engaging width is larger than an inner link space defined between an opposed pair of inner link plates of the bicycle chain and is smaller than an outer link space defined between an opposed pair of outer link plates of the bicycle chain. The second chain engaging width is smaller than the inner link space.

With the bicycle sprocket according to the third aspect, the at least one first tooth further improves chain-holding performance of the bicycle sprocket.

In accordance with a fourth aspect of the present invention, the bicycle sprocket according to any one of the first to third aspect is configured so that the plurality of sprocket teeth include a reference tooth having a reference tooth center plane defined to bisect a maximum axial width of the reference tooth in the axial direction, and an offset tooth having an offset tooth center plane defined to bisect a maximum axial width of the offset tooth in the axial direction. The offset tooth center plane is offset from the reference tooth center plane of the reference tooth toward the smaller sprocket in the axial direction. The at least one bump portion is provided on a downstream side of the offset tooth in a driving rotational direction in which the bicycle sprocket is rotated during pedaling.

With the bicycle sprocket according to the fourth aspect, the at least one bump portion reduces interference between the bicycle chain and the offset tooth when the bicycle chain is shifted from the smaller sprocket toward the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
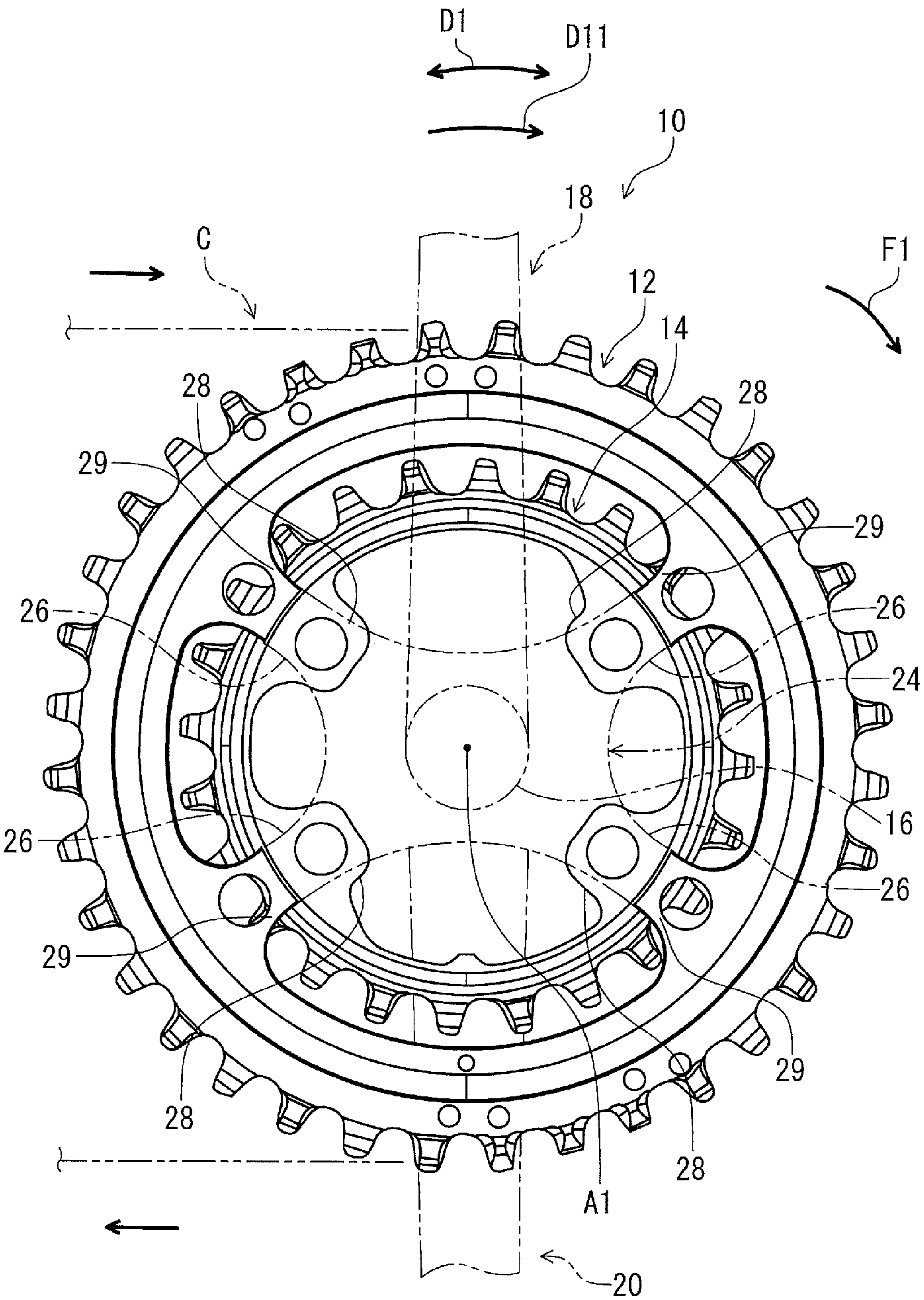
FIG. 1 is a side elevational view of a bicycle crank assembly including a bicycle sprocket in accordance with a first embodiment.

The embodiment(s) will now be described with reference to the accompanying drawings, wherein like reference numerals designate corresponding or identical elements throughout the various drawings.

First Embodiment

Figure 2:
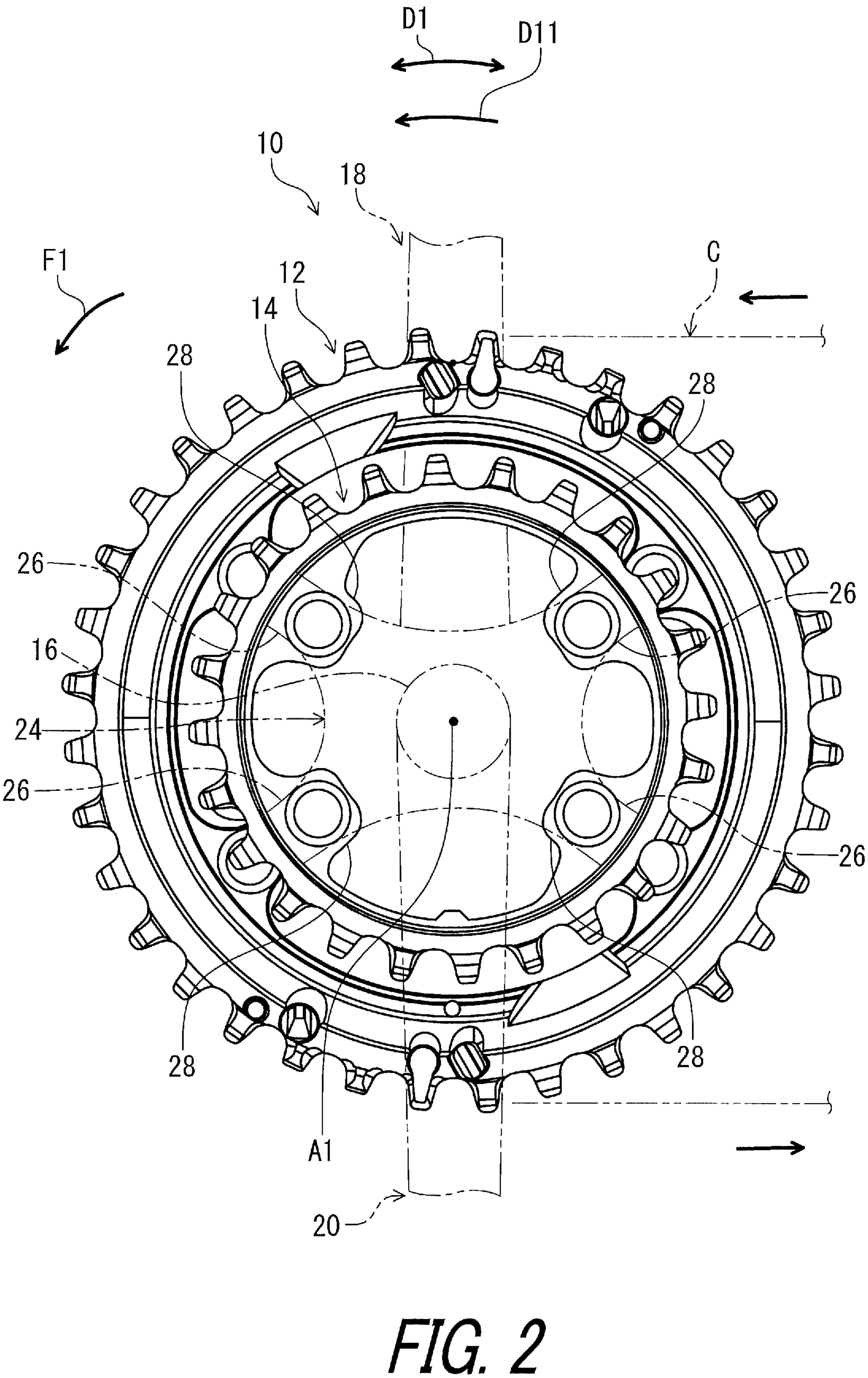
FIG. 2 is another side elevational view of the bicycle crank assembly illustrated in FIG. 1.

Referring initially to FIGS. 1 and 2, a bicycle crank assembly 10 including a bicycle sprocket 12 in accordance with a first embodiment is illustrated. The bicycle crank assembly 10 includes a smaller sprocket 14, a crank axle 16, a crank arm 18, and an additional crank arm 20. The crank arm 18 is a right crank arm. The additional crank arm 20 is a left crank arm. The crank arm 18 and the additional crank arm 20 are secured to the crank axle 16.

In the present application, the following directional terms “front”, “rear”, “forward”, “rearward”, “left”, “right”, “transverse”, “upward” and “downward” as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12, should be interpreted relative to the bicycle equipped with the bicycle sprocket 12 as used in an upright riding position on a horizontal surface.

As seen in FIGS. 1 and 2, the bicycle sprocket 12 has a rotational center axis A1 and is rotatable relative to a bicycle frame (not shown) about the rotational center axis A1. Specifically, the bicycle crank assembly 10 is rotatable relative to the bicycle frame about the rotational center axis A1. The bicycle sprocket is rotated about the rotational center axis A1 in a driving rotational direction D11 during pedaling. The driving rotational direction D11 is defined along a circumferential direction D1 defined about the rotational center axis A1.

The bicycle sprocket 12 and the smaller sprocket 14 are engaged with a bicycle chain C to transmit a rotational driving force F1 to the bicycle chain C. The bicycle chain C is shifted between the smaller sprocket 14 and the bicycle sprocket 12 by a front derailleur (not shown). In this embodiment, the bicycle sprocket 12 is a front sprocket. However, at least one of the structure of the bicycle sprocket 12 can be at least partly applied to a rear sprocket.

The bicycle sprocket 12 is coupled to the crank arm 18 to integrally rotate with the crank arm 18 about the rotational center axis A1. The smaller sprocket 14 is coupled to the crank arm 18 to integrally rotate with the crank arm 18 about the rotational center axis A1. In this embodiment, the bicycle crank assembly 10 includes a sprocket mounting member 24. The sprocket mounting member 24 is mounted on the crank arm 18 to be rotatable integrally with the crank arm 18 about the rotational center axis A1. The bicycle sprocket 12 and the smaller sprocket 14 are coupled to the sprocket mounting member 24. The sprocket mounting member 24 includes crank connecting arms 26. The smaller sprocket 14 comprises first crank attachment portions 28. The bicycle sprocket 12 comprises second crank attachment portions 29. The crank connecting arms 26 are respectively fastened to the first crank attachment portions 28 with fasteners such as bolts (not shown). The second crank attachment portions 29 are fastened to the sprocket mounting member 24 with fasteners such as bolts (not shown).

In this embodiment, the sprocket mounting member 24 is integrally provided with the crank arm 18 as a one-piece unitary member. However, the sprocket mounting member 24 can be a separate member from the crank arm 18. Furthermore, the sprocket mounting member 24 can be omitted from the bicycle crank assembly 10. In such an embodiment, the smaller sprocket 14 and the bicycle sprocket 12 can be directly coupled to the crank arm 18 and the crank axle 16. The sprocket mounting member 24 can be integrally provided with one of the bicycle sprocket 12, the smaller sprocket 14, and the crank axle 16.

Figure 3:
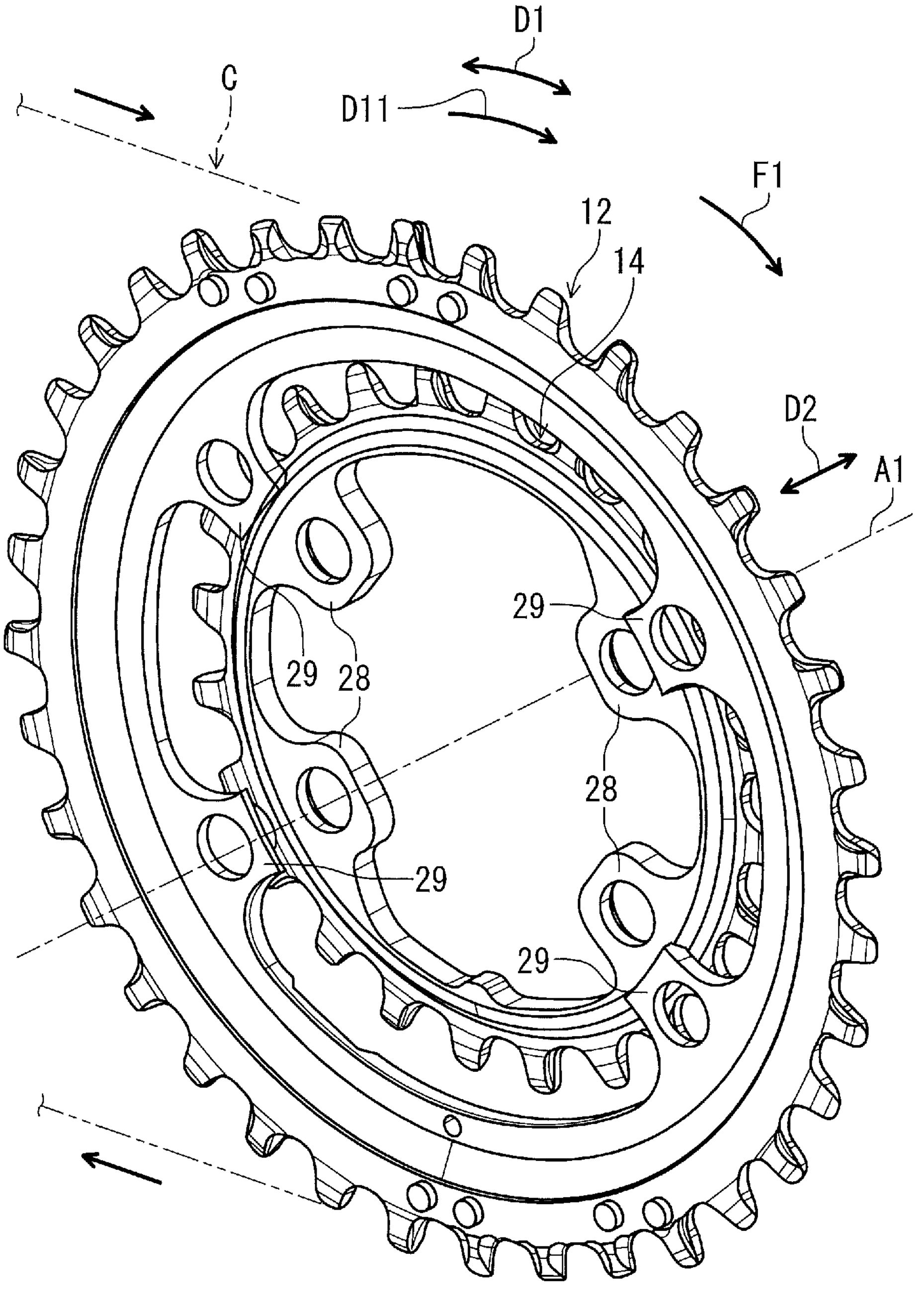
FIG. 3 is a perspective view of the bicycle sprocket and a smaller sprocket of the bicycle crank assembly illustrated in FIG. 1.
Figure 4:
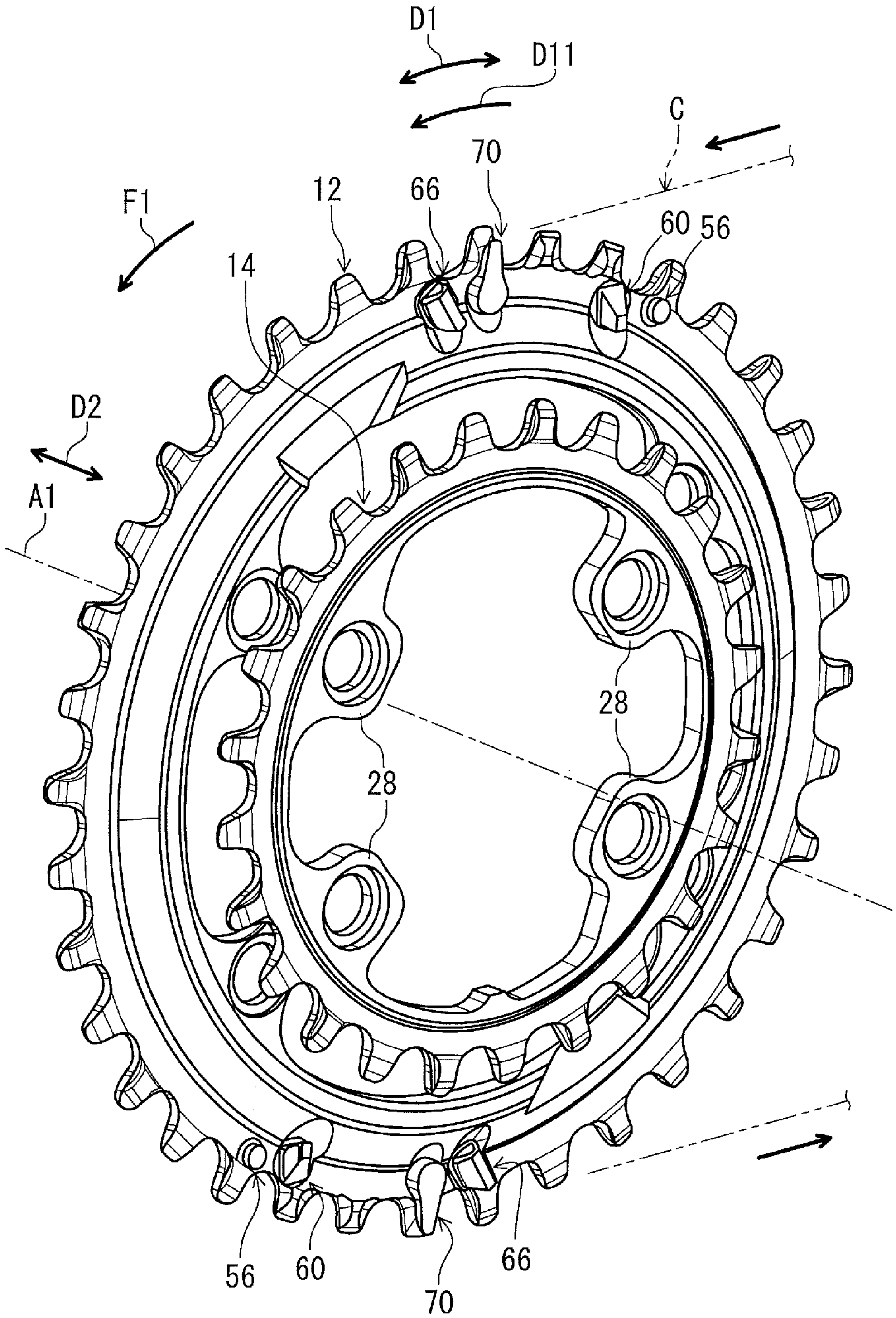
FIG. 4 is another perspective view of the bicycle sprocket and the smaller sprocket of the bicycle crank assembly illustrated in FIG. 1.

As seen in FIGS. 3 and 4, the bicycle crank assembly 10 includes the bicycle sprocket 12 and the smaller sprocket 14. However, the bicycle crank assembly 10 can include at least three sprockets. The smaller sprocket 14 is adjacent to the bicycle sprocket 12 in an axial direction D2 parallel to the rotational center axis A1 without another sprocket between the smaller sprocket 14 and the bicycle sprocket 12.

Figure 5:
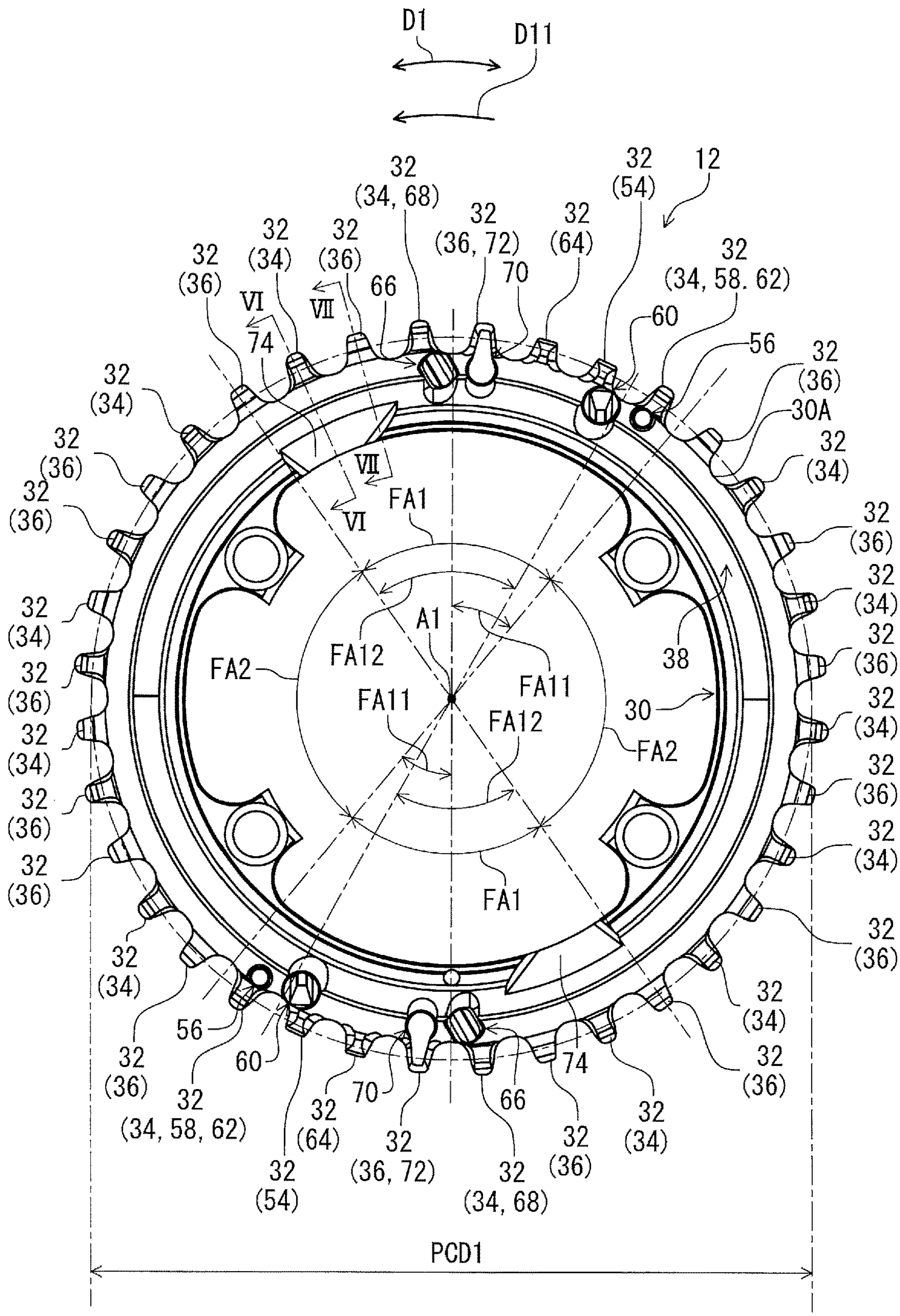
FIG. 5 is a side elevational view of the bicycle sprocket of the bicycle crank assembly illustrated in FIG. 1.

As seen in FIG. 5, the bicycle sprocket 12 comprises a sprocket body 30 and a plurality of sprocket teeth 32. The plurality of sprocket teeth 32 is provided on an outer periphery 30A of the sprocket body 30. The plurality of sprocket teeth 32 includes at least one first tooth 34 and at least one second tooth 36. The sprocket body 30 can also be referred to as a first sprocket body 30. The plurality of sprocket teeth 32 can also be referred to as a plurality of first sprocket teeth 32. The at least one first tooth 34 is provided on the outer periphery 30A to be engaged with the bicycle chain C. The at least one second tooth 36 is provided on the outer periphery 30A to be engaged with the bicycle chain C. In this embodiment, the at least one first tooth 34 includes a plurality of first teeth 34 provided on the outer periphery 30A to be engaged with the bicycle chain C. The at least one second tooth 36 includes a plurality of second teeth 36 provided on the outer periphery 30A to be engaged with the bicycle chain C. The plurality of first teeth 34 and the plurality of second teeth 36 are alternatingly arranged in the circumferential direction D1.

Figure 6:
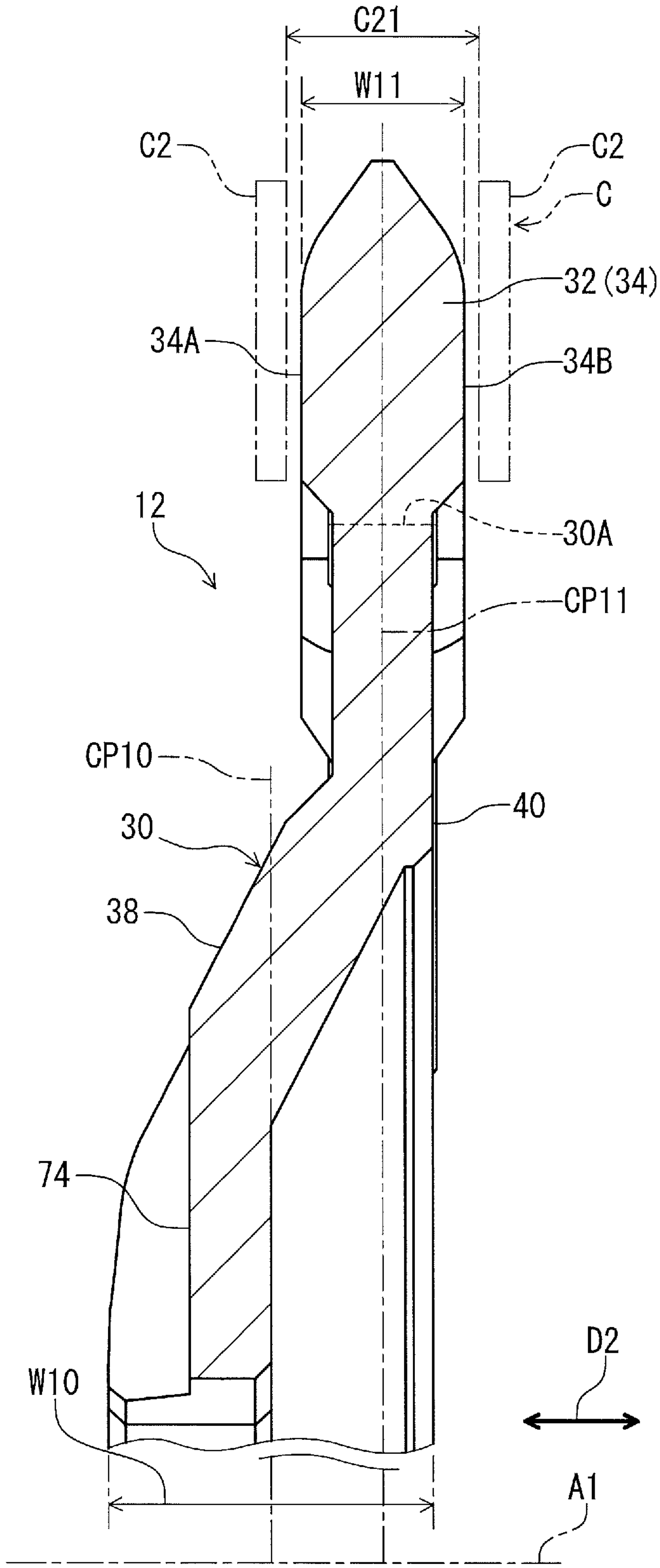
FIG. 6 is a cross-sectional view of the bicycle sprocket taken along line VI-VI of FIG. 5.

In this embodiment, as seen in FIG. 6, the bicycle sprocket 12 comprises a first axial surface 38 and a first reverse axial surface 40. The first axial surface 38 faces toward the smaller sprocket 14 in the axial direction D2 parallel to the rotational center axis A1. The first reverse axial surface 40 faces in the axial direction D2 and is provided on a reverse side of the first axial surface 38 in the axial direction D2. The sprocket body 30 has a first body maximum width W10 defined between the first axial surface 38 and the first reverse axial surface 40 in the axial direction D2. The sprocket body 30 has a first reference center plane CP10 defined to bisect the first body maximum width W10 in the axial direction D2. The first reference center plane CP10 is perpendicular to the rotational center axis A1.

As seen in FIG. 6, the at least one first tooth 34 has a first chain engaging width W11 defined in the axial direction D2. In this embodiment, the first tooth 34 includes a first chain-engagement surface 34A and a first additional chain-engagement surface 34B. The first chain-engagement surface 34A faces in the axial direction D2 and is contactable with the bicycle chain C (e.g., the outer link plate C2). The first additional chain-engagement surface 34B faces in the axial direction D2 and is provided on a reverse side of the first chain-engagement surface 34A in the axial direction D2. The first additional chain-engagement surface 34B is contactable with the bicycle chain C (e.g., the outer link plate C2). The first chain engaging width W11 is defined between the first chain-engagement surface 34A and the first additional chain-engagement surface 34B in the axial direction D2.

The first tooth 34 has a first center plane CP11 defined to bisect the first chain engaging width W11 in the axial direction D2. The first center plane CP11 is perpendicular to the rotational center axis A1. The first center plane CP11 is offset from the first reference center plane CP10 in the axial direction D2. However, the first center plane CP11 can coincide with the first reference center plane CP10 in the axial direction D2. The first tooth 34 has a symmetrical shape with respect to the first center plane CP11 in the axial direction D2. However, the first tooth 34 can have an asymmetrical shape with respect to the first center plane CP11 in the axial direction D2.

Figure 7:
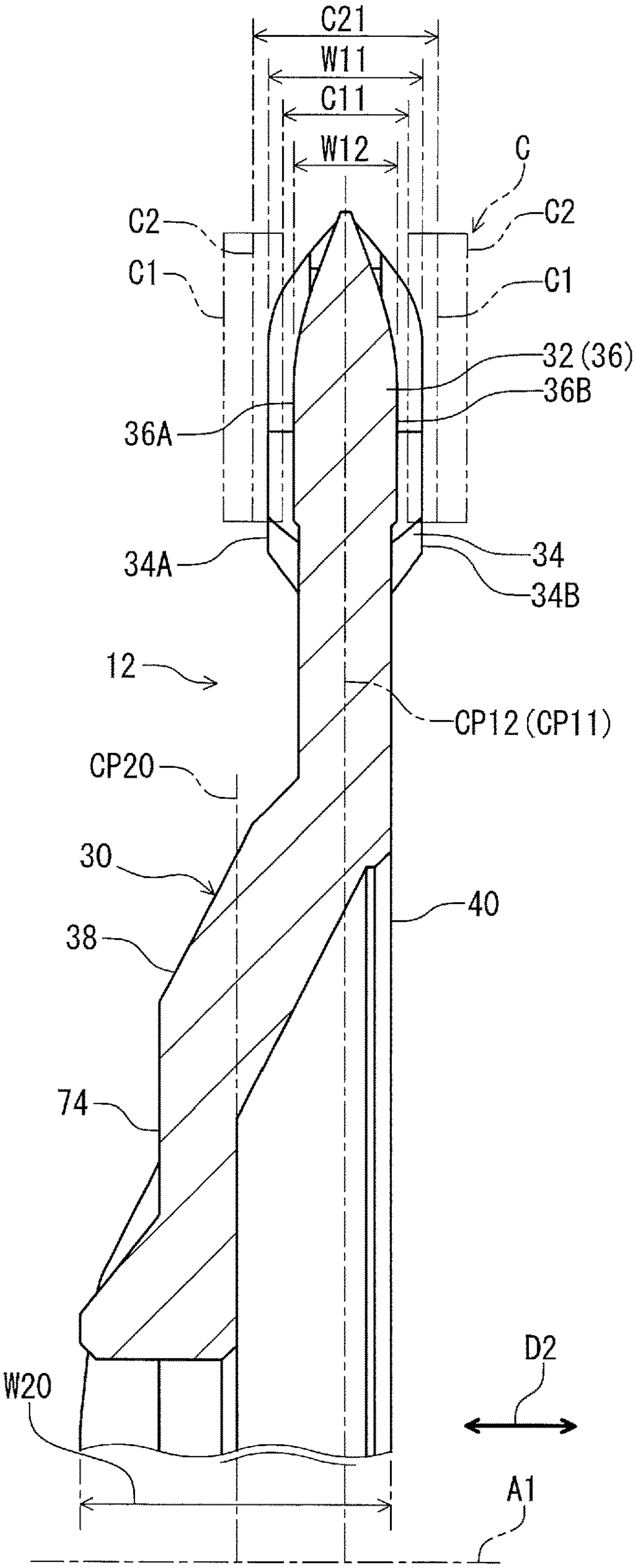
FIG. 7 is a cross-sectional view of the bicycle sprocket taken along line VII-VII of FIG. 5.

As seen in FIG. 7, the at least one second tooth 36 has a second chain engaging width W12 defined in the axial direction D2. In this embodiment, the second tooth 36 includes a second chain-engagement surface 36A and a second additional chain-engagement surface 36B. The second chain-engagement surface 36A faces in the axial direction D2 and is contactable with the bicycle chain C (e.g., the inner link plate C1). The second additional chain-engagement surface 36B faces in the axial direction D2 and is provided on a reverse side of the second chain-engagement surface 36A in the axial direction D2. The second additional chain-engagement surface 36B is contactable with the bicycle chain C (e.g., the inner link plate C1). The second chain engaging width W12 is defined between the second chain-engagement surface 36A and the second additional chain-engagement surface 36B in the axial direction D2.

The second tooth 36 has a second center plane CP12 defined to bisect the second chain engaging width W12 in the axial direction D2. The second center plane CP12 is perpendicular to the rotational center axis A1. The second center plane CP12 is offset from the first reference center plane CP10 in the axial direction D2. However, the second center plane CP12 can coincide with the first reference center plane CP10 in the axial direction D2. The second center plane CP12 coincides with the first center plane CP11. However, the second center plane CP12 can be offset from the first center plane CP11 in the axial direction D2. The second tooth 36 has a symmetrical shape with respect to the second center plane CP12 in the axial direction D2. However, the second tooth 36 can have an asymmetrical shape with respect to the second center plane CP12 in the axial direction D2.

In this embodiment, the second chain engaging width W12 is smaller than the first chain engaging width W11. The first chain engaging width W11 is larger than an inner link space C11 defined between an opposed pair of inner link plates C1 of the bicycle chain C and is smaller than an outer link space C21 defined between an opposed pair of outer link plates C2 of the bicycle chain C. The second chain engaging width W12 is smaller than the inner link space C11. However, the second chain engaging width W12 can be equal to or larger than the first chain engaging width W11. The first chain engaging width W11 can be smaller than the inner link space C11.

Figure 8:
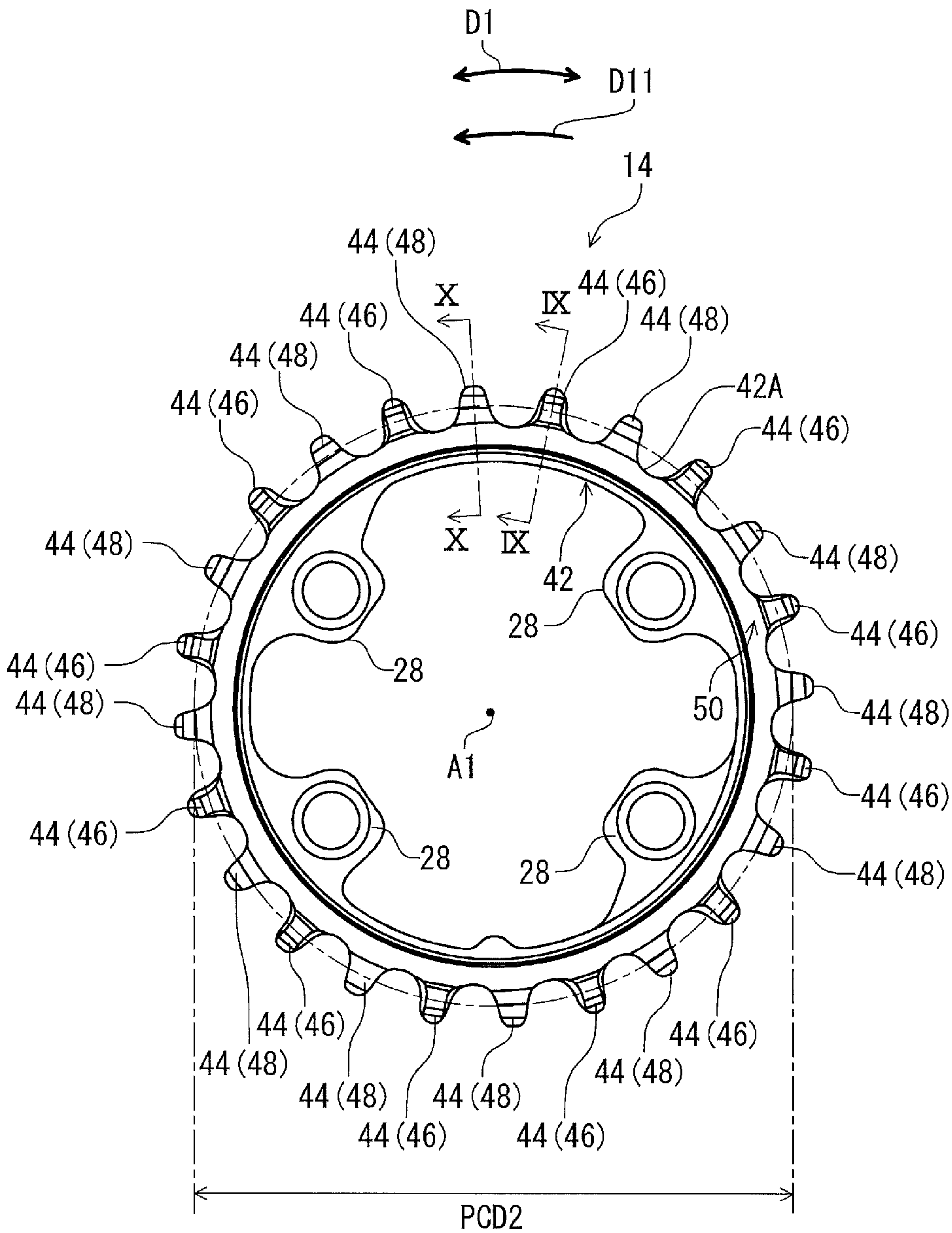
FIG. 8 is a side elevational view of the smaller sprocket of the bicycle crank assembly illustrated in FIG. 1.

As seen in FIG. 8, the smaller sprocket 14 comprises a second sprocket body 42 and a plurality of second sprocket teeth 44. The plurality of second sprocket teeth 44 is provided on an outer periphery 42A of the second sprocket body 42. The plurality of second sprocket teeth 44 includes at least one third tooth 46 and at least one fourth tooth 48. The at least one third tooth 46 is provided on the outer periphery 42A to be engaged with the bicycle chain C. The at least one fourth tooth 48 is provided on the outer periphery 42A to be engaged with the bicycle chain C. In this embodiment, the at least one third tooth 46 includes a plurality of third teeth 46 provided on the outer periphery 42A to be engaged with the bicycle chain C. The at least one fourth tooth 48 includes a plurality of fourth teeth 48 provided on the outer periphery 42A to be engaged with the bicycle chain C. The plurality of third teeth 46 and the plurality of fourth teeth 48 are alternatingly arranged in the circumferential direction D1.

Figure 9:
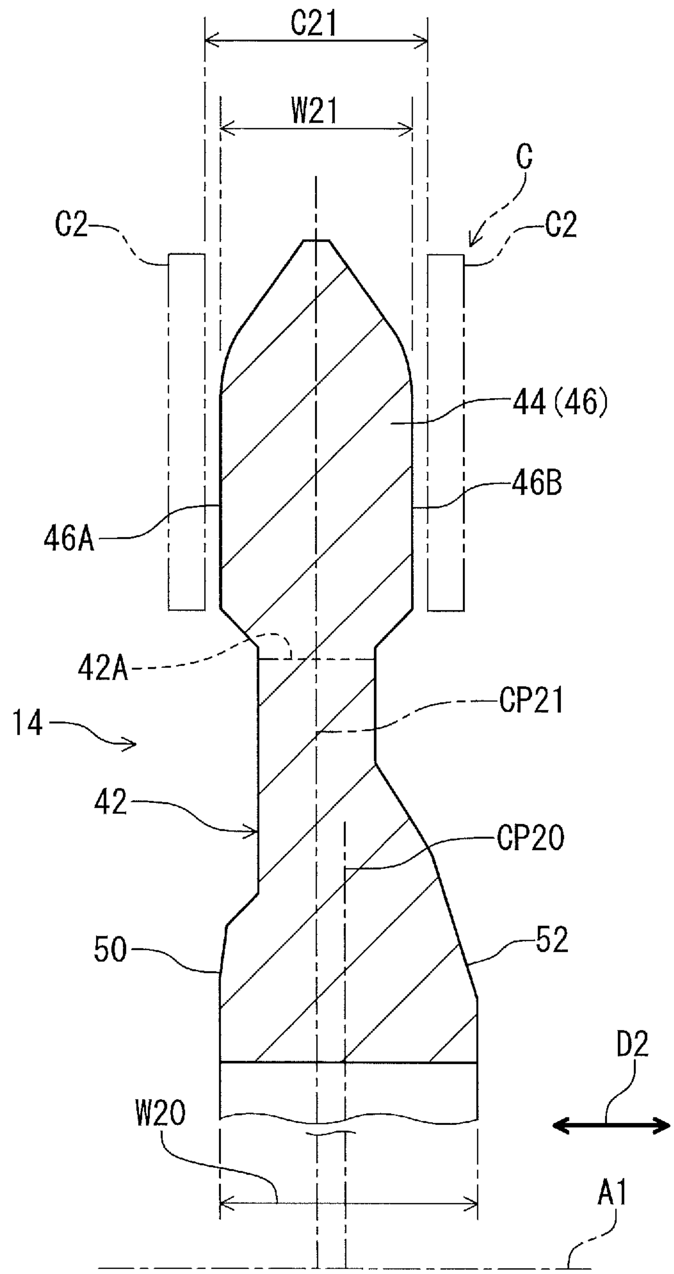
FIG. 9 is a cross-sectional view of the smaller sprocket taken along line IX-IX of FIG. 8.

In this embodiment, as seen in FIG. 9, the smaller sprocket 14 comprises a second axial surface 50 and a second reverse axial surface 52. The second axial surface 50 faces in the axial direction D2. The second reverse axial surface 52 faces toward the bicycle sprocket 12 in the axial direction D2 and is provided on a reverse side of the second axial surface 50 in the axial direction D2. The second sprocket body 42 has a second body maximum width W20 defined between the second axial surface 50 and the second reverse axial surface 52 in the axial direction D2. The second sprocket body 42 has a second reference center plane CP20 defined to bisect the second body maximum width W20 in the axial direction D2. The second reference center plane CP20 is perpendicular to the rotational center axis A1.

As seen in FIG. 9, the at least one third tooth 46 has a third chain engaging width W21 defined in the axial direction D2. In this embodiment, the third tooth 46 includes a third chain-engagement surface 46A and a third additional chain-engagement surface 46B. The third chain-engagement surface 46A faces in the axial direction D2 and is contactable with the bicycle chain C (e.g., the outer link plate C2). The third additional chain-engagement surface 46B faces in the axial direction D2 and is provided on a reverse side of the third chain-engagement surface 46A in the axial direction D2. The third additional chain-engagement surface 46B is contactable with the bicycle chain C (e.g., the outer link plate C2). The third chain engaging width W21 is defined between the third chain-engagement surface 46A and the third additional chain-engagement surface 46B in the axial direction D2.

The third tooth 46 has a third center plane CP21 defined to bisect the third chain engaging width W21 in the axial direction D2. The third center plane CP21 is perpendicular to the rotational center axis A1. The third center plane CP21 is offset from the second reference center plane CP20 in the axial direction D2. However, the third center plane CP21 can coincide with the second reference center plane CP20 in the axial direction D2. The third tooth 46 has a symmetrical shape with respect to the third center plane CP21 in the axial direction D2. However, the third tooth 46 can have an asymmetrical shape with respect to the third center plane CP21 in the axial direction D2.

Figure 10:
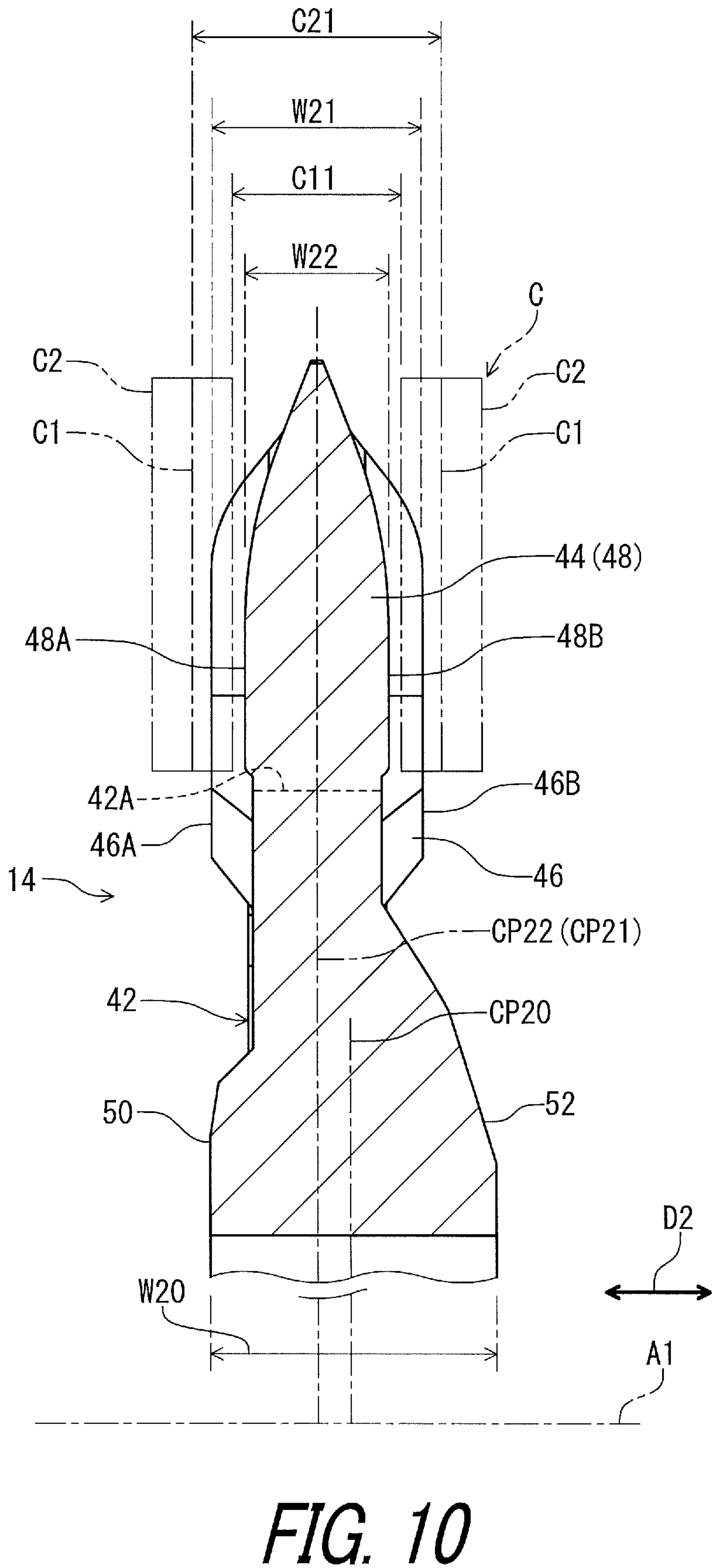
FIG. 10 is a cross-sectional view of the smaller sprocket taken along line X-X of FIG. 8.

As seen in FIG. 10, the at least one fourth tooth 48 has a fourth chain engaging width W22 defined in the axial direction D2. In this embodiment, the fourth tooth 48 includes a fourth chain-engagement surface 48A and a fourth additional chain-engagement surface 48B. The fourth chain-engagement surface 48A faces in the axial direction D2 and is contactable with the bicycle chain C (e.g., the inner link plate C1). The fourth additional chain-engagement surface 48B faces in the axial direction D2 and is provided on a reverse side of the fourth chain-engagement surface 48A in the axial direction D2. The fourth additional chain-engagement surface 48B is contactable with the bicycle chain C (e.g., the inner link plate C1). The fourth chain engaging width W22 is defined between the fourth chain-engagement surface 48A and the fourth additional chain-engagement surface 48B in the axial direction D2.

The fourth tooth has a fourth center plane CP22 defined to bisect the fourth chain engaging width W22 in the axial direction D2. The fourth center plane CP22 is perpendicular to the rotational center axis A1. The fourth center plane CP22 is offset from the second reference center plane CP20 in the axial direction D2. However, the fourth center plane CP22 can coincide with the second reference center plane CP20 in the axial direction D2. The fourth center plane CP22 coincides with the third center plane CP21. However, the fourth center plane CP22 can be offset from the third center plane CP21 in the axial direction D2. The fourth tooth 48 has a symmetrical shape with respect to the fourth center plane CP22 in the axial direction D2. However, the fourth tooth 48 can have an asymmetrical shape with respect to the fourth center plane CP22 in the axial direction D2.

In this embodiment, the fourth chain engaging width W22 is smaller than the third chain engaging width W21. The third chain engaging width W21 is larger than an inner link space C11 defined between the opposed pair of inner link plates C1 of the bicycle chain C and is smaller than an outer link space C21 defined between the opposed pair of outer link plates C2 of the bicycle chain C. The fourth chain engaging width W22 is smaller than the inner link space C11. However, the fourth chain engaging width W22 can be equal to or larger than the third chain engaging width W21. The third chain engaging width W21 can be smaller than the inner link space C11.

In this embodiment, as seen in FIGS. 5 and 8, a total number of the plurality of sprocket teeth 32 is an even number, and a total number of the plurality of second sprocket teeth 44 is an even number. For example, the total number of the plurality of sprocket teeth 32 is thirty-six, and the total number of the plurality of second sprocket teeth 44 is twenty-four. However, a total number of the plurality of sprocket teeth 32 is not limited to this embodiment. A total number of the plurality of second sprocket teeth 44 is not limited to this embodiment.

As seen in FIGS. 5 and 8, the bicycle sprocket 12 has a first pitch-circle diameter PCD1 defined by the plurality of sprocket teeth 32. The smaller sprocket 14 has a second pitch-circle diameter PCD2 defined by the plurality of second sprocket teeth 44. The first pitch-circle diameter PCD1 is larger than the second pitch-circle diameter PCD2.

The first pitch-circle diameter PCD1 can be defined based on centers C31 of pins C3 (FIG. 25) of the bicycle chain C which is engaged with the plurality of first sprocket teeth 32. The second pitch-circle diameter PCD2 can be defined based on the centers C31 of the pins C3 (FIG. 25) of the bicycle chain C which is engaged with the plurality of second sprocket teeth 44.

As seen in FIG. 5, the bicycle sprocket 12 comprises at least one shifting facilitation area FA1 to facilitate at least one of a first shifting operation and a second shifting operation. In the first shifting operation, the bicycle chain C is shifted from the bicycle sprocket 12 toward the smaller sprocket 14 adjacent to the bicycle sprocket 12 in the axial direction D2 parallel to the rotational center axis A1 of the bicycle sprocket 12 without another sprocket between the bicycle sprocket 12 and the smaller sprocket 14. In the second shifting operation, the bicycle chain C is shifted from the smaller sprocket 14 toward the bicycle sprocket 12.

In this embodiment, the at least one shifting facilitation area FA1 includes a plurality of shifting facilitation area FA1 to facilitate at least one of the first shifting operation and the second shifting operation. Specifically, the plurality of shifting facilitation area FA1 facilitates both the first shifting operation and the second shifting operation. However, a total number of the shifting facilitation areas FA1 is not limited to this embodiment.

The shifting facilitation area FA1 is a circumferential area defined by elements configured to facilitate at least one of the first shifting operation and the second shifting operation. In this embodiment, the shifting facilitation area FA1 includes a first shifting facilitation area FA11 to facilitate the first shifting operation and a second shifting facilitation area FA12 to facilitate the second shifting operation. The first shifting facilitation area FA11 overlaps with the second shifting facilitation area FA12 in the circumferential direction D1 and is disposed on an upstream side of the second shifting facilitation area FA12 in the driving rotational direction D11. However, a positional relationship between the first shifting facilitation area FA11 and the second shifting facilitation area FA12 is not limited to this embodiment.

As seen in FIG. 5, the bicycle sprocket 12 comprises at least one driving facilitation area FA2. In this embodiment, the at least one driving facilitation area FA2 includes a plurality of driving facilitation areas FA2. The driving facilitation area FA2 is provided outside the shifting facilitation area FA1 and is provided between the shifting facilitation areas FA1 in the circumferential direction D1. However, a total number of the driving facilitation areas FA2 is not limited to this embodiment. The driving facilitation area FA2 is configured to facilitate holding and driving of the bicycle chain C rather than facilitating the shifting operation. Shifting facilitation performance of the driving facilitation area FA2 is lower than shifting facilitation performance of the shifting facilitation area FA1. In this embodiment, neither a shifting facilitation chamfer, a shifting facilitation recess, nor a shifting facilitation projection is provided in the driving facilitation area FA2. Thus, derailing and receiving of the bicycle chain C is less likely to smoothly occur in the driving facilitation area FA2 than in the shifting facilitation area FA1. The driving facilitation area FA2 is defined to include points which are respectively offset from a top dead center and a bottom dead center of the bicycle crank assembly 10 by 90 degrees in the circumferential direction D1. In other words, the driving facilitation areas FA2 do not include the top and bottom dead centers of the bicycle crank assembly 10 while the shifting facilitation areas FA1 include the top and bottom dead centers.

Figure 11:
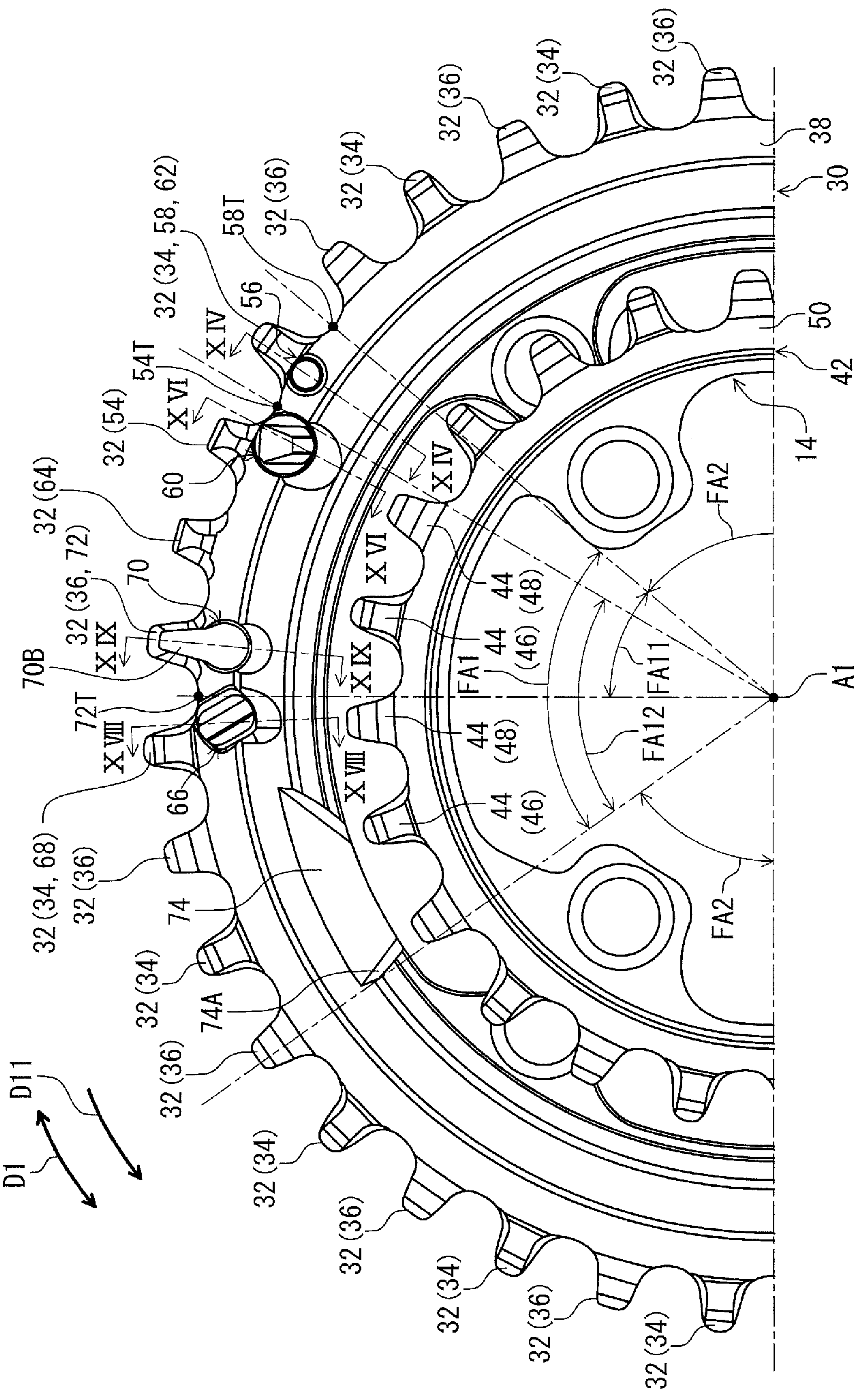
FIG. 11 is a partial side elevational view of the bicycle sprocket and the smaller sprocket of the bicycle crank assembly illustrated in FIG. 1.

As seen in FIG. 11, the plurality of sprocket teeth 32 includes a first derailing tooth 54 provided on the outer periphery 30A of the sprocket body 30 to first derail the bicycle chain C from the bicycle sprocket 12 in the first shifting operation. In this embodiment, as seen in FIG. 5, the plurality of sprocket teeth 32 includes a plurality of first derailing teeth 54 respectively provided in the shifting facilitation areas to first derail the bicycle chain C from the bicycle sprocket 12 in the first shifting operation. However, a total number of the first derailing teeth 54 is not limited to this embodiment.

As seen in FIG. 11, the bicycle sprocket 12 comprises at least one shifting facilitation projection 56 configured to engage with the bicycle chain C in the first shifting operation in which the bicycle chain C is shifted from the bicycle sprocket 12 toward the smaller sprocket 14 adjacent to the bicycle sprocket 12 in the axial direction D2 parallel to the rotational center axis A1 of the bicycle sprocket 12 without another sprocket between the bicycle sprocket 12 and the smaller sprocket 14.

In this embodiment, as seen in FIG. 5, the at least one shifting facilitation projection 56 includes a plurality of shifting facilitation projections 56 configured to engage with the bicycle chain C in the first shifting operation. However, a total number of the shifting facilitation projections 56 is not limited to this embodiment. The shifting facilitation projection 56 can also be referred to as a first shifting facilitation projection 56.

As seen in FIG. 11, the shifting facilitation projection 56 is provided in the shifting facilitation area FA1 (the first shifting facilitation area FA11) to facilitate the first shifting operation. The shifting facilitation projection 56 is provided on an upstream side of the first derailing tooth 54 in the driving rotational direction D11.

The at least one shifting facilitation projection 56 is at least partly provided closer to the rotational center axis A1 than the at least one first tooth 34. One of the at least one first tooth 34 is at least partly provided closest to the at least one shifting facilitation projection 56 among the at least one first tooth 34. In this embodiment, the plurality of sprocket teeth 32 includes a first adjacent tooth 58 closest to the shifting facilitation projection 56 among the plurality of sprocket teeth 32. In this embodiment, the at least one first tooth 34 includes the first adjacent tooth 58. The first derailing tooth 54 is adjacent to the first adjacent tooth 58 without another tooth between the first derailing tooth 54 and the first adjacent tooth 58 in the driving rotational direction D11. The first adjacent tooth 58 is provided to an upstream side of the first derailing tooth 54. However, the positional relationship among the first derailing tooth 54, the shifting facilitation projection 56, and the first adjacent tooth 58 is not limited to this embodiment.

Figure 12:
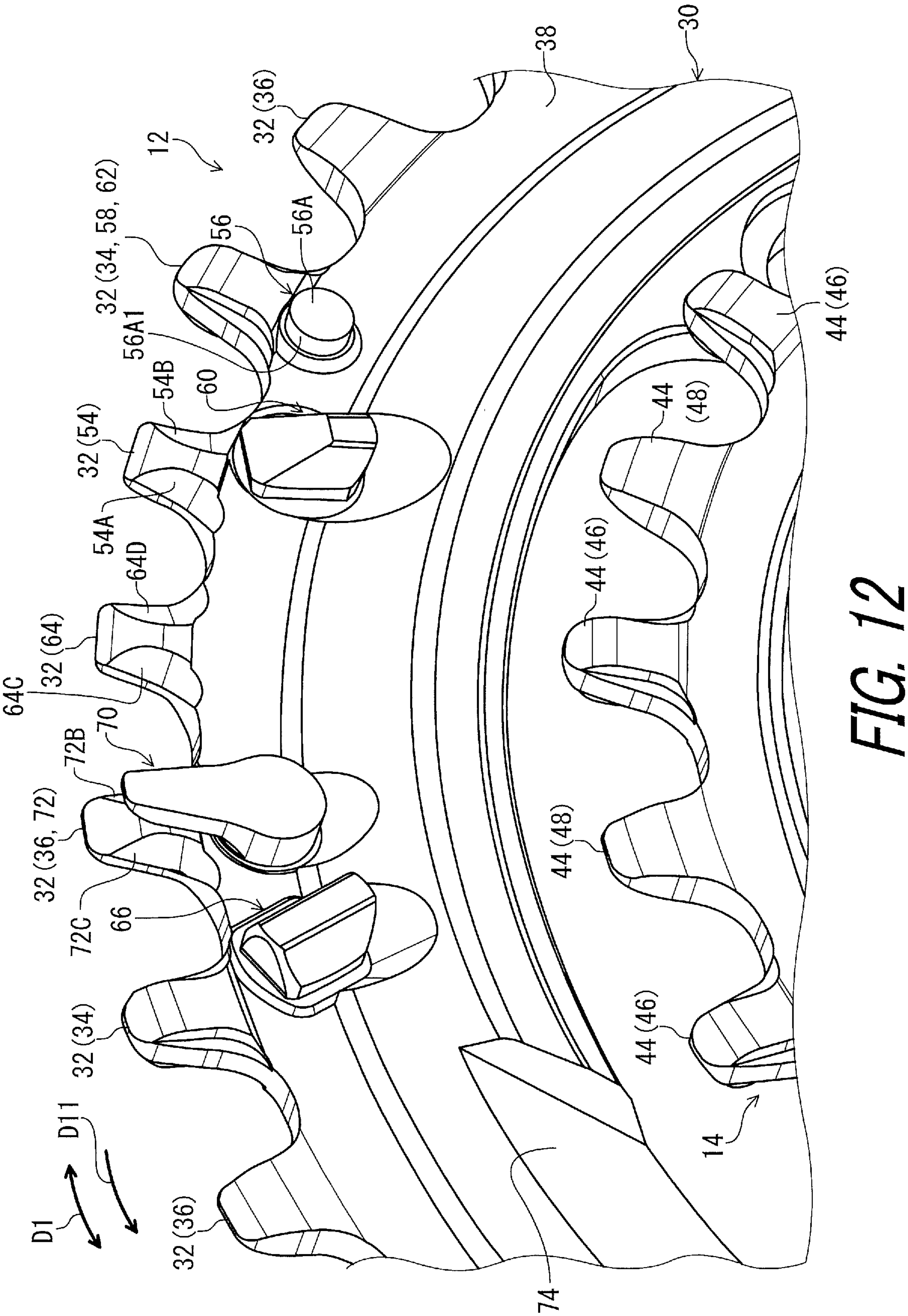
FIG. 12 is a partial perspective view of the bicycle sprocket and the smaller sprocket of the bicycle crank assembly illustrated in FIG. 1.
Figure 13:
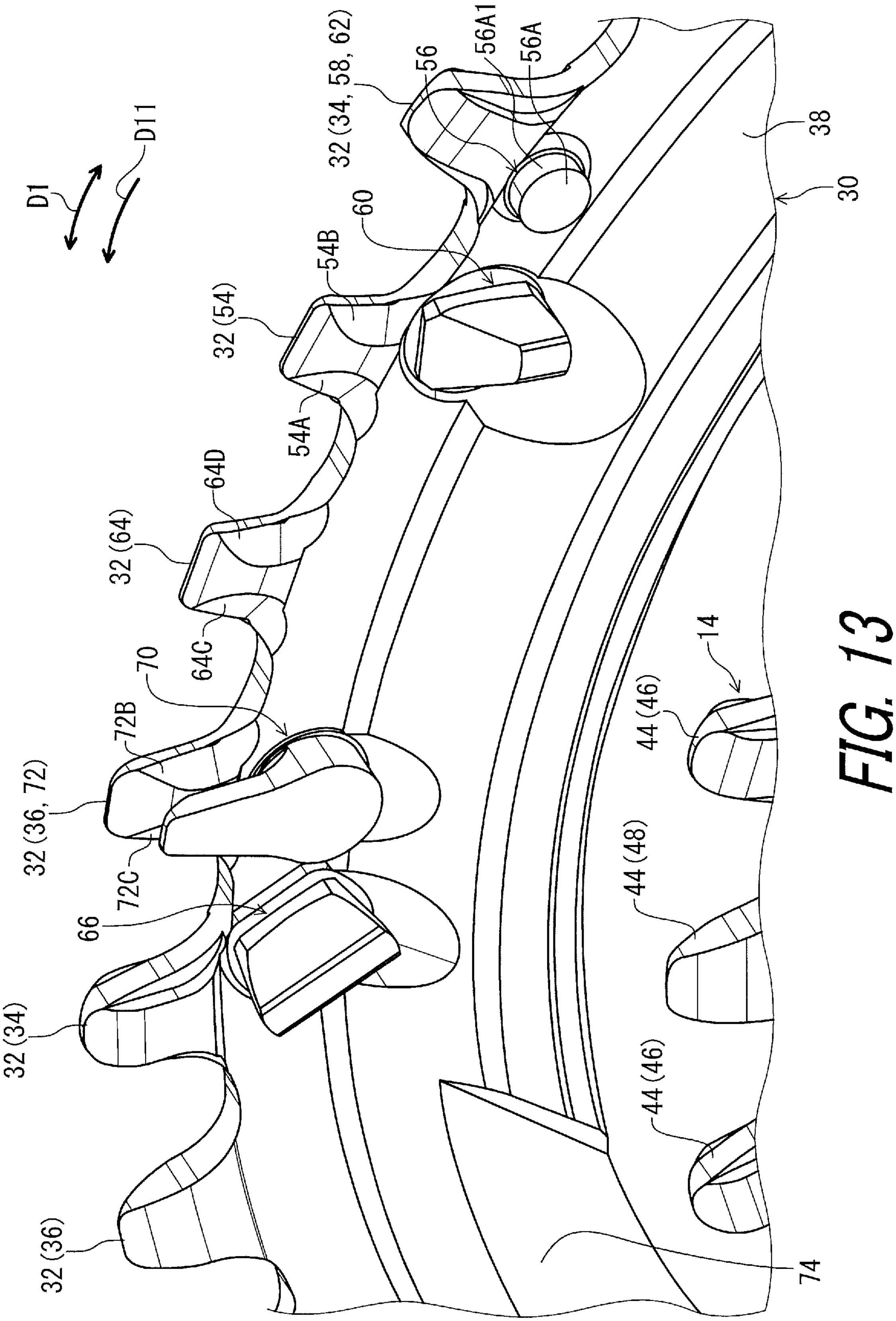
FIG. 13 is another partial perspective view of the bicycle sprocket and a smaller sprocket of the bicycle crank assembly illustrated in FIG. 1.

As seen in FIGS. 12 and 13, the shifting facilitation projection 56 projects from the first axial surface 38 in the axial direction D2 to contact the bicycle chain C (e.g., the outer link plate C2) in the second shifting operation. The shifting facilitation projection 56 is coupled to the sprocket body 30 to contact the bicycle chain C (e.g., the outer link plate C2) in the first shifting operation. The shifting facilitation projection 56 is a separate member from the sprocket body 30 and is secured to the sprocket body 30. However, the shifting facilitation projection 56 can be integrally provided with the sprocket body 30 as a one-piece unitary member.

Figure 14:
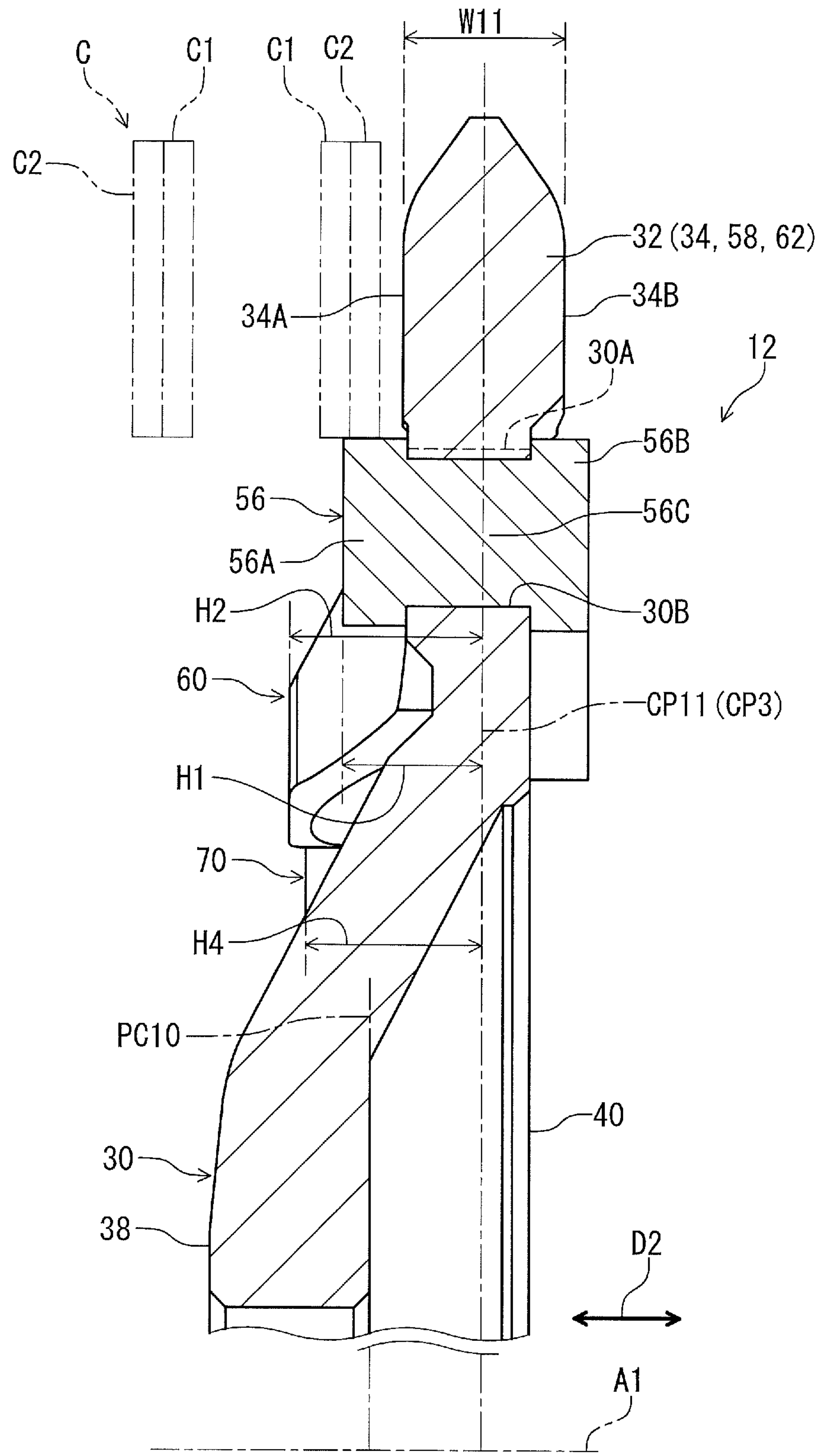
FIG. 14 is a cross-sectional view of the bicycle sprocket taken along line XIV-XIV of FIG. 11.

In this embodiment, as seen in FIG. 14, the shifting facilitation projection 56 includes a contact part 56A, a securing part 56B, and an intermediate part 56C. The contact part 56A is provided on the first axial surface 38 to contact the outer link plate C2. The contact part 56A is provided at one end of the intermediate part 56C. The securing part 56B is provided on the first reverse axial surface 40. The securing part 56B is provided at the other end of the intermediate part 56C. The intermediate part 56C extends through a hole 30B of the sprocket body 30. The contact part 56A has an outer diameter larger than an outer diameter of the intermediate part 56C. The securing part 56B has an outer diameter larger than the outer diameter of the intermediate part 56C. The contact part 56A, the securing part 56B, and the intermediate part 56C provide a rivet. However, the structure of the shifting facilitation projection 56 is not limited to this embodiment.

As seen in FIGS. 12 and 13, the contact part 56A has a curved surface 56A1 to contact the outer link plate C2 in the first shifting operation. Specifically, the contact part 56A has a columnar shape. The curved surface 56A1 is defined about the contact part 56A and has a circumferential round shape. However, the shape of the contact part 56A is not limited to this embodiment.

As seen in FIG. 11, the bicycle sprocket 12 comprises at least one bump portion 60 provided on a downstream side of the at least one shifting facilitation projection 56 in the driving rotational direction D11 in which the bicycle sprocket 12 rotates during pedaling. In this embodiment, as seen in FIG. 5, the at least one bump portion 60 includes a plurality of bump portions 60 respectively provided on the downstream side of the plurality of shifting facilitation projections 56 in the driving rotational direction D11. However, a total number of the bump portions 60 is not limited to this embodiment.

As seen in FIG. 11, the at least one bump portion 60 is configured to restrict engagement of the at least one shifting facilitation projection 56 with the bicycle chain C in at least one of the first shifting operation and the second shifting operation in which the bicycle chain C is shifted from the smaller sprocket 14 toward the bicycle sprocket 12. In this embodiment, the bump portion 60 is configured to restrict engagement of the shifting facilitation projection 56 with the bicycle chain C in the second shifting operation. However, the bump portion 60 can be configured to restrict engagement of the shifting facilitation projection 56 with the bicycle chain C in the first shifting operation.

The at least one bump portion 60 is at least partly provided radially inward of the at least one shifting facilitation projection 56 with respect to the rotational center axis A1. In this embodiment, the bump portion 60 is partly provided radially inward of the shifting facilitation projection 56 with respect to the rotational center axis A1. The bump portion 60 is partly provided closer to the rotational center axis A1 than the shifting facilitation projection 56 as viewed from a direction parallel to the rotational center axis A1. However, a positional relationship is not limited to this embodiment.

The at least one bump portion 60 is at least partly provided closer to the rotational center axis A1 than the at least one second tooth 36. One of the at least one second tooth 36 is at least partly provided closest to the at least one bump portion 60 among the at least one second tooth 36. In this embodiment, the at least one bump portion 60 is at least partly provided closer to the rotational center axis A1 than the first derailing tooth 54. The first derailing tooth 54 is at least partly provided closest to the at least one bump portion 60 among the plurality of sprocket teeth 32. Specifically, the bump portion 60 is entirely provided closer to the rotational center axis A1 than the first derailing tooth 54. The first derailing tooth 54 is closest to the bump portion 60 among the plurality of sprocket teeth 32. However, the arrangement of the bump portion 60 is not limited to this embodiment.

As seen in FIG. 14, the plurality of sprocket teeth 32 includes a reference tooth 62 having a reference tooth center plane CP3 defined to bisect the maximum axial width W11 of the reference tooth 62 in the axial direction D2. In this embodiment, the reference tooth 62 is the first adjacent tooth 58. The reference tooth center plane CP3 coincides with the first center plane CP11 of the first adjacent tooth 58.

The at least one shifting facilitation projection 56 has a first axial height H1 defined from the reference tooth center plane CP3 in the axial direction D2. The at least one bump portion 60 has a second axial height H2 defined from the reference tooth center plane CP3 in the axial direction D2. The second axial height H2 is larger than the first axial height H1. However, the second axial height H2 can be equal to or smaller than the first axial height H1.

Figure 15:
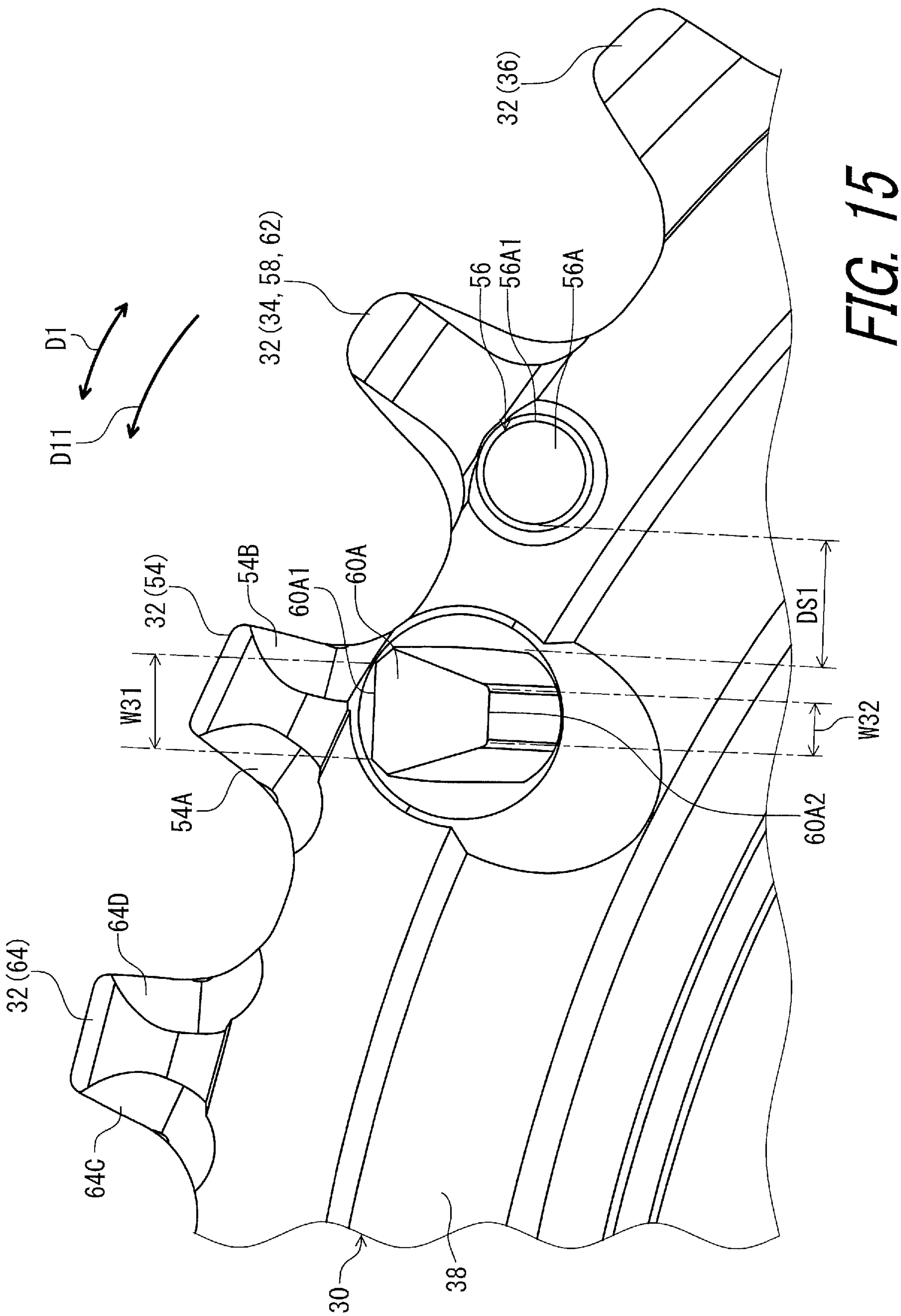
FIG. 15 is an enlarged partial side elevational view of the bicycle sprocket of the bicycle crank assembly illustrated in FIG. 1.

As seen in FIG. 15, the at least one bump portion 60 is spaced apart from the at least one shifting facilitation projection 56 by a distance DS1 that is equal to or smaller than two chain pitches. The at least one bump portion 60 is spaced apart from the at least one shifting facilitation projection 56 by the distance DS1 that is equal to or smaller than one chain pitch. In this embodiment, the bump portion 60 is spaced apart from the shifting facilitation projection 56 by the distance DS1 that is equal to one chain pitch. The chain pitch is a linear distance defined between neighboring pins of the bicycle chain C.

Figure 16:
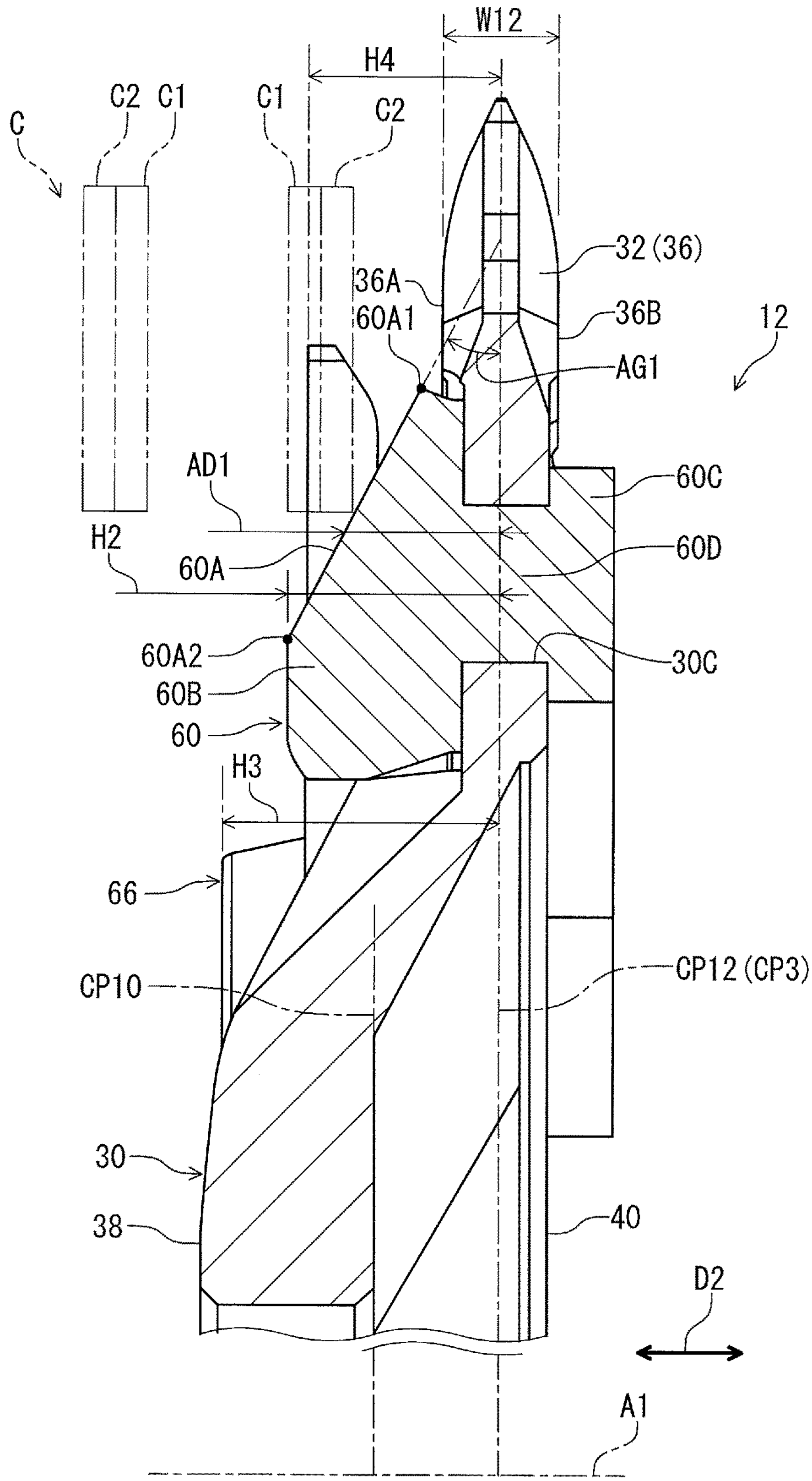
FIG. 16 is a cross-sectional view of the bicycle sprocket taken along line XVI-XVI of FIG. 11.

As seen in FIG. 16, the at least one bump portion 60 has a contact surface 60A configured to move the bicycle chain C toward the smaller sprocket 14. The contact surface 60A is configured to guide the bicycle chain C toward the smaller sprocket 14. The contact surface 60A is configured to move the bicycle chain C away from the sprocket body 30 in the axial direction D2. The contact surface 60A is a flat surface and is inclined relative to the first reference center plane CP10. The contact surface 60A has a radially outer end 60A1 and a radially inner end 60A2. An axial distance AD1 is defined between the contact surface 60A and the reference tooth center plane CP3 in the axial direction D2. The contact surface 60A is inclined to increase the axial distance AD1 from the radially outer end 60A1 to the radially inner end 60A2.

As seen in FIG. 15, the radially outer end 60A1 is at least partly provided on a downstream side of the radially inner end 60A2 in the driving rotational direction D11. In this embodiment, the radially outer end 60A1 is partly provided on the downstream side of the radially inner end 60A2 in the driving rotational direction D11. However, a positional relationship between the radially outer end 60A1 and the radially inner end 60A2 is not limited to this embodiment. The radially outer end 60A1 has a first width W31. The radially inner end 60A2 has a second width W32 that is smaller than the first width W31. However, the second width W32 can be equal to or larger than the first width W31.

As seen in FIG. 16, an angle AG1 defined between the contact surface 60A and the reference tooth center plane CP3 of the reference tooth 62 is equal to or smaller than 50 degrees. The angle AG1 defined between the contact surface 60A and the reference tooth center plane CP3 of the reference tooth 62 is preferably equal to or smaller than 45 degrees. However, the angle is not limited to this embodiment. The angle AG1 can be equal to or smaller than approximately 50 degrees. The angle AG1 can be equal to or smaller than approximately 45 degrees. The angle AG1 can be larger than 50 degrees.

The bump portion 60 is coupled to the sprocket body 30 to contact the bicycle chain C (e.g., the outer link plate C2) in the second shifting operation. The bump portion 60 is a separate member from the sprocket body 30 and is secured to the sprocket body 30. However, the bump portion 60 can be integrally provided with the sprocket body 30 as a one-piece unitary member.

In this embodiment, the bump portion 60 includes a contact part 60B, a securing part 60C, and an intermediate part 60D. The contact part 60B is provided on the first axial surface 38 to contact the outer link plate C2. The contact part 60B is provided at one end of the intermediate part 60D. The contact part 60B includes the contact surface 60A. The securing part 60C is provided on the first reverse axial surface 40. The securing part 60C is provided at the other end of the intermediate part 60D. The intermediate part 60D extends through a hole 30C of the sprocket body 30. The contact part 60B has an outer diameter larger than an outer diameter of the intermediate part 60D. The securing part 60C has an outer diameter larger than the outer diameter of the intermediate part 60D. The contact part 60B, the securing part 60C, and the intermediate part 60D provide a rivet. As seen in FIGS. 12 and 13, the contact part 60B has a shape different from a shape of the contact part 56A. However, the structure of the bump portion 60 is not limited to this embodiment.

As seen in FIG. 11, the plurality of sprocket teeth 32 includes at least one receiving tooth 64 provided in the shifting facilitation area FA1 to first receive the bicycle chain C in the second shifting operation. The receiving tooth 64 first receives the opposed pair of outer link plates C2 of the bicycle chain C in the second shifting operation. The receiving tooth 64 is provided on a downstream side of the first derailing tooth 54 in the driving rotational direction D11 without another tooth between the receiving tooth 64 and the first derailing tooth 54. In this embodiment, as seen in FIG. 5, the at least one receiving tooth 64 includes a plurality of receiving teeth 64 respectively provided in the shifting facilitation areas FA1 to first receive the bicycle chain C in the second shifting operation. However, a total number of the receiving teeth 64 is not limited to this embodiment.

As seen in FIGS. 12 and 13, the first derailing tooth 54 includes a first derailing downstream chamfer 54A provided on the first axial surface 38. The first derailing downstream chamfer 54A is provided on a downstream side in the first derailing tooth 54 in the driving rotational direction D11. The first derailing downstream chamfer 54A reduces interference between the first derailing tooth 54 and the bicycle chain C (e.g., the inner link plate C1) when the first derailing tooth 54 first derails the bicycle chain C from the bicycle sprocket 12 in the first shifting operation.

The first derailing tooth 54 includes a first derailing upstream chamfer 54B provided on the first axial surface 38. The first derailing upstream chamfer 54B is provided on an upstream side in the first derailing tooth 54 in the driving rotational direction D11. The first derailing upstream chamfer 54B reduces interference between the first derailing tooth 54 and the bicycle chain C (e.g., the outer link plate C2) when the first derailing tooth 54 first derails the bicycle chain C from the bicycle sprocket 12 in the first shifting operation.

Figure 17:
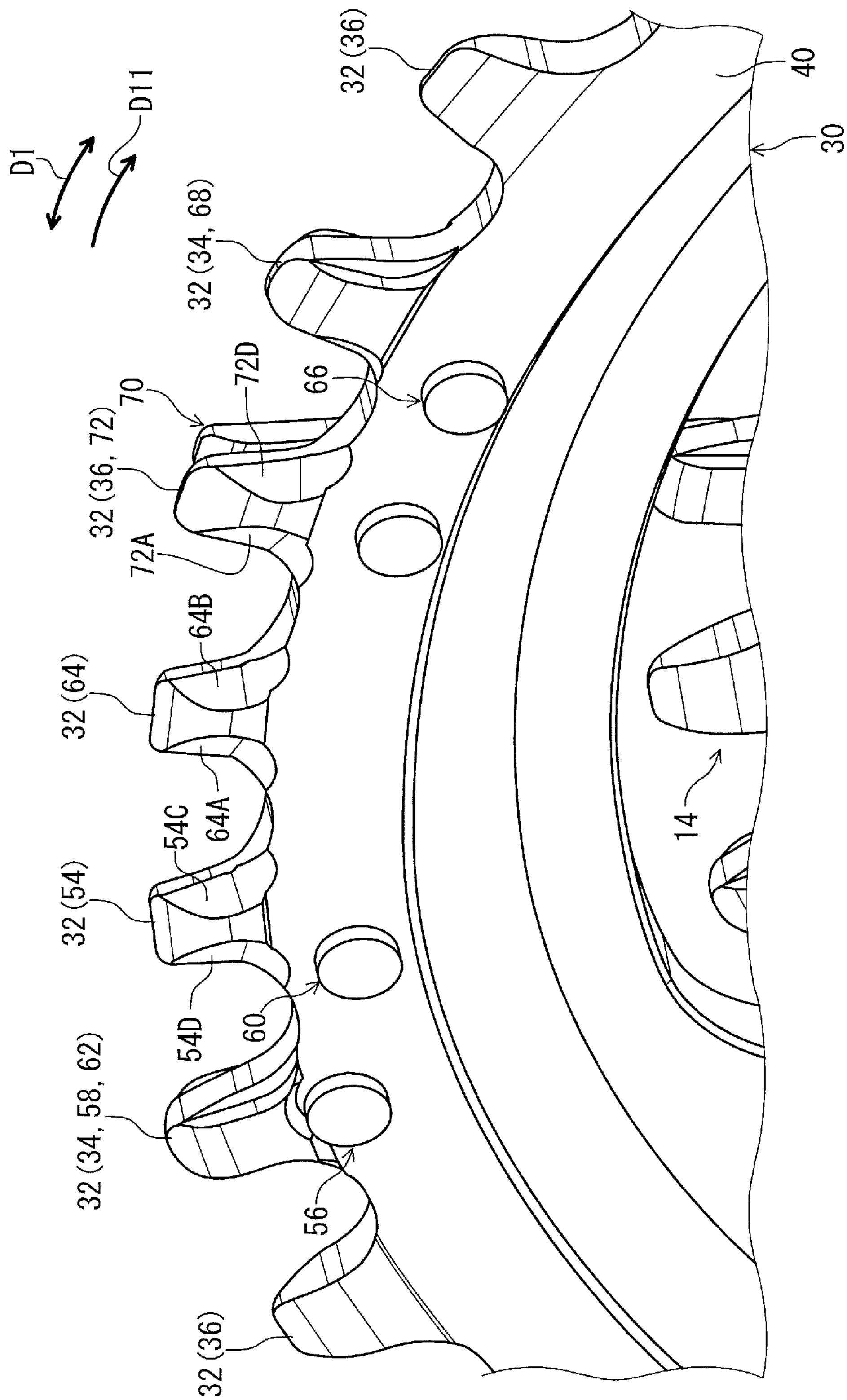
FIG. 17 is another partial perspective view of the bicycle sprocket and the smaller sprocket of the bicycle crank assembly illustrated in FIG. 1.

As seen in FIG. 17, the first derailing tooth 54 includes a first receiving downstream chamfer 54C provided on the first reverse axial surface 40. The first receiving downstream chamfer 54C is provided on a downstream side in the first derailing tooth 54 in the driving rotational direction D11. The first receiving downstream chamfer 54C reduces interference between the first derailing tooth 54 and the bicycle chain C (e.g., the inner link plate C1) when the receiving tooth 64 first receives the bicycle chain C in the second shifting operation. Namely, the first derailing tooth 54 facilitates receipt of the bicycle chain C at the receiving tooth 64 in the second shifting operation.

The first derailing tooth 54 includes an additional upstream chamfer 54D provided on the first reverse axial surface 40. The additional upstream chamfer 54D is provided on an upstream side in the first derailing tooth 54 in the driving rotational direction D11.

As seen in FIG. 17, the receiving tooth 64 includes a second derailing upstream chamfer 64A provided on the first reverse axial surface 40. The second derailing upstream chamfer 64A is provided on an upstream side in the receiving tooth 64 in the driving rotational direction D11. The second derailing upstream chamfer 64A reduces interference between the receiving tooth 64 and the bicycle chain C (e.g., the outer link plate C2) when the first derailing tooth 54 first derails the bicycle chain C from the bicycle sprocket 12 in the first shifting operation.

The receiving tooth 64 includes a second receiving downstream chamfer 64B provided on the first reverse axial surface 40. The second receiving downstream chamfer 64B is provided on a downstream side in the receiving tooth 64 in the driving rotational direction D11. The second receiving downstream chamfer 64B reduces interference between the receiving tooth 64 and the bicycle chain C (e.g., the outer link plate C2) when the receiving tooth 64 first receives the bicycle chain C in the second shifting operation.

As seen in FIGS. 12 and 13, the receiving tooth 64 includes an additional downstream chamfer 64C provided on the first axial surface 38. The additional downstream chamfer 64C is provided on a downstream side in the receiving tooth 64 in the driving rotational direction D11.

The receiving tooth 64 includes an additional upstream chamfer 64D provided on the first axial surface 38. The additional upstream chamfer 64D is provided on an upstream side in the receiving tooth 64 in the driving rotational direction D11.

As seen in FIG. 11, the bicycle sprocket 12 comprises at least one second shifting facilitation projection 66 configured to engage with the bicycle chain C in the second shifting operation. In this embodiment, as seen in FIG. 5, the at least one second shifting facilitation projection 66 includes a plurality of second shifting facilitation projections 66 configured to engage with the bicycle chain C in the second shifting operation. However, a total number of the second shifting facilitation projections 66 is not limited to this embodiment.

As seen in FIG. 11, the second shifting facilitation projection 66 is provided in the shifting facilitation area FA1 (the second shifting facilitation area FA12) to facilitate the second shifting operation. The second shifting facilitation projection 66 is provided on a downstream side of the receiving tooth 64 in the driving rotational direction D11.

The at least one second shifting facilitation projection 66 is at least partly provided closer to the rotational center axis A1 than the at least one first tooth 34. One of the at least one first tooth 34 is at least partly provided closest to the at least one second shifting facilitation projection 66 among the at least one first tooth 34. In this embodiment, the at least one first tooth 34 includes a second adjacent tooth 68 closest to the second shifting facilitation projection 66 among the plurality of sprocket teeth 32. In this embodiment, the at least one first tooth 34 includes the second adjacent tooth 68. The first derailing tooth 54 is adjacent to the second adjacent tooth 68 without another tooth between the first derailing tooth 54 and the second adjacent tooth 68 in the driving rotational direction D11. However, the positional relationship among the first derailing tooth 54, the second shifting facilitation projection 66, and the second adjacent tooth 68 is not limited to this embodiment.

As seen in FIGS. 12 and 13, the second shifting facilitation projection 66 projects from the first axial surface 38 in the axial direction D2 to contact the bicycle chain C (e.g., the outer link plate C2) in the second shifting operation. The second shifting facilitation projection 66 is coupled to the sprocket body 30 to contact the bicycle chain C (e.g., the outer link plate C2) in the first shifting operation. The second shifting facilitation projection 66 is a separate member from the sprocket body 30 and is secured to the sprocket body 30. However, the second shifting facilitation projection 66 can be integrally provided with the sprocket body 30 as a one-piece unitary member.

Figure 18:
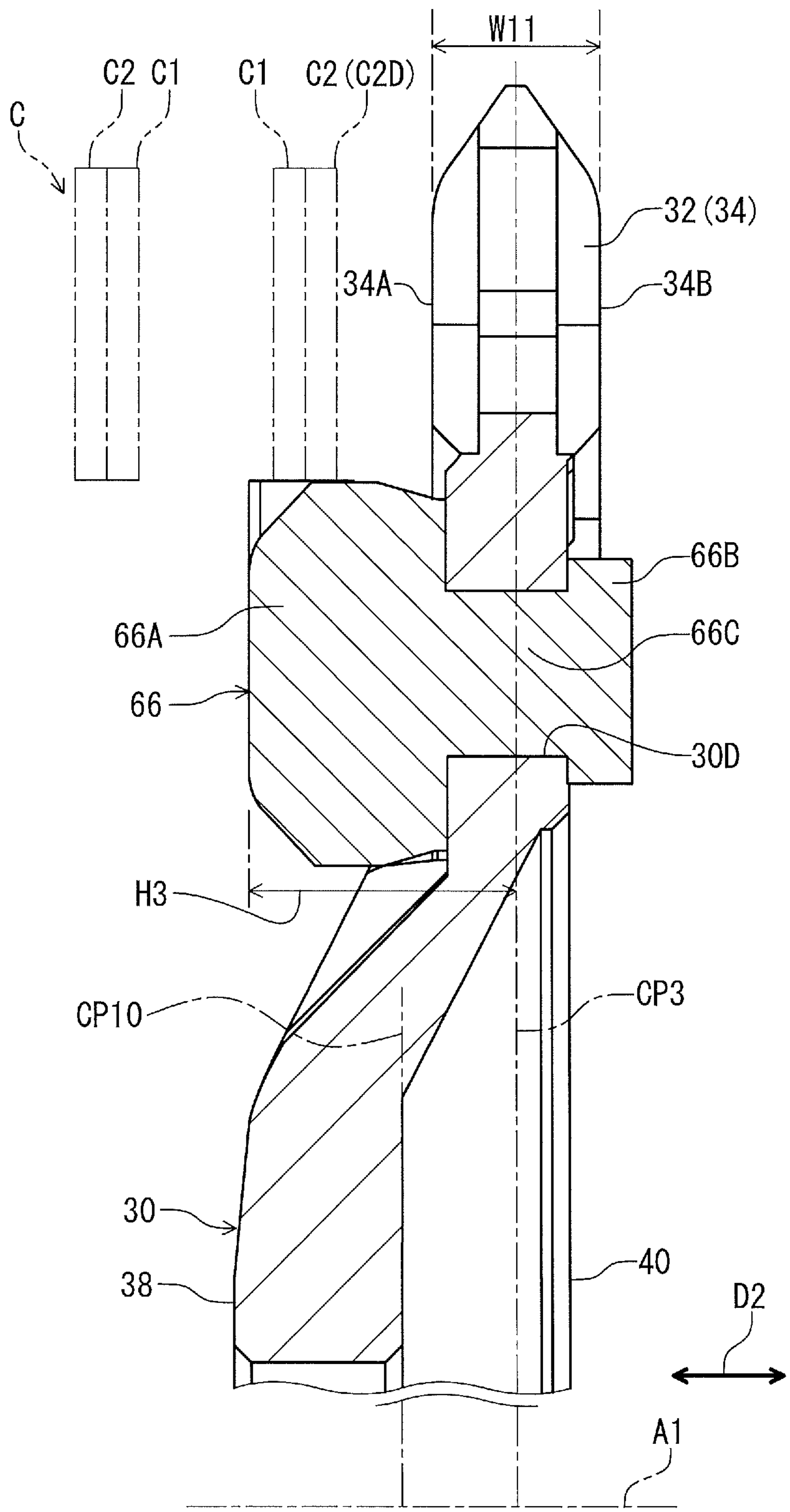
FIG. 18 is a cross-sectional view of the bicycle sprocket taken along line XVIII-XVIII of FIG. 11.

In this embodiment, as seen in FIG. 18, the second shifting facilitation projection 66 includes a contact part 66A, a securing part 66B, and an intermediate part 66C. The contact part 66A is provided on the first axial surface 38 to contact the outer link plate C2. The contact part 66A is provided at one end of the intermediate part 66C. The securing part 66B is provided on the first reverse axial surface 40. The securing part 66B is provided at the other end of the intermediate part 66C. The intermediate part 66C extends through a hole 30D of the sprocket body 30. The contact part 66A has an outer diameter larger than an outer diameter of the intermediate part 66C. The securing part 66B has an outer diameter larger than the outer diameter of the intermediate part 66C. The contact part 66A, the securing part 66B, and the intermediate part 66C provide a rivet. However, the structure of the second shifting facilitation projection 66 is not limited to this embodiment.

As seen in FIG. 16, the at least one second shifting facilitation projection 66 has a third axial height H3 defined from the reference tooth center plane CP3 in the axial direction D2. The third axial height H3 is larger than the second axial height H2. Namely, the third axial height H3 is larger than the first axial height H1 (FIG. 14). However, the third axial height H3 can be equal to or smaller than the first axial height H1 and the second axial height H2.

As seen in FIG. 11, the bicycle sprocket 12 comprises at least one third shifting facilitation projection 70 configured to engage with the bicycle chain C in the second shifting operation. In this embodiment, as seen in FIG. 5, the at least one third shifting facilitation projection 70 includes a plurality of third shifting facilitation projections 70 configured to engage with the bicycle chain C in the second shifting operation. However, a total number of the third shifting facilitation projections 70 is not limited to this embodiment.

As seen in FIG. 11, the third shifting facilitation projection 70 is provided in the shifting facilitation area FA1 (the second shifting facilitation area FA12) to facilitate the second shifting operation. The third shifting facilitation projection 70 is provided on a downstream side of the receiving tooth 64 in the driving rotational direction D11. The third shifting facilitation projection 70 is provided on an upstream side of the second shifting facilitation projection 66 in the driving rotational direction D11.

The at least one third shifting facilitation projection 70 is at least partly provided closer to the rotational center axis A1 than the at least one second tooth 36. One of the at least one first tooth 34 is at least partly provided closest to the at least one third shifting facilitation projection 70 among the at least one first tooth 34. In this embodiment, the at least one second tooth 36 includes a third adjacent tooth 72 closest to the third shifting facilitation projection 70 among the plurality of sprocket teeth 32. In this embodiment, the at least one second tooth 36 includes the third adjacent tooth 72. The receiving tooth 64 is adjacent to the third adjacent tooth 72 without another tooth between the receiving tooth 64 and the third adjacent tooth 72 in the driving rotational direction D11. The third adjacent tooth 72 is provided between the receiving tooth 64 and the second adjacent tooth 68 in the circumferential direction D1. However, the positional relationship among the receiving tooth 64, the second shifting facilitation projection 66, and the third shifting facilitation projection 70, and the third adjacent tooth 72 is not limited to this embodiment.

As seen in FIG. 17, the third adjacent tooth 72 includes a third derailing upstream chamfer 72A provided on the first reverse axial surface 40. The third derailing upstream chamfer 72A is provided on an upstream side in the third adjacent tooth 72 in the driving rotational direction D11. The third derailing upstream chamfer 72A reduces interference between the third adjacent tooth 72 and the bicycle chain C (e.g., the inner link plate C1) when the first derailing tooth 54 first derails the bicycle chain C from the bicycle sprocket 12 in the first shifting operation.

As seen in FIGS. 12 and 13, the third adjacent tooth 72 includes a third receiving upstream chamfer 72B provided on the first axial surface 38. The third receiving upstream chamfer 72B is provided on a downstream side in the third adjacent tooth 72 in the driving rotational direction D11. The third receiving upstream chamfer 72B reduces interference between the third adjacent tooth 72 and the bicycle chain C (e.g., the inner link plate C1) when the receiving tooth 64 first receives the bicycle chain C in the second shifting operation.

The third adjacent tooth 72 includes an additional downstream chamfer 72C provided on the first axial surface 38. The additional downstream chamfer 72C is provided on a downstream side in the receiving tooth 64 in the driving rotational direction D11.

As seen in FIG. 17, the third adjacent tooth 72 includes an additional downstream chamfer 72D provided on the first reverse axial surface 40. The additional downstream chamfer 72D is provided on a downstream side in the receiving tooth 64 in the driving rotational direction D11.

As seen in FIGS. 12 and 13, the third shifting facilitation projection 70 projects from the first axial surface 38 in the axial direction D2 to contact the bicycle chain C (e.g., the outer link plate C2) in the second shifting operation. The third shifting facilitation projection 70 is coupled to the sprocket body 30 to contact the bicycle chain C (e.g., the outer link plate C2) in the first shifting operation. The third shifting facilitation projection 70 is a separate member from the sprocket body 30 and is secured to the sprocket body 30. However, the third shifting facilitation projection 70 can be integrally provided with the sprocket body 30 as a one-piece unitary member.

In this embodiment, the third shifting facilitation projection 70 is coupled to the sprocket body 30 to contact the inner link plate C1 of the bicycle chain C in the second shifting operation. The third shifting facilitation projection 70 is coupled to the sprocket body 30 to contact an intermediate portion of the inner link plate C1 of the bicycle chain C in the second shifting operation. The third shifting facilitation projection 70 is partly inserted in the inner link space C1 of the opposed pair of inner link plates C1 in the second shifting operation.

Figure 19:
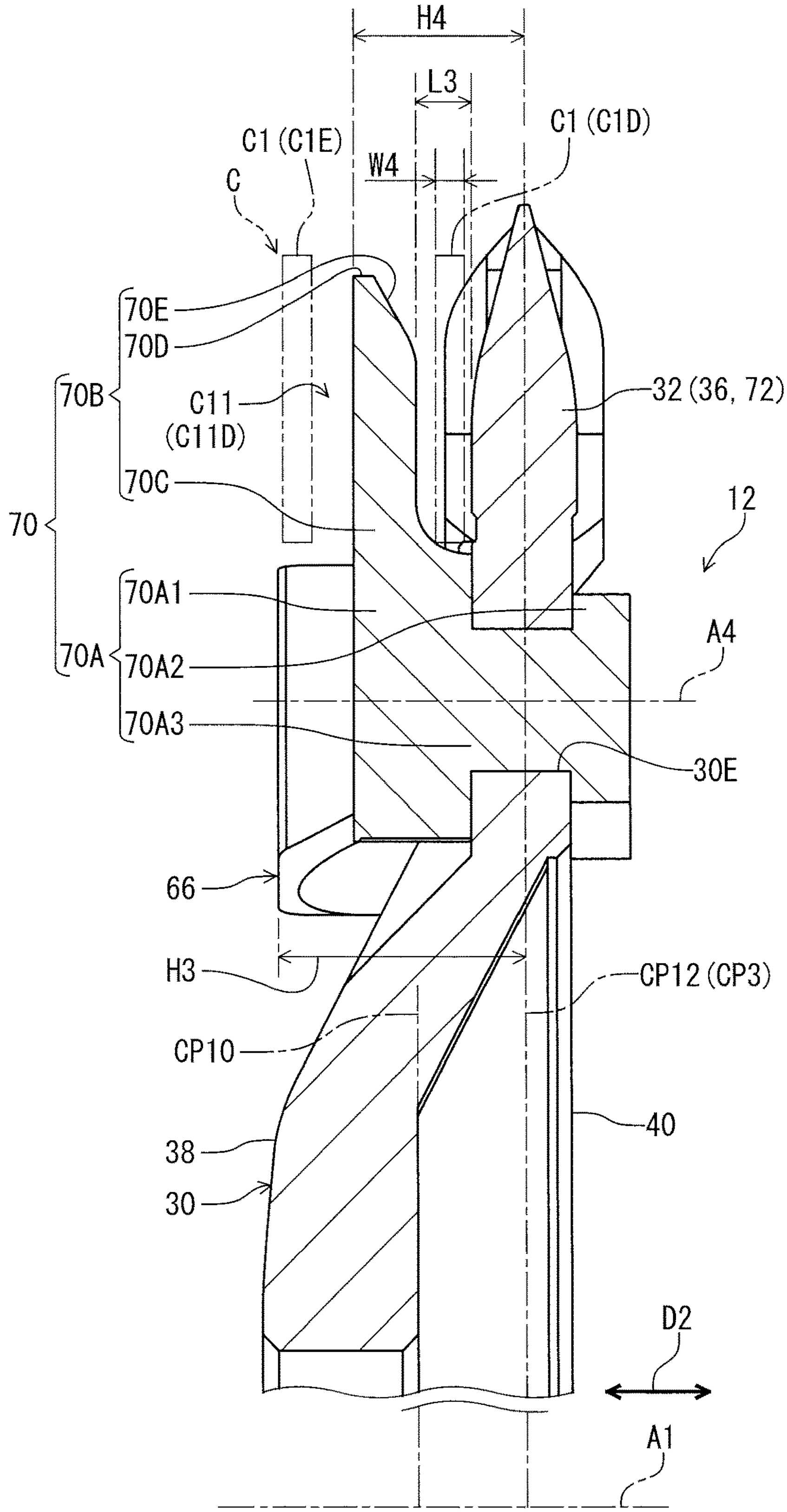
FIG. 19 is a cross-sectional view of the bicycle sprocket taken along line XIX-XIX of FIG. 11 with a bicycle chain (second shifting operation).

As seen in FIG. 19, the at least one third shifting facilitation projection 70 has a fourth axial height H4 defined from the reference tooth center plane CP3 in the axial direction D2. The fourth axial height H4 is smaller than the third axial height H3. As seen in FIG. 16, the fourth axial height H4 is smaller than the second axial height H2. As seen in FIG. 14, the fourth axial height H4 is larger than the first axial height H1. However, the fourth axial height H4 can be equal to or smaller than the first axial height H1. The fourth axial height H4 can be equal to or larger than the second axial height H2 and the third axial height H3.

Figure 20:
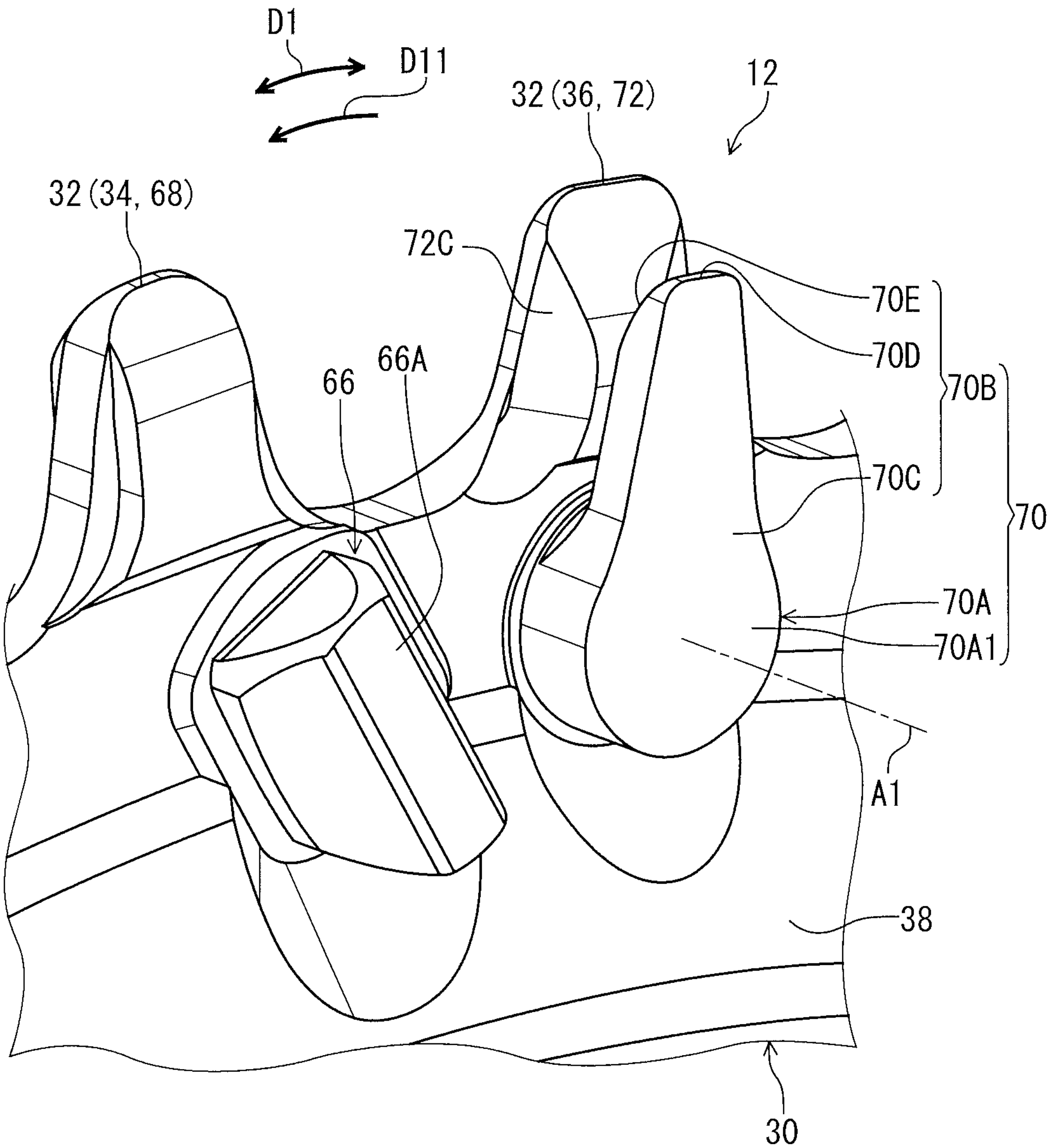
FIG. 20 is a partial perspective view of the bicycle sprocket illustrated in FIG. 5.
Figure 21:
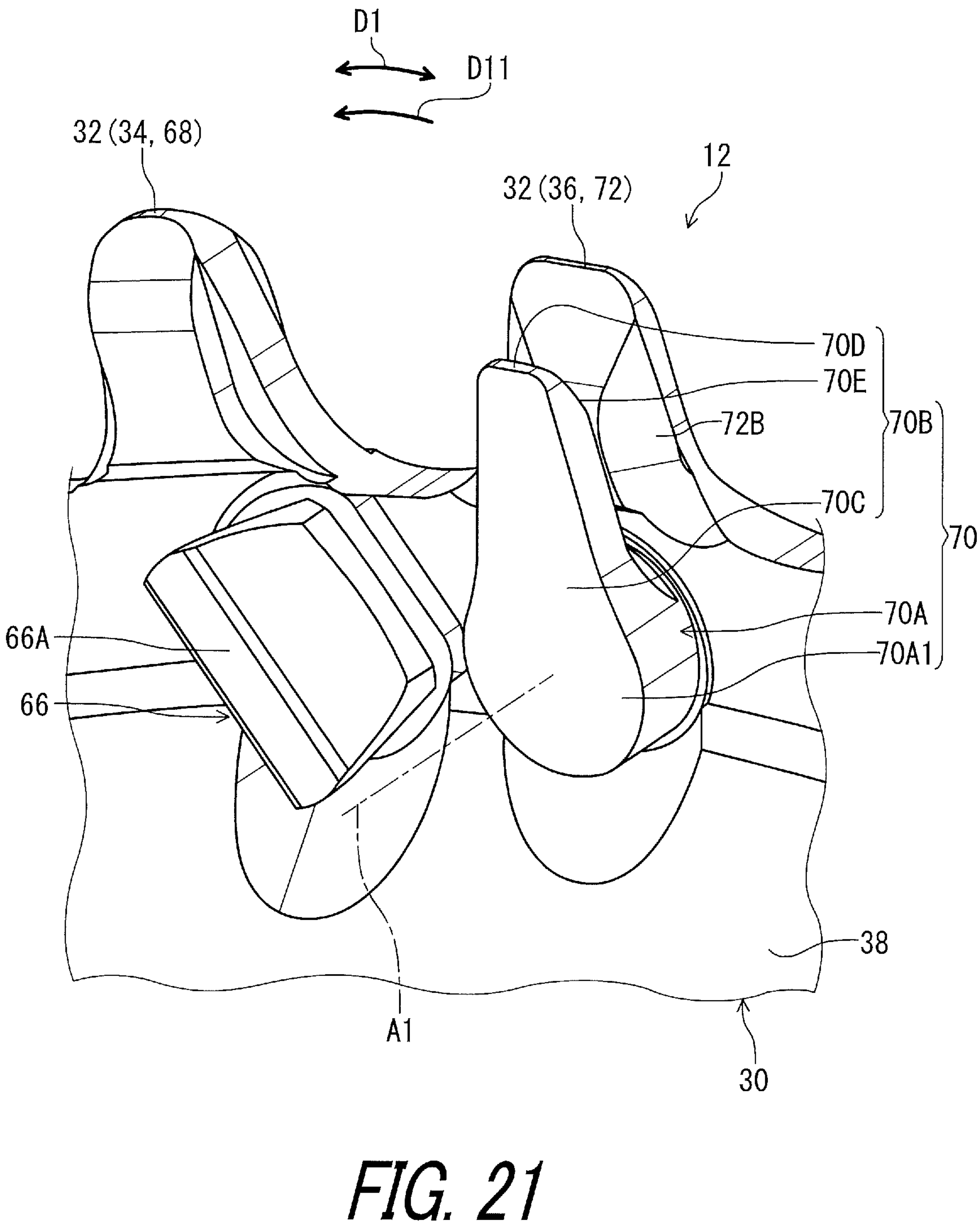
FIG. 21 is another partial perspective view of the bicycle sprocket illustrated in FIG. 5.

As seen in FIGS. 19 to 21, the third shifting facilitation projection 70 includes a coupling body 70A and a protruding part 70B. The coupling body 70A is coupled to the sprocket body 30. The protruding part 70B extends radially outward from the coupling body 70A with respect to the rotational center axis A1. The protruding part 70B is spaced apart from the sprocket body 30 in the axial direction D2 parallel to the rotational center axis A1. In this embodiment, the protruding part 70B is spaced apart from the second tooth 36 (the third adjacent tooth 72) in the axial direction D2. The protruding part 70B is contactable with the bicycle chain C in the second shifting operation.

The coupling body 70A includes a base body 70A1, a securing part 70A2, and an intermediate part 70A3 (FIG. 19). The base body 70A1 is disposed on the first axial surface 38. The protruding part 70B extends radially outward from the base body 70A1 with respect to the rotational center axis A1. The base body 70A1 is contactable with the inner link plate C1 of the bicycle chain C. The securing part 70A2 is disposed on the first reverse axial surface 40. The intermediate part 70A3 connects the securing part 70A2 to the base body 70A1 and extends through a hole 30E of the sprocket body 30. The coupling body 70A has a first center axis A4 extends in the axial direction D2. While the first center axis A4 of the coupling body 70A is parallel to the axial direction D2 in this embodiment, the first center axis A4 can be non-parallel to the axial direction D2. The base body 70A1 has an outer diameter larger than an outer diameter of the intermediate part 70A3. The securing part 70A2 has an outer diameter larger than the outer diameter of the intermediate part 70A3. The base body 70A1, the securing part 70A2, and the intermediate part 70A3 provide a rivet. However, the structure of the third shifting facilitation projection 70 is not limited to this embodiment.

As seen in FIG. 19, the third shifting facilitation projection 70 is disposed to keep a clearance at least one of between the protruding part 70B and the inner link plate C1 in the axial direction D2 and between the third adjacent tooth 72 and the inner link plate C1 in the axial direction D2 during pedaling. A maximum axial distance L3 defined between the protruding part 70B and the third adjacent tooth 72 in the axial direction D2 is larger than an axial width W4 of the inner link plate C1.

The maximum axial distance L3 is in a range of 0.5 mm to 4.0 mm. The maximum axial distance L3 is preferably equal to or larger than 1.0 mm. The maximum axial distance L3 is preferably equal to or smaller than 3.8 mm. The maximum axial distance L3 is preferably in a range of 1.0 mm to 2.0 mm. However, the maximum axial distance L3 can be in a range different from the above ranges.

As seen in FIGS. 19 to 21, the protruding part 70B includes a radially inner part 70C, a radially outer tip 70D, and an inclined surface 70E. The radially inner part 70C is coupled to the coupling body 70A. The radially outer tip 70D is provided on radially outward of the radially inner part 70C with respect to the rotational center axis A1. The inclined surface 70E faces the sprocket body 30 in the axial direction D2. The inclined surface 70E is inclined to gradually approach the sprocket body 30 in the axial direction D2 from the radially outer tip 70D toward the radially inner part 70C. The inclined surface 70E guides the inner link plate C1 of the bicycle chain C toward the third adjacent tooth 72 in the axial direction D2 when the third shifting facilitation projection 70 comes into engagement with the bicycle chain C.

As seen in FIG. 11, the protruding part 70B is disposed to at least partly overlap with one of the plurality of sprocket teeth 32 when viewed from the axial direction D2 parallel to the rotational center axis A1. In this embodiment, the protruding part 70B is disposed to partly overlap with the third adjacent tooth 72 when viewed from the axial direction D2 parallel to the rotational center axis A1.

As seen in FIG. 19, the third shifting facilitation projection 70 is engaged between an opposed pair of link plates of the bicycle chain C when the bicycle chain C is shifted from the smaller sprocket 14 to the bicycle sprocket 12. In this embodiment, the third shifting facilitation projection 70 is engaged between the opposed pair of inner link plates C1 of the bicycle chain C when the bicycle chain C is shifted from the smaller sprocket 14 to the bicycle sprocket 12.

Figure 22:
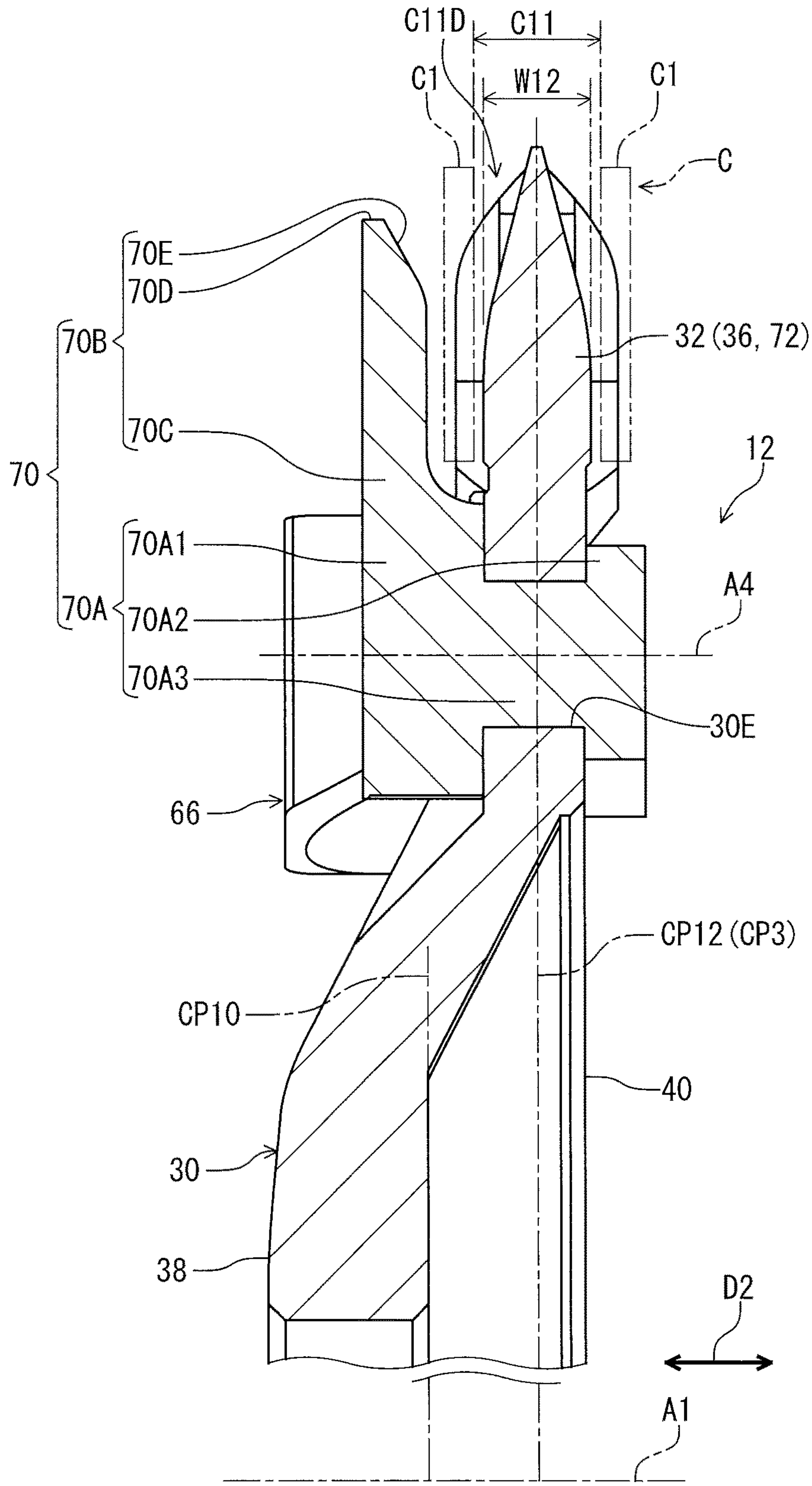
FIG. 22 is a cross-sectional view of the bicycle sprocket illustrated in the FIG. 19 with a bicycle chain (first shifting operation or state where the bicycle chain is engaged with the bicycle sprocket).

As seen in FIG. 22, the third shifting facilitation projection 70 is disposed not to be inserted between an opposed pair of link plates of the bicycle chain C in the first shifting operation. In this embodiment, the third shifting facilitation projection 70 is disposed not to be inserted between the opposed pair of inner link plates C1 of the bicycle chain C in the first shifting operation.

As seen in FIG. 11, the sprocket body 30 includes a shifting facilitation recess 74 provided in the shifting facilitation area FA1 to facilitate the second shifting operation. Specifically, the shifting facilitation recess 74 is provided on the first axial surface 38 to reduce interference between the sprocket body 30 and the bicycle chain C in the second shifting operation.

In this embodiment, the shifting facilitation area FA1 is defined from an upstream tooth bottom 58T of the first adjacent tooth 58 to a downstream circumferential end 74A of the shifting facilitation recess 74 in the circumferential direction D1. The first shifting facilitation area FA11 is defined from the upstream tooth bottom 58T of the first adjacent tooth 58 to a downstream tooth bottom 72T of the third adjacent tooth 72 in the circumferential direction D1. The second shifting facilitation area FA12 is defined from an upstream tooth bottom 54T of the first derailing tooth 54 to the downstream circumferential end 74A of the shifting facilitation recess 74 in the circumferential direction D1. However, the first shifting facilitation area FA11 and the second shifting facilitation area FA12 are not limited to this embodiment.

The first shifting operation and the second shifting operation will be described in detail below referring to FIGS. 23 to 30.

Figure 23:
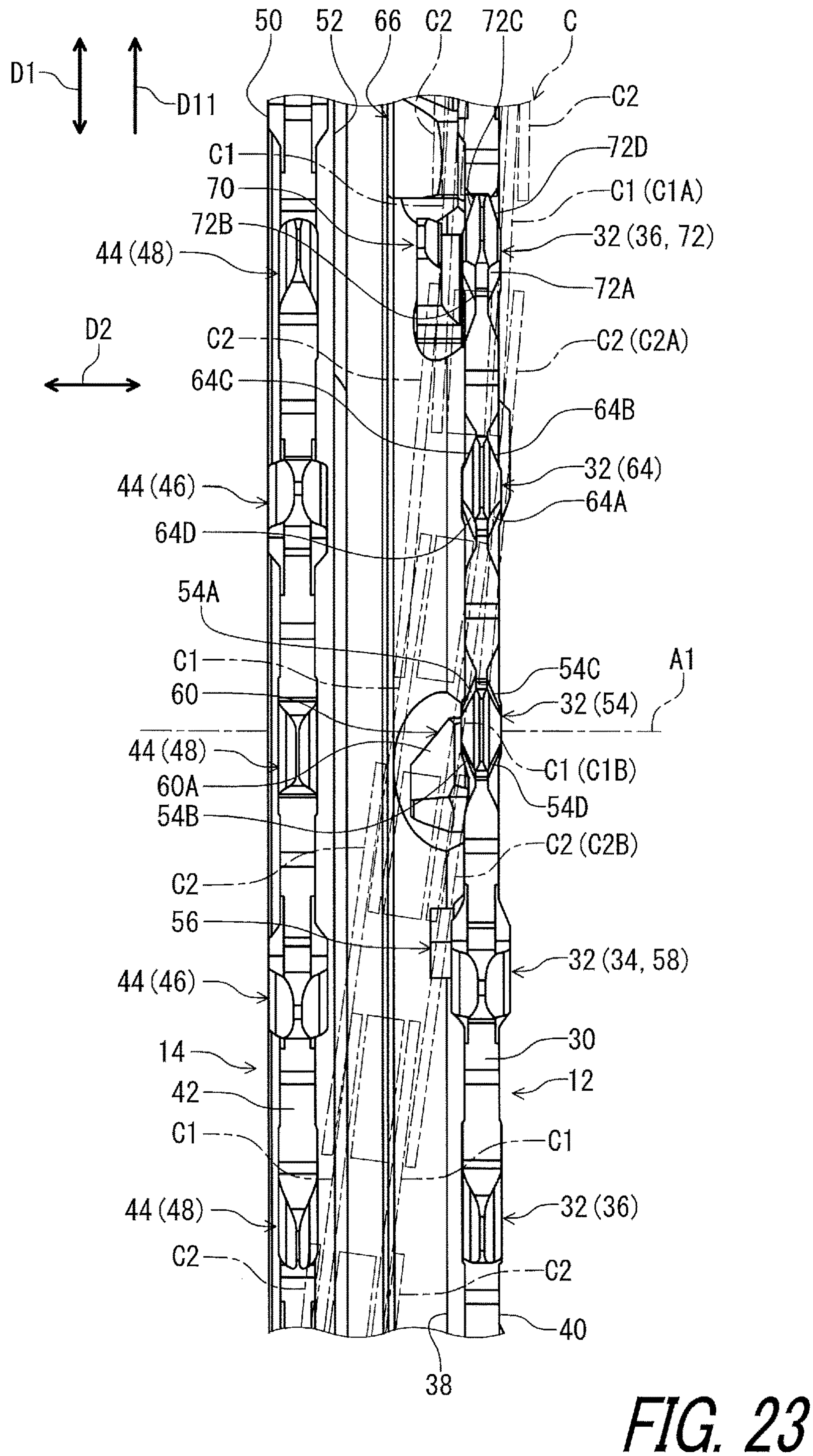
FIG. 23 is a plan view of the bicycle sprocket and the smaller sprocket of the bicycle crank assembly illustrated in FIG. 1 with the bicycle chain (first shifting operation).

As seen in FIG. 23, the bicycle chain C is shifted from the bicycle sprocket 12 toward the smaller sprocket 14 by the front derailleur (not shown) in the first shifting operation. The third derailing upstream chamfer 72A facilitates an inclination of the inner link plate C1A toward the smaller sprocket 14 relative to the axial direction D2. The second derailing upstream chamfer 64A facilitates the outer link plates C2A toward the smaller sprocket 14 relative to the axial direction D2. Furthermore, the first derailing downstream chamfer 54A guides the inner link plate C1B toward the smaller sprocket 14 in the axial direction D2. Thus, the bicycle chain C is first derailed from the bicycle sprocket 12 at the first derailing tooth 54 in the first shifting operation.

Figure 24:
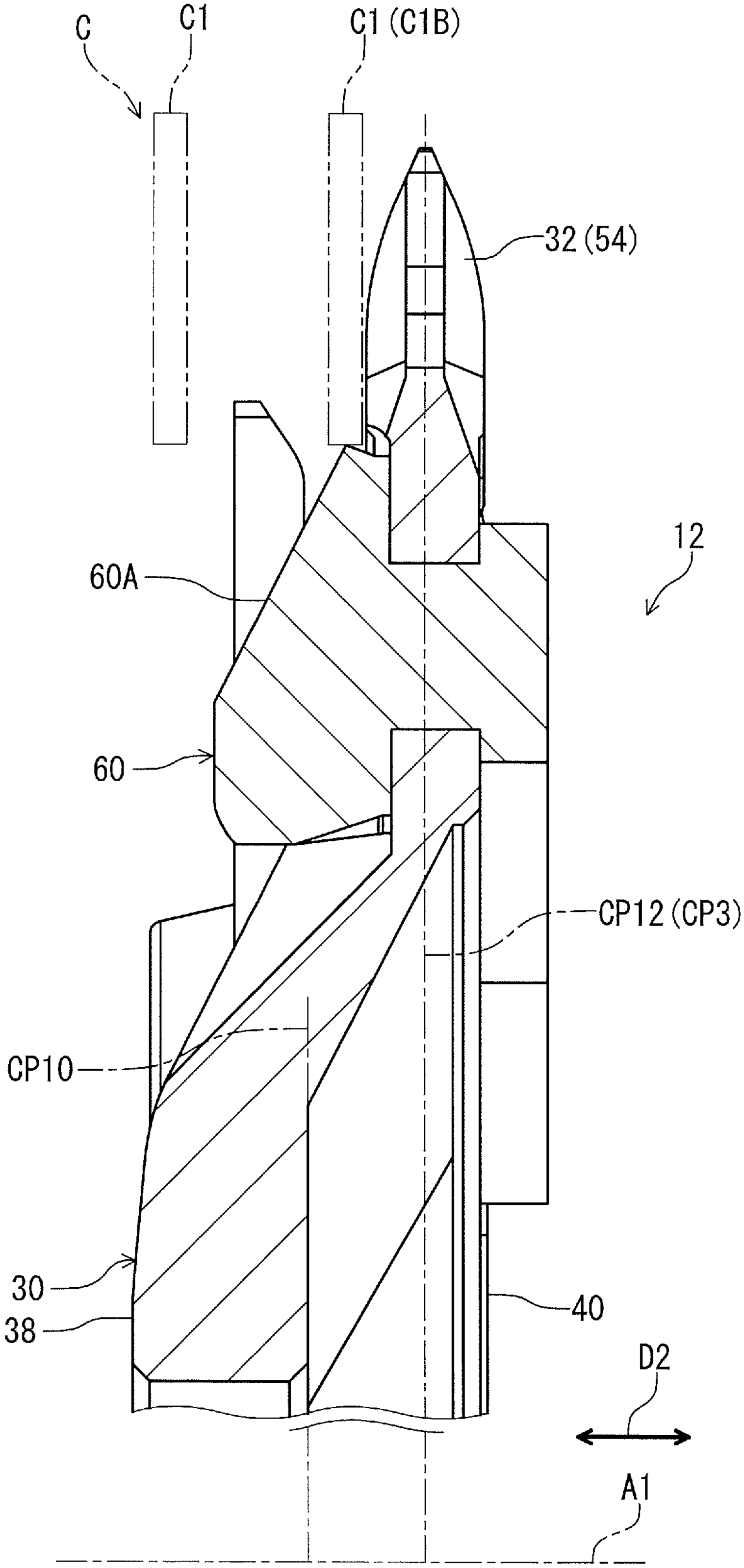
FIG. 24 is a cross-sectional view of the bicycle sprocket illustrated in the FIG. 16 with the bicycle chain (first shifting operation).
Figure 25:
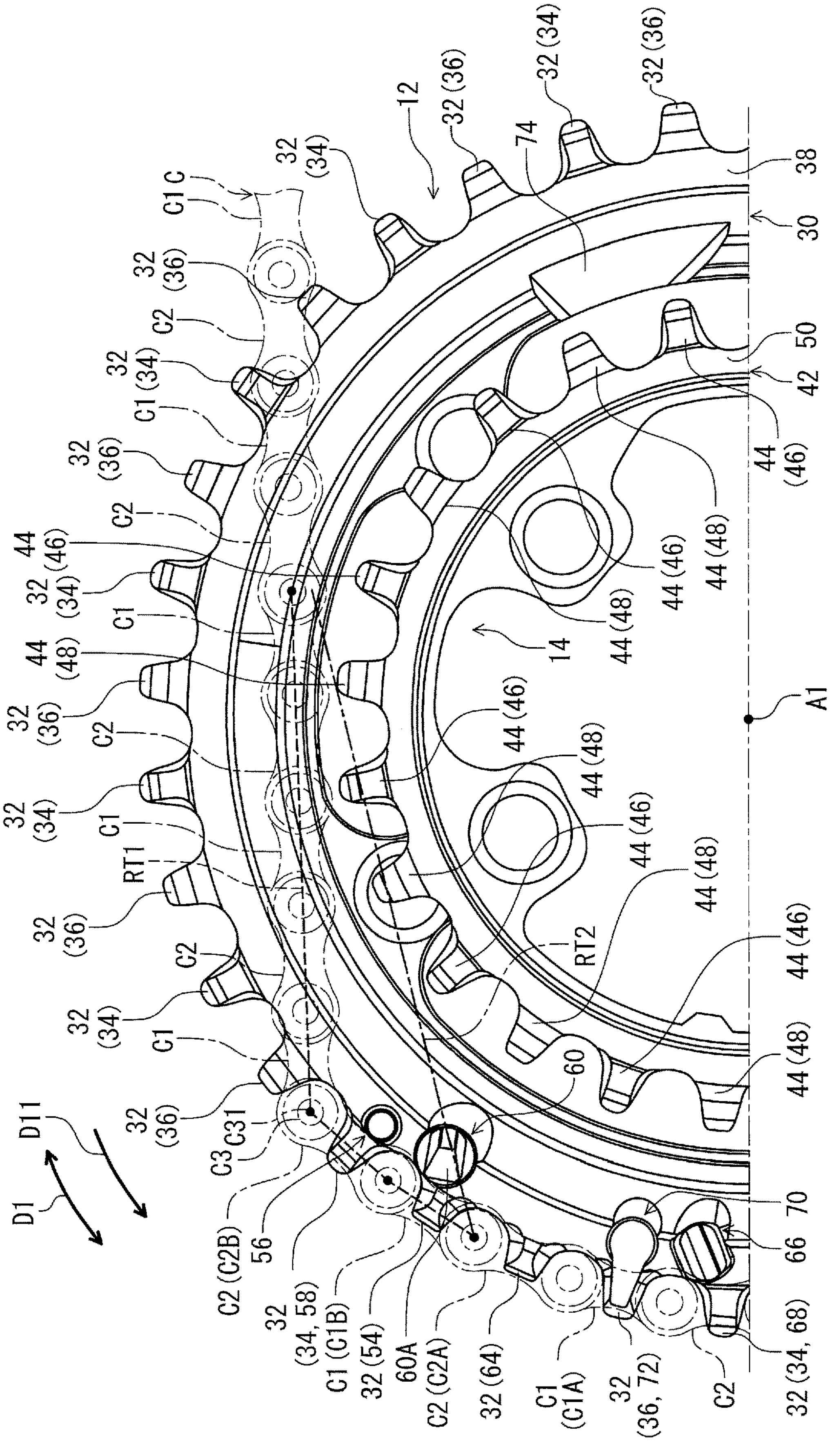
FIG. 25 is a partial side elevational view of the bicycle sprocket and the smaller sprocket of the bicycle crank assembly illustrated in FIG. 1 with the bicycle chain (first shifting operation).

In the first shifting operation, as seen in FIG. 25, the inner link plate C1B is not guided by the contact surface 60A of the bump portion 60 toward the smaller sprocket 14 since the inner link plate C1E is adjacent to or in contact with the first derailing tooth 54. This brings the outer link plate C2B into contact with the shifting facilitation projection 56. Thus, as seen in FIG. 24, the outer link plate C2B is supported by the shifting facilitation projection 56. In this state, the bicycle chain C extends from the shifting facilitation projection 56 on a route RT1 as viewed in the axial direction D2. The route RT1 is different from a route RT2 of the bicycle chain C as viewed in the axial direction D2 in a case where the bicycle sprocket 12 does not include the shifting facilitation projection 56. Specifically, the route RT1 is longer than the route RT2. This easily brings the bicycle chain C into engagement with the second sprocket teeth 44 of the smaller sprocket 14 in the first shifting operation. Accordingly, the shifting facilitation area FA1 facilitates the first shifting operation.

Figure 26:
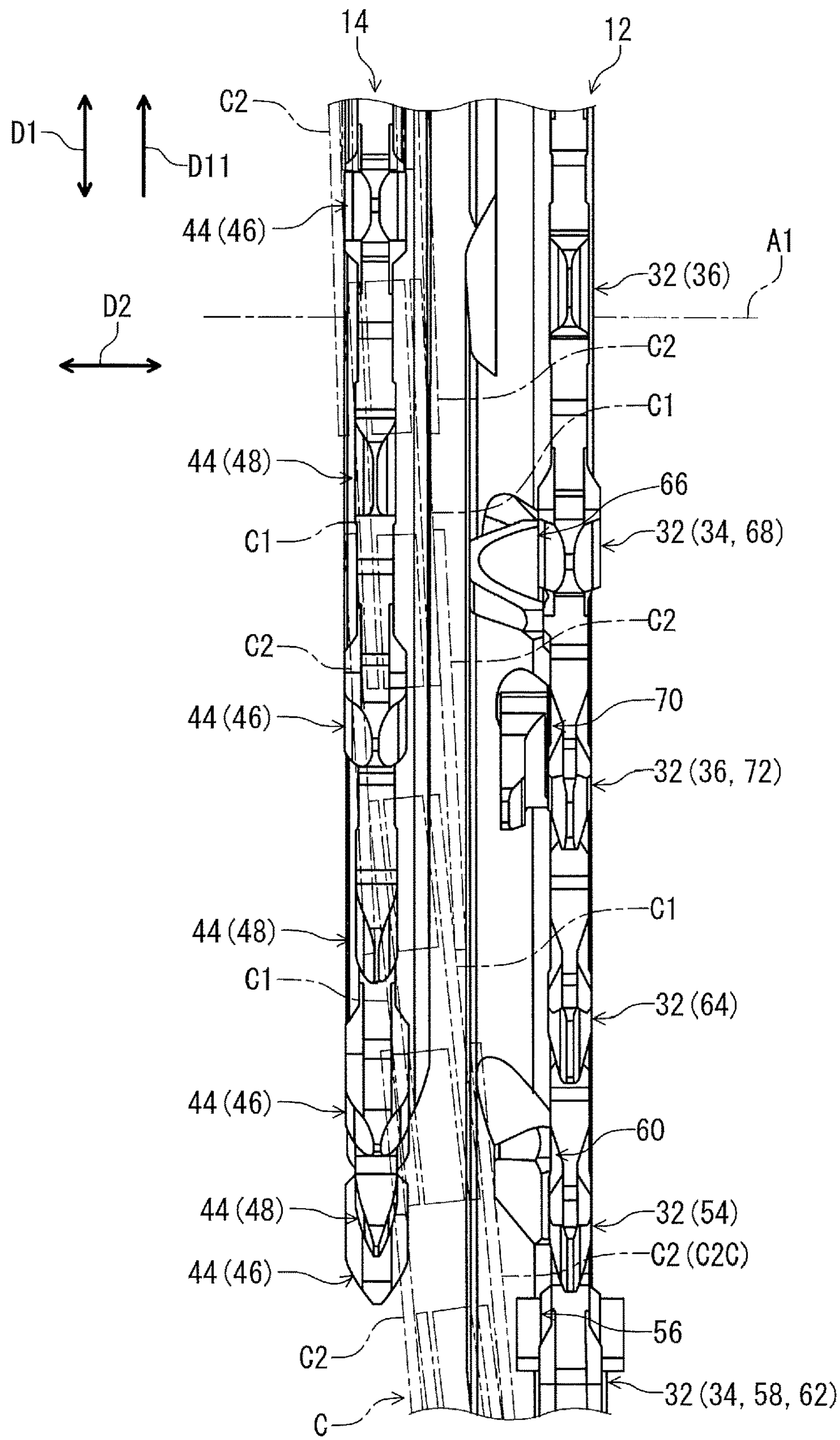
FIG. 26 is a plan view of the bicycle sprocket and the smaller sprocket of the bicycle crank assembly illustrated in FIG. 1 with the bicycle chain (second shifting operation).
Figure 27:
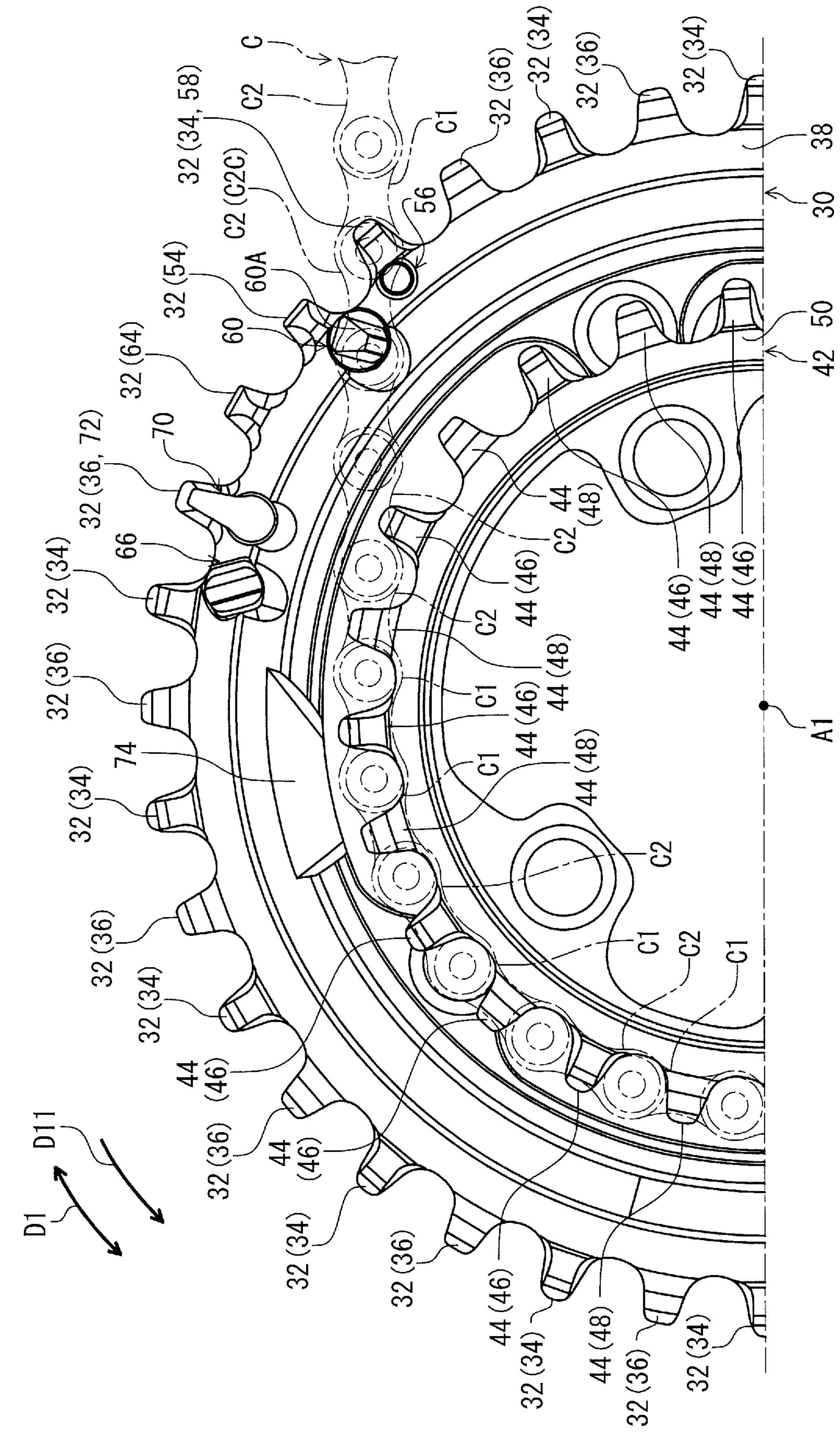
FIG. 27 is a partial side elevational view of the bicycle sprocket and the smaller sprocket of the bicycle crank assembly illustrated in FIG. 1 with the bicycle chain (second shifting operation).
Figure 28:
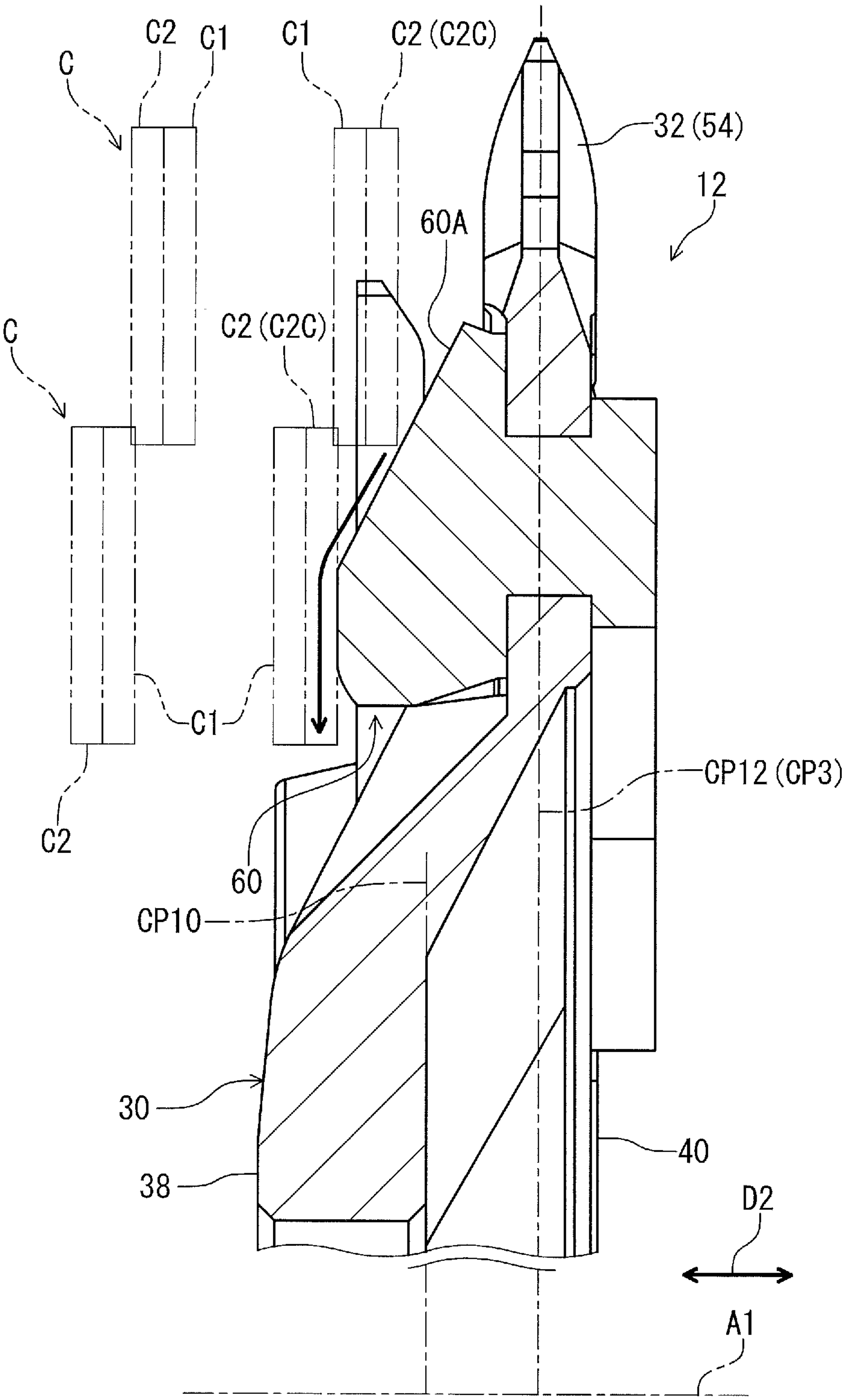
FIG. 28 is a cross-sectional view of the bicycle sprocket illustrated in the FIG. 16 with the bicycle chain (second shifting operation).
Figure 29:
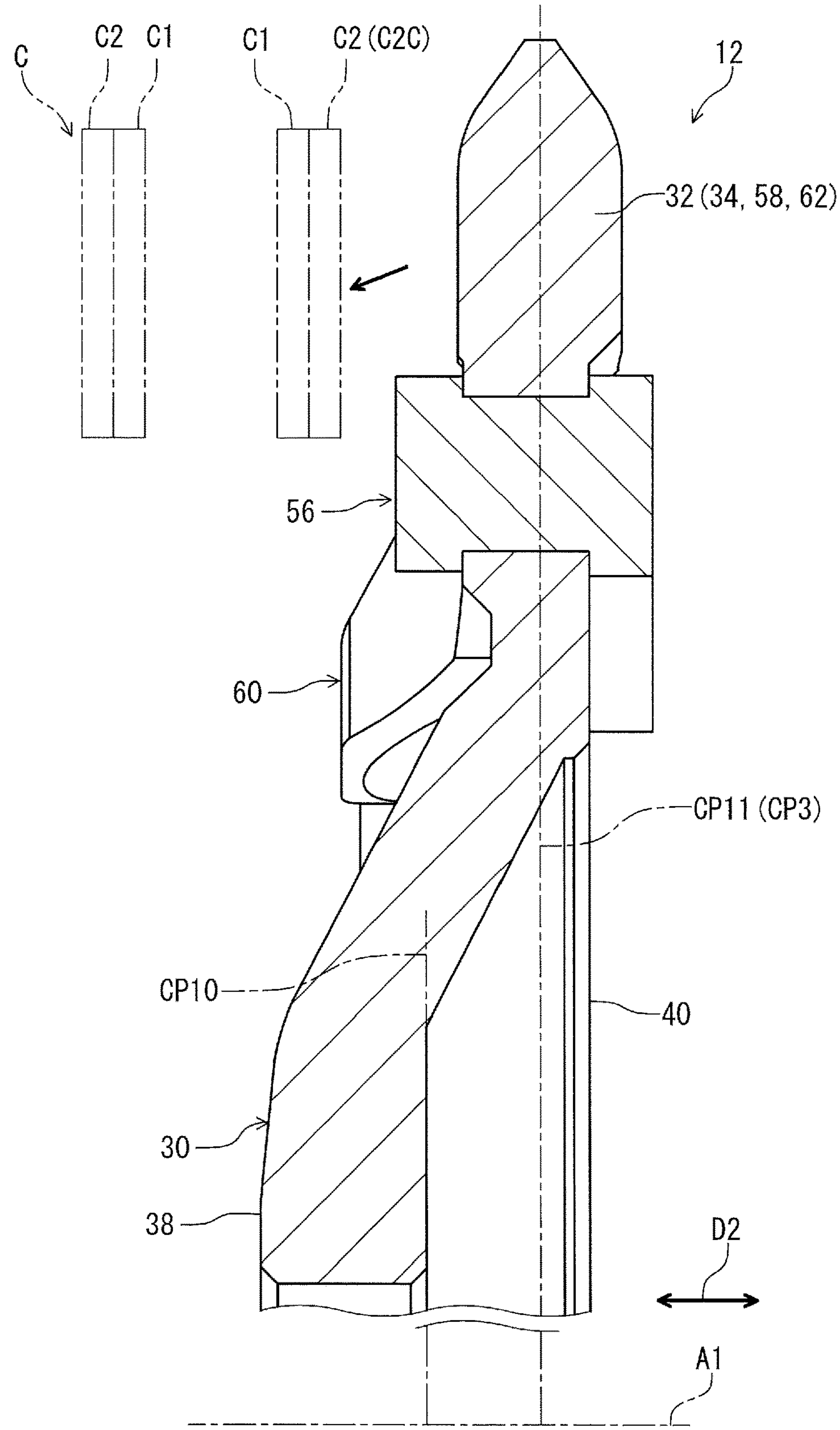
FIG. 29 is a cross-sectional view of the bicycle sprocket illustrated in the FIG. 14 with the bicycle chain (second shifting operation).

As seen in FIG. 26, the bicycle chain C is shifted from the smaller sprocket 14 toward the bicycle sprocket 12 by the front derailleur (not shown) in the second shifting operation. As seen in FIGS. 26 to 28, the outer link plate C2C of the bicycle chain C contacts the bump portion 60 when the bicycle chain C is not engaged with the second shifting facilitation projection 66 and the third shifting facilitation projection 70. As seen in FIG. 28, the outer link plate C2C of the bicycle chain C is moved by the contact surface 60A of the bump portion 60 away from the shifting facilitation projection 56 in the axial direction D2. As seen in FIG. 29, this prevents the bicycle chain C from contacting the shifting facilitation projection 56. In other words, this prevents the bicycle chain C from undesirably engaging with the bicycle sprocket 12 or dropping from the bicycle sprocket 12 by contacting the shifting facilitation projection 56. Accordingly, as seen in FIG. 30, the bicycle chain C can be certainly engaged with the second shifting facilitation projection 66 and the third shifting facilitation projection 70 in the second shifting operation without being lifted by the shifting facilitation projection 56.

Figure 30:
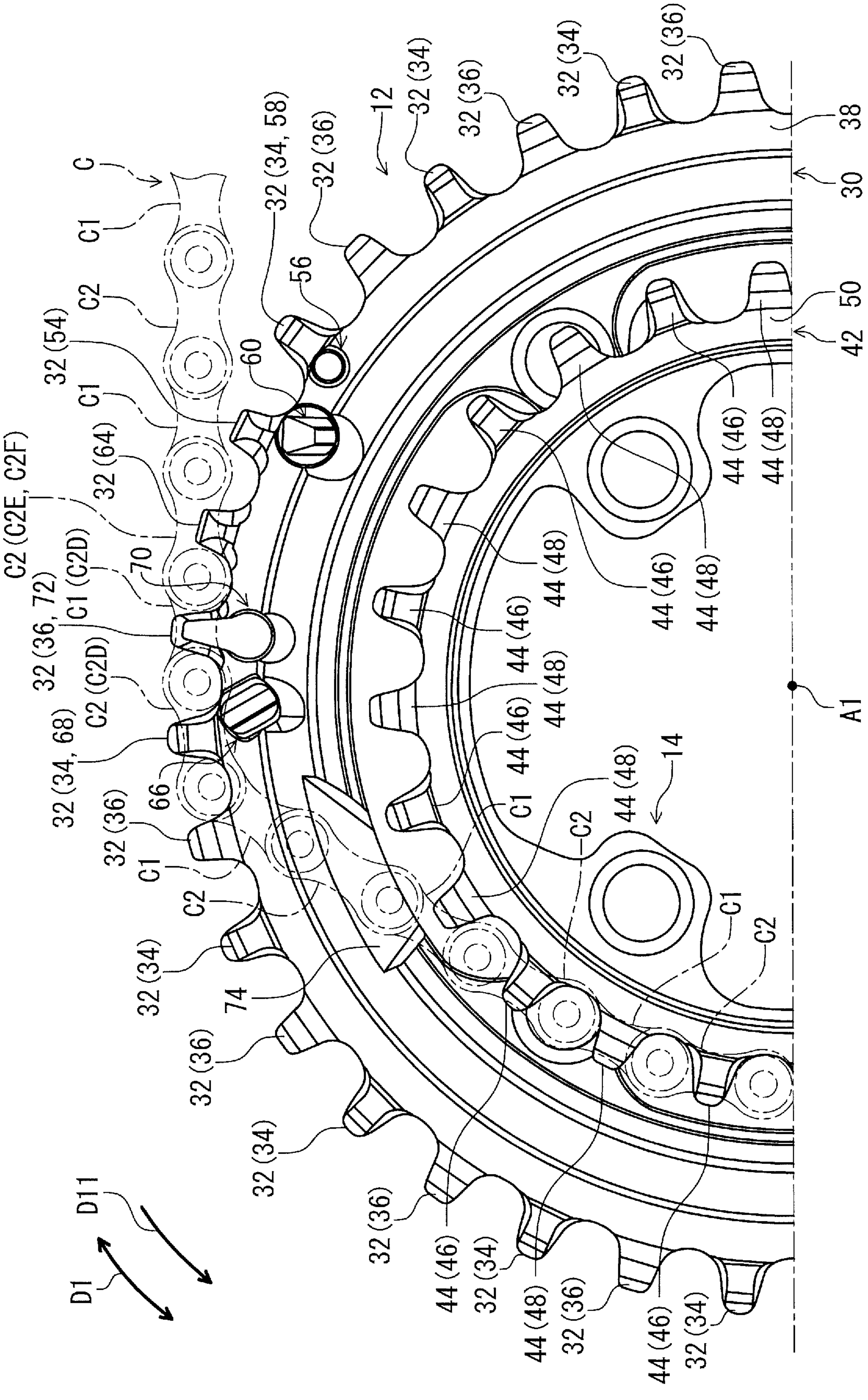
FIG. 30 is a partial side elevational view of the bicycle sprocket and the smaller sprocket of the bicycle crank assembly illustrated in FIG. 1 with the bicycle chain (second shifting operation).

As seen in FIGS. 18 and 30, the outer link plate C2D of the bicycle chain C contacts the second shifting facilitation projection 66 in a state where the bicycle chain C is shifted toward the bicycle sprocket 12 by the front derailleur. The outer link plate C2D of the bicycle chain C is upwardly moved by the second shifting facilitation projection 66 in response to the rotation of the bicycle sprocket 12 in a state where the second shifting facilitation projection 66 is in contact with the outer link plate C2D of the bicycle chain C. At this time, as seen in FIG. 19, the inner link plate C1D is guided toward the third adjacent tooth 72 in the axial direction D2 by the inclined surface 70E of the third shifting facilitation projection 70. Thus, the inner link plate C1D is moved toward the third adjacent tooth 72 in the axial direction D2 by the third shifting facilitation projection 70, causing the third shifting facilitation projection 70 to be inserted into the inner link space C11D of the opposed pair of inner link plates C1D and C1E.

Figure 31:
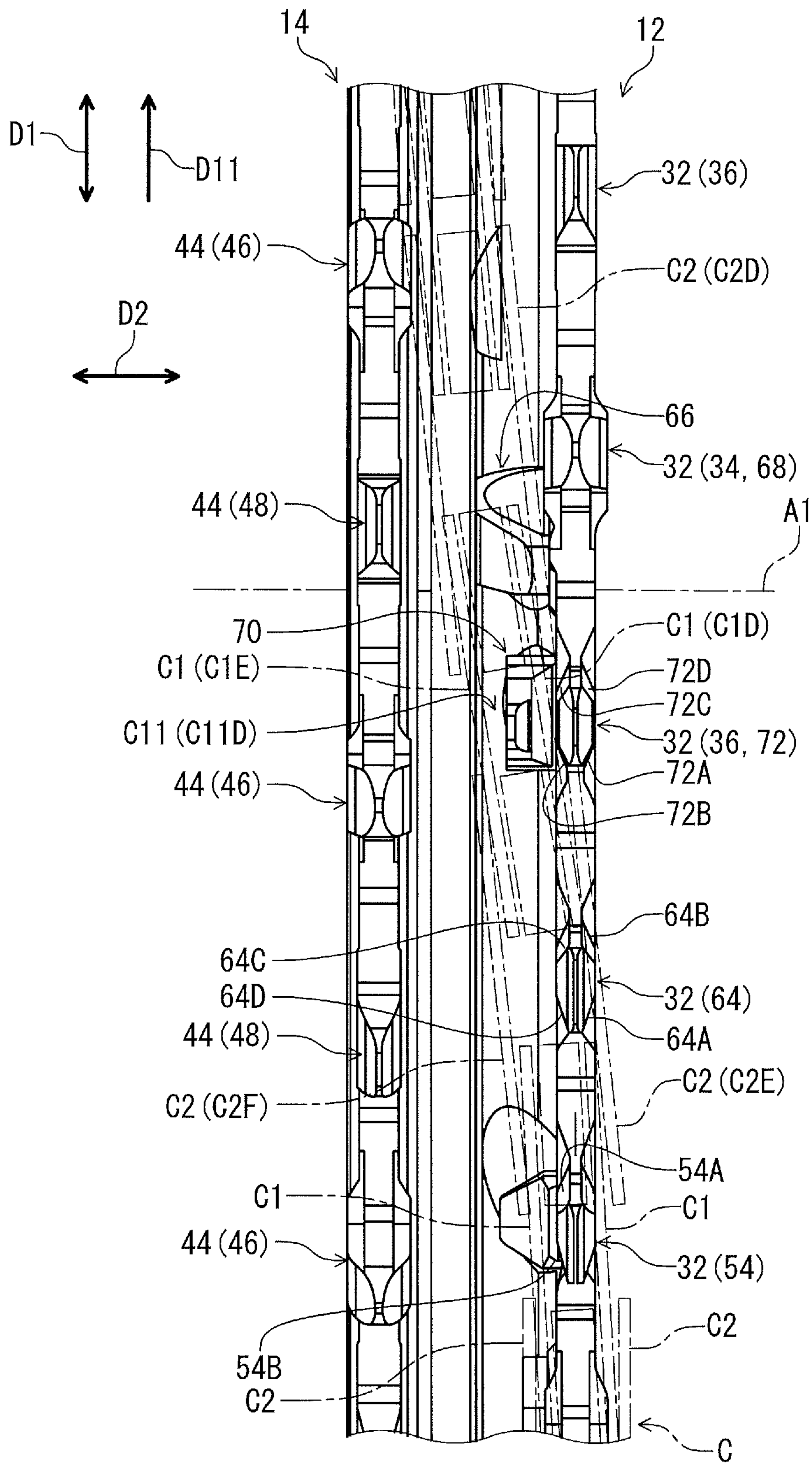
FIG. 31 is a plan view of the bicycle sprocket and the smaller sprocket of the bicycle crank assembly illustrated in FIG. 1 with the bicycle chain (second shifting operation).

In this state, as seen in FIG. 31, the third receiving upstream chamfer 72B facilitates an inclination of the inner link plate C1D of the bicycle chain C relative to the axial direction D2. Thus, the opposed pair of outer link plates C2E and C2F are first received in the second shifting operation by the receiving tooth 64 when the bicycle sprocket 12 further rotates about the rotational center axis A1 in the driving rotational direction D11.

The third shifting facilitation projection 70 is once disengaged from the inner link plates C1D and C1E when the bicycle sprocket 12 further rotates about the rotational center axis A1 in the driving rotational direction D11. After that, as seen in FIG. 22, the third adjacent tooth 72 is inserted into the inner link space C11D of the opposed pair of inner link plates C1D and C1E. This brings the opposed inner link plates C1A and C1B into engagement with the third adjacent tooth 72.

Second Embodiment

A bicycle crank assembly 210 including a bicycle sprocket 212 in accordance with a second embodiment will be described below referring to FIGS. 32 to 47. The bicycle sprocket 212 has the same structure as that of the bicycle sprocket 12 except for the plurality of sprocket teeth 32. Thus, elements having substantially the same function as those in the first embodiment will be numbered the same here, and will not be described again in detail here for the sake of brevity.

Figure 32:
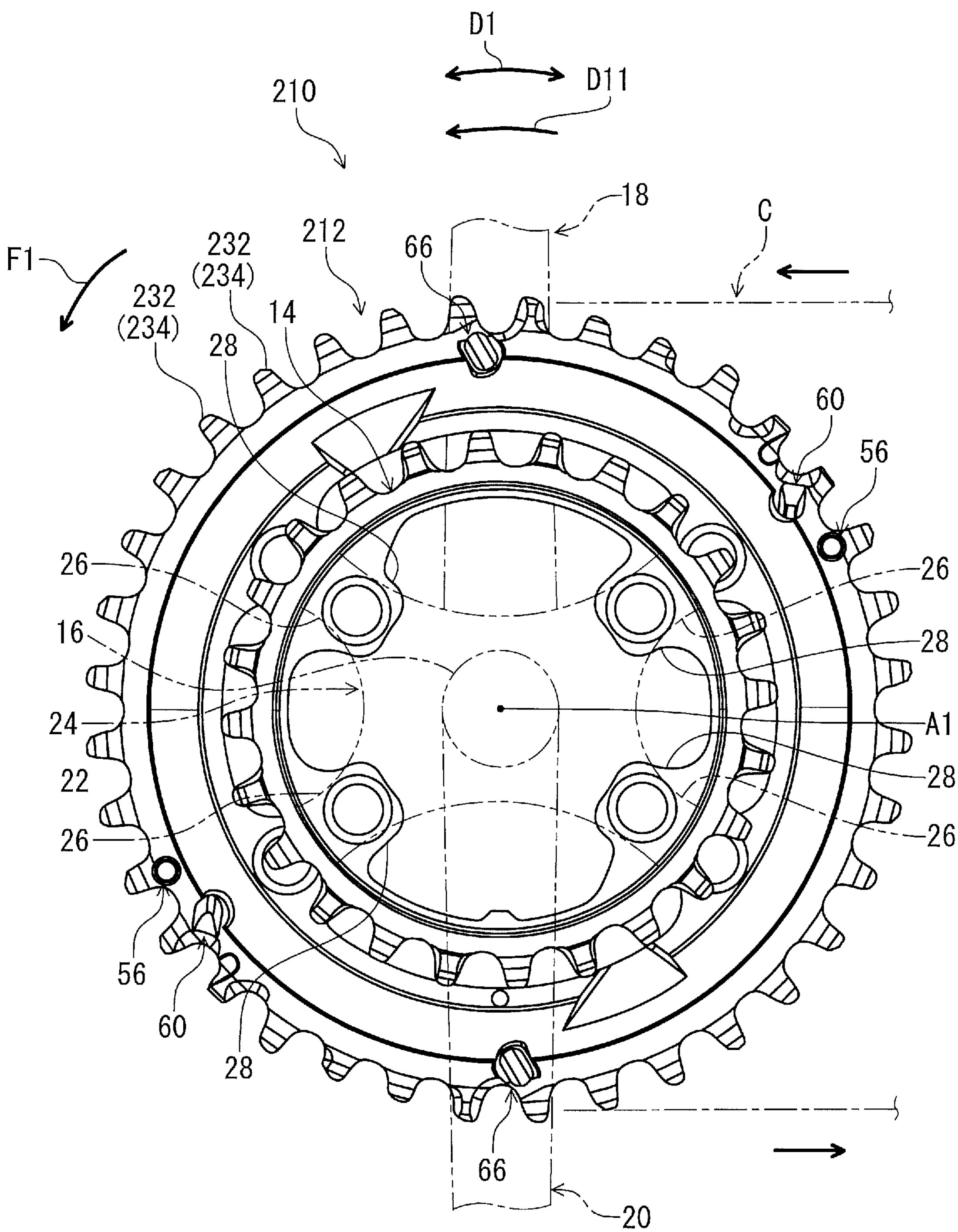
FIG. 32 is a side elevational view of a bicycle crank assembly including a bicycle sprocket in accordance with a second embodiment.
Figure 33:
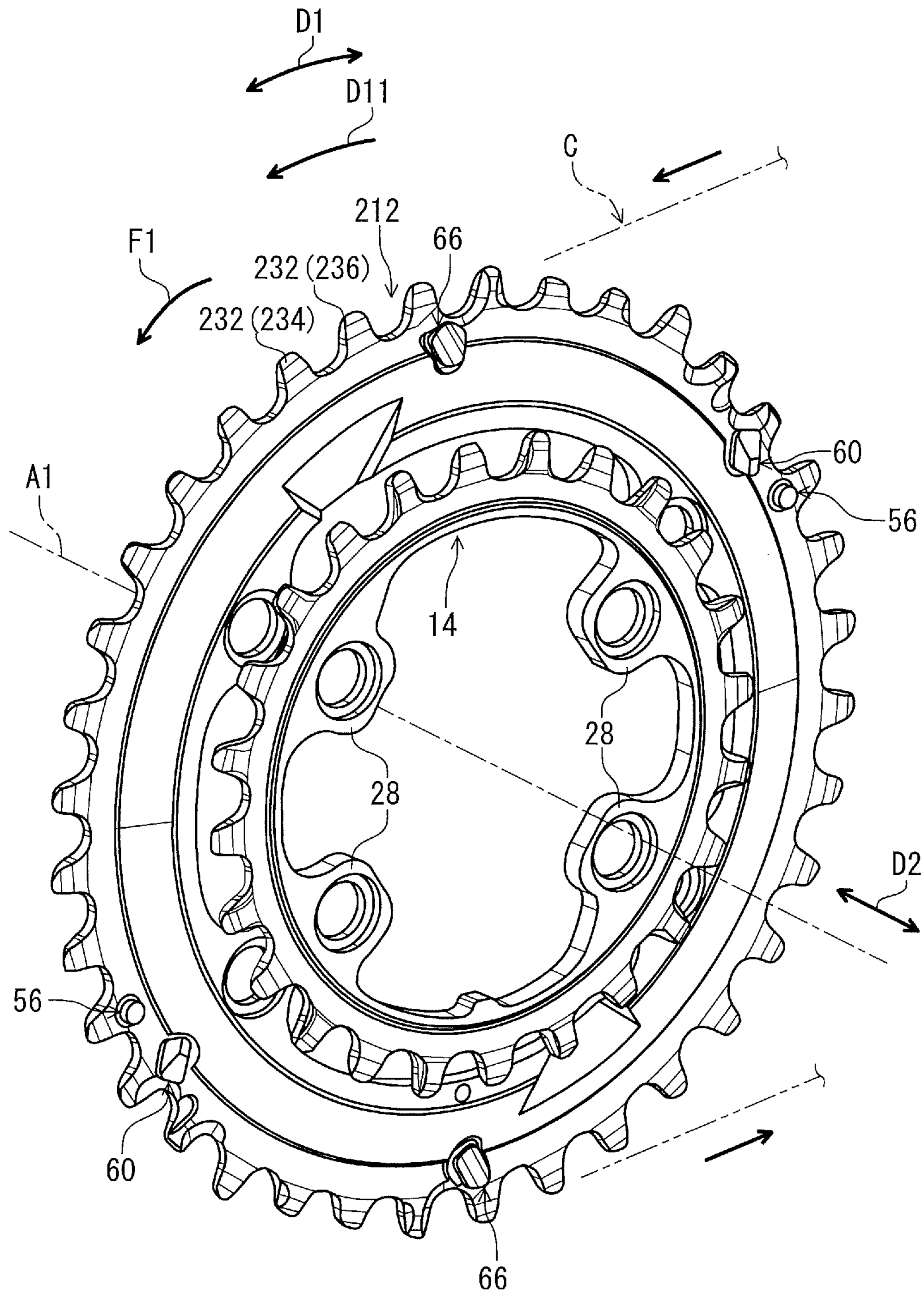
FIG. 33 is a perspective view of the bicycle sprocket and a smaller sprocket of the bicycle crank assembly illustrated in FIG. 32.

As seen in FIGS. 32 and 33, the bicycle crank assembly 210 includes the bicycle sprocket 212 and the smaller sprocket 14. The bicycle sprocket 212 comprises the sprocket body 30, a plurality of sprocket teeth 232, the shifting facilitation projection 56, the bump portion 60, and the second shifting facilitation projection 66. The bicycle sprocket 212 does not comprises the third shifting facilitation projection 70.

Figure 34:
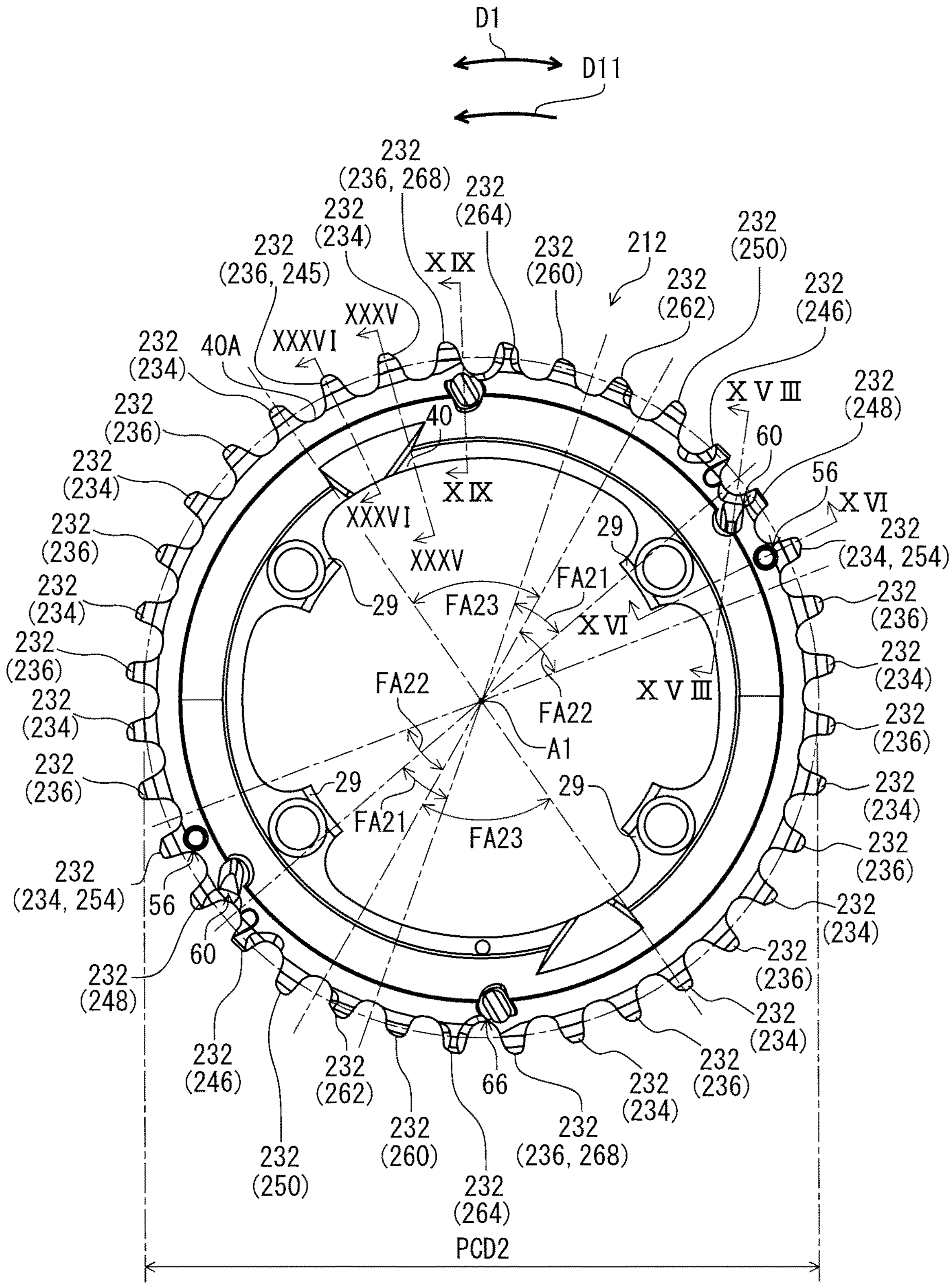
FIG. 34 is a side elevational view of the bicycle sprocket of the bicycle crank assembly illustrated in FIG. 32.

As seen in FIG. 34, the plurality of sprocket teeth 232 has substantially the same structure as that of the plurality of sprocket teeth 32 of the first embodiment. In this embodiment, the plurality of sprocket teeth 232 includes at least one first tooth 234 and at least one second tooth 236. The at least one first tooth 234 includes a plurality of first teeth 234. The at least one second tooth 236 include a plurality of second teeth 236.

Figure 35:
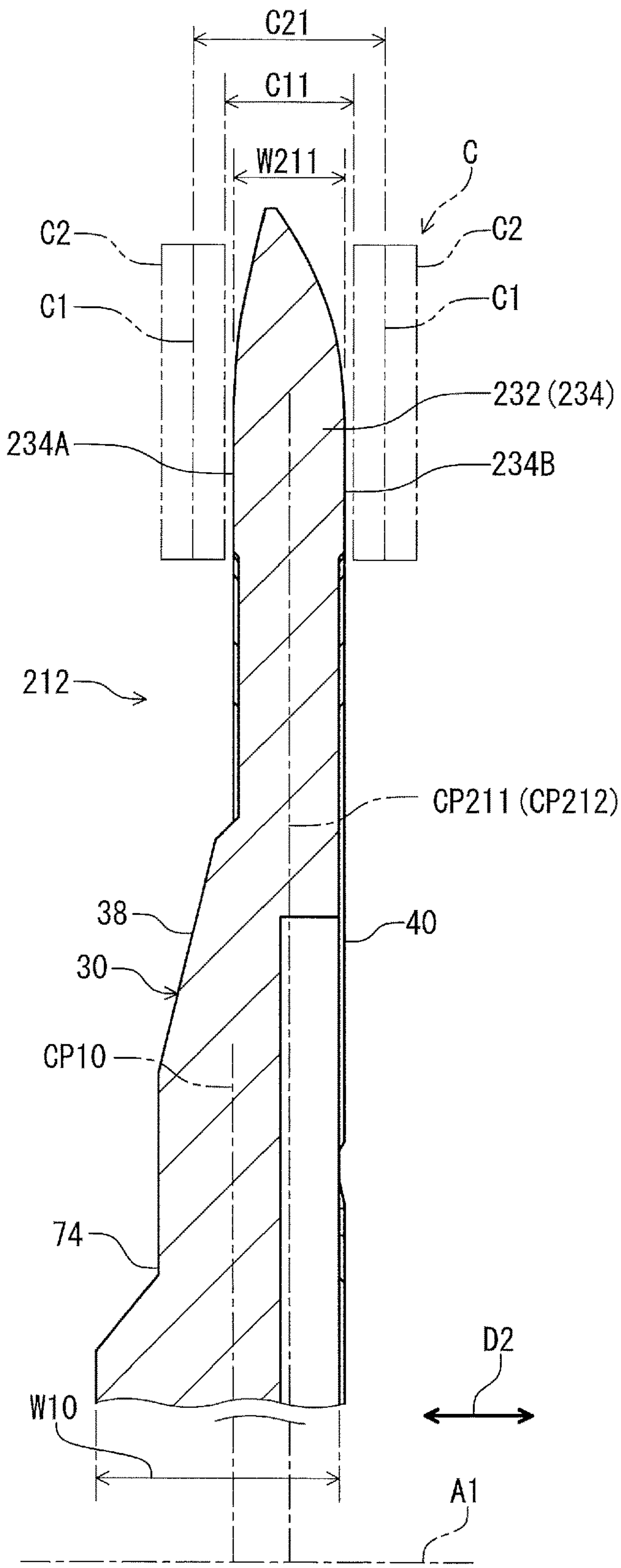
FIG. 35 is a cross-sectional view of the bicycle sprocket taken along line XXXV-XXXV of FIG. 34.

As seen in FIG. 35, the at least one first tooth 234 has a first chain engaging width W211 defined in the axial direction D2. In this embodiment, the first tooth 234 includes a first chain-engagement surface 234A and a first additional chain-engagement surface 234B. The first chain-engagement surface 234A faces in the axial direction D2 and is contactable with the bicycle chain C (e.g., the outer link plate C2). The first additional chain-engagement surface 234B faces in the axial direction D2 and is provided on a reverse side of the first chain-engagement surface 234A in the axial direction D2. The first additional chain-engagement surface 234B is contactable with the bicycle chain C (e.g., the outer link plate C2). The first chain engaging width W211 is defined between the first chain-engagement surface 234A and the first additional chain-engagement surface 234B in the axial direction D2.

The first tooth 234 has a first center plane CP211 defined to bisect the first chain engaging width W211 in the axial direction D2. The first center plane CP211 is perpendicular to the rotational center axis A1. The first center plane CP211 is offset from the first reference center plane CP10 in the axial direction D2. However, the first center plane CP211 can coincide with the first reference center plane CP10 in the axial direction D2. The first tooth 234 has an asymmetrical shape with respect to the first center plane CP211 in the axial direction D2. However, the first tooth 234 can have a symmetrical shape with respect to the first center plane CP211 in the axial direction D2.

Figure 36:
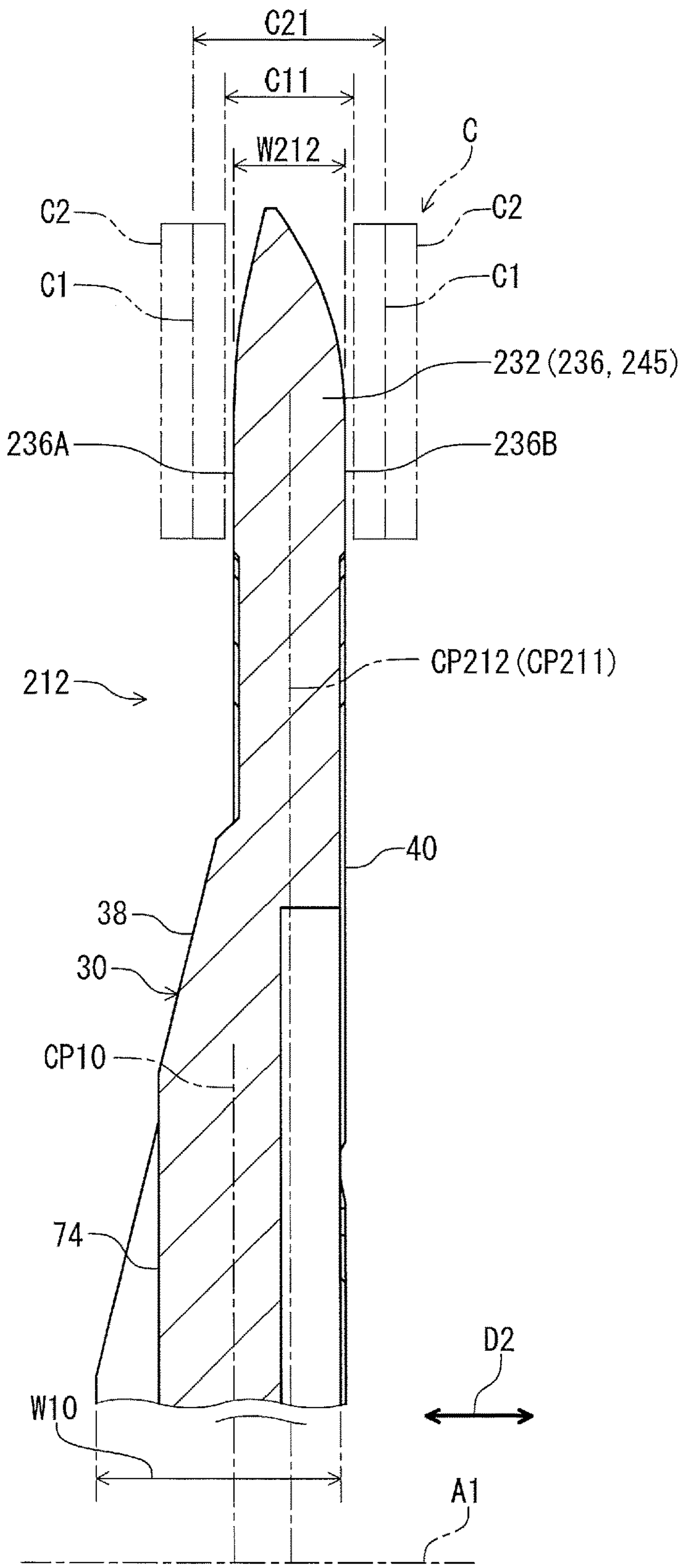
FIG. 36 is a cross-sectional view of the bicycle sprocket taken along line XXXVI-XXXVI of FIG. 34.

As seen in FIG. 36, the at least one second tooth 236 has a second chain engaging width W212 defined in the axial direction D2. In this embodiment, the second tooth 236 includes a second chain-engagement surface 236A and a second additional chain-engagement surface 236B. The second chain-engagement surface 236A faces in the axial direction D2 and is contactable with the bicycle chain C (e.g., the inner link plate C1). The second additional chain-engagement surface 236B faces in the axial direction D2 and is provided on a reverse side of the second chain-engagement surface 236A in the axial direction D2. The second additional chain-engagement surface 236B is contactable with the bicycle chain C (e.g., the inner link plate C1). The second chain engaging width W212 is defined between the second chain-engagement surface 236A and the second additional chain-engagement surface 236B in the axial direction D2.

The second tooth 236 has a second center plane CP212 defined to bisect the second chain engaging width W212 in the axial direction D2. The second center plane CP212 is perpendicular to the rotational center axis A1. The second center plane CP212 is offset from the first reference center plane CP10 in the axial direction D2. However, the second center plane CP212 can coincide with the first reference center plane CP10 in the axial direction D2. The second center plane CP212 coincides with the first center plane CP211. However, the second center plane CP212 can be offset from the first center plane CP211 in the axial direction D2. The second tooth 236 has an asymmetrical shape with respect to the second center plane CP212 in the axial direction D2. However, the second tooth 236 can have a symmetrical shape with respect to the second center plane CP212 in the axial direction D2.

In this embodiment, as seen in FIGS. 35 and 36, the second chain engaging width W212 is equal to the first chain engaging width W211. The first chain engaging width W211 and the second chain engaging width W212 is smaller than the inner link space C11 and the outer link space C21.

As seen in FIG. 34, the bicycle sprocket 212 comprises a first shifting facilitation area FA21 to facilitate a first shifting operation in which the bicycle chain C is shifted from the bicycle sprocket 212 toward the smaller sprocket 14 in a first chain-phase state CS1 (FIG. 37) in which a chain-phase reference tooth 245 of the plurality of sprocket teeth 232 is received in the inner link space C11. The bicycle sprocket 212 comprises a third shifting facilitation area FA23 to facilitate a third shifting operation in which the bicycle chain C is shifted from the bicycle sprocket 212 toward the smaller sprocket 14 in a third chain-phase state CS3 (FIG. 38) in which the chain-phase reference tooth 245 of the plurality of sprocket teeth 232 is received in the outer link space C21. The position of the chain-phase reference tooth 245 is not limited to this embodiment. Another tooth of the sprocket teeth 232 can be defined as the chain-phase reference tooth 245.

Figure 37:
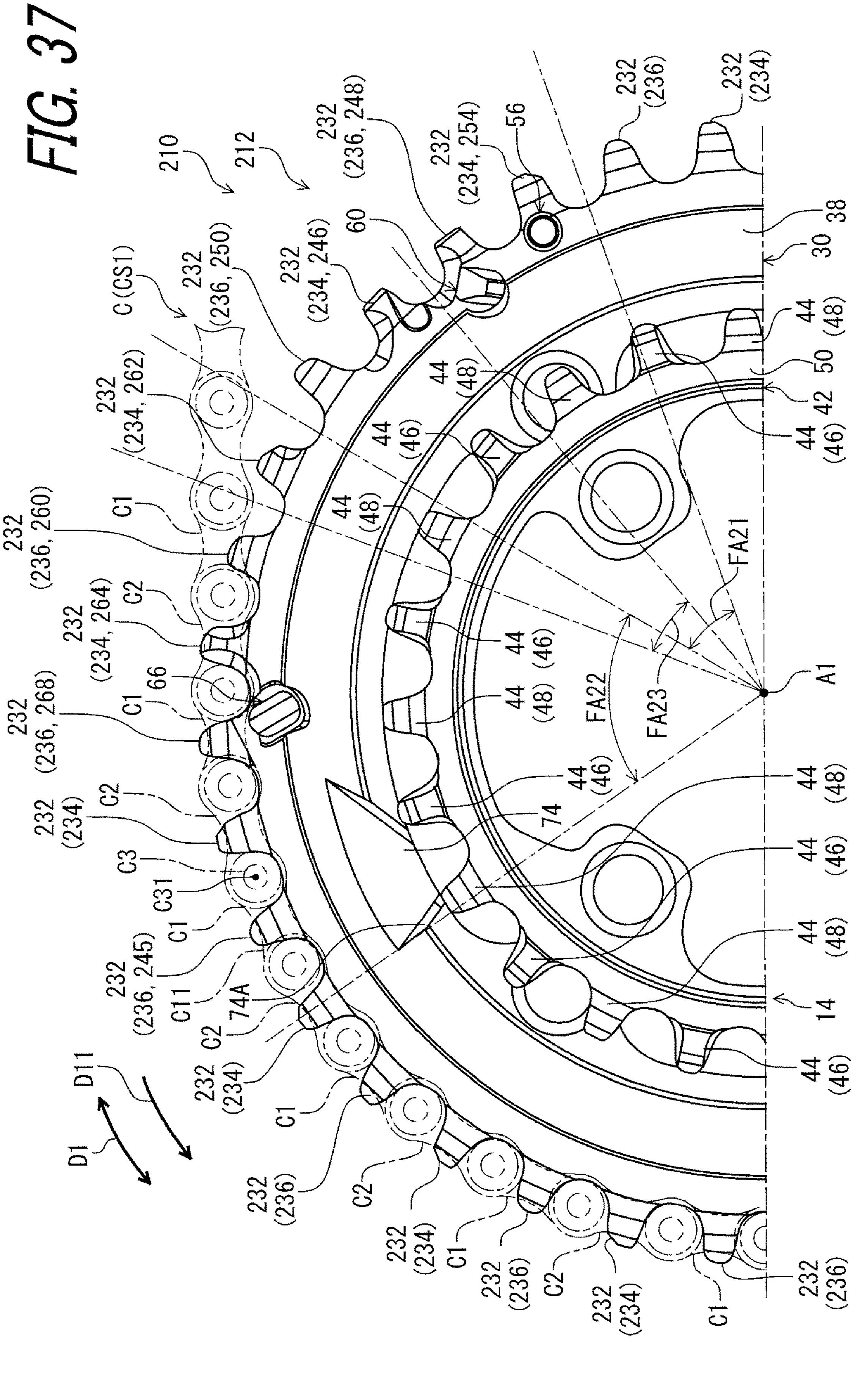
FIG. 37 is a partial side elevational view of the bicycle sprocket and the smaller sprocket of the bicycle crank assembly illustrated in FIG. 32 with the bicycle chain (first chain-phase state).
Figure 38:
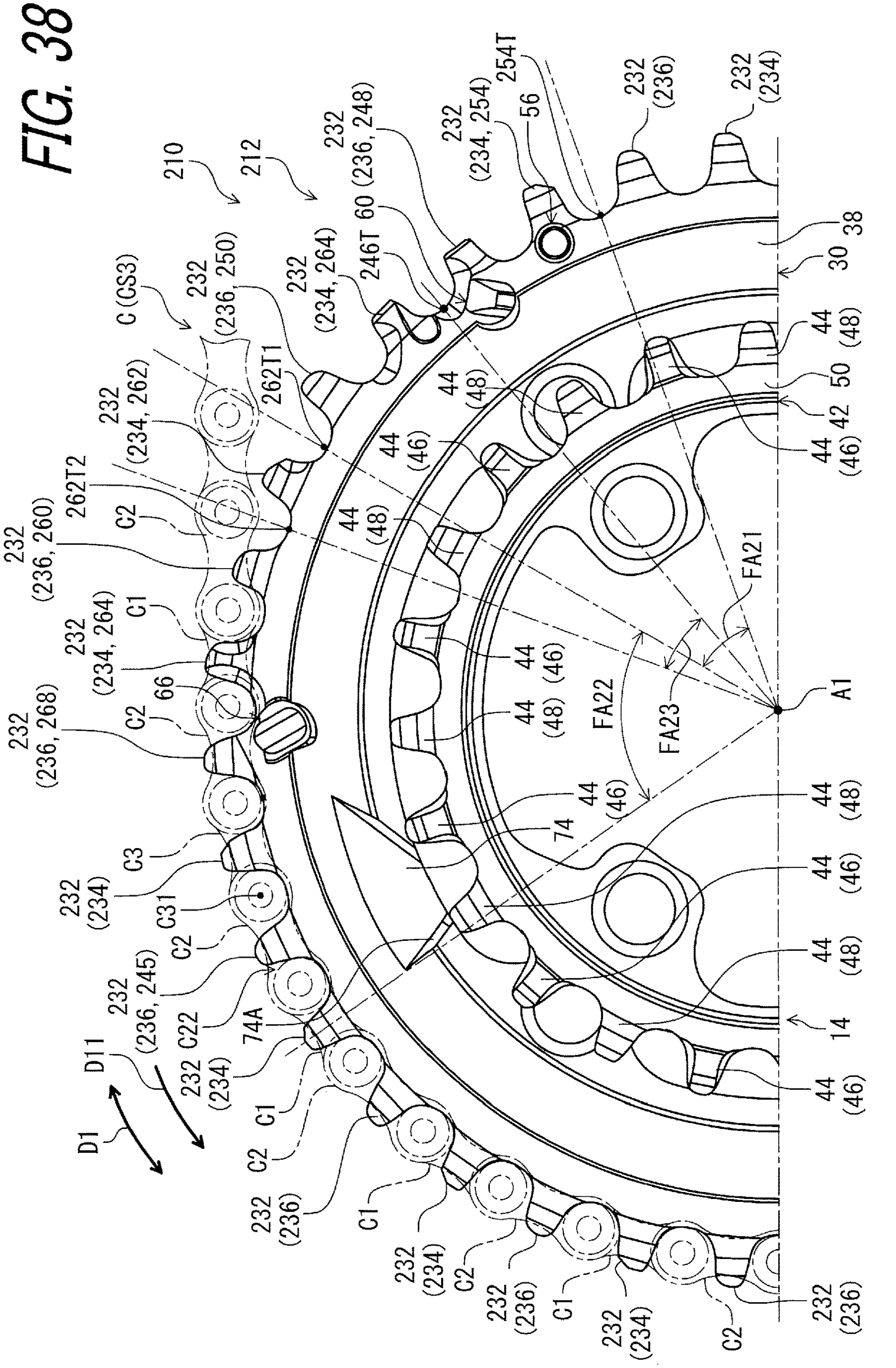
FIG. 38 is a partial side elevational view of the bicycle sprocket and the smaller sprocket of the bicycle crank assembly illustrated in FIG. 32 with the bicycle chain (third chain-phase state).

In this embodiment, the bicycle sprocket 212 comprises a pair of first shifting facilitation areas FA21 to facilitate the first shifting operation in which the bicycle chain C is shifted from the bicycle sprocket 212 toward the smaller sprocket 14 in the first chain-phase state CS1 (FIG. 37). The bicycle sprocket 212 comprises a pair of third shifting facilitation areas FA23 to facilitate the third shifting operation in which the bicycle chain C is shifted from the bicycle sprocket 212 toward the smaller sprocket 14 in the third chain-phase state CS3 (FIG. 38). However, a total number of the first shifting facilitation areas FA21 is not limited to this embodiment. A total number of the third shifting facilitation areas FA23 is not limited to this embodiment.

Figure 39:
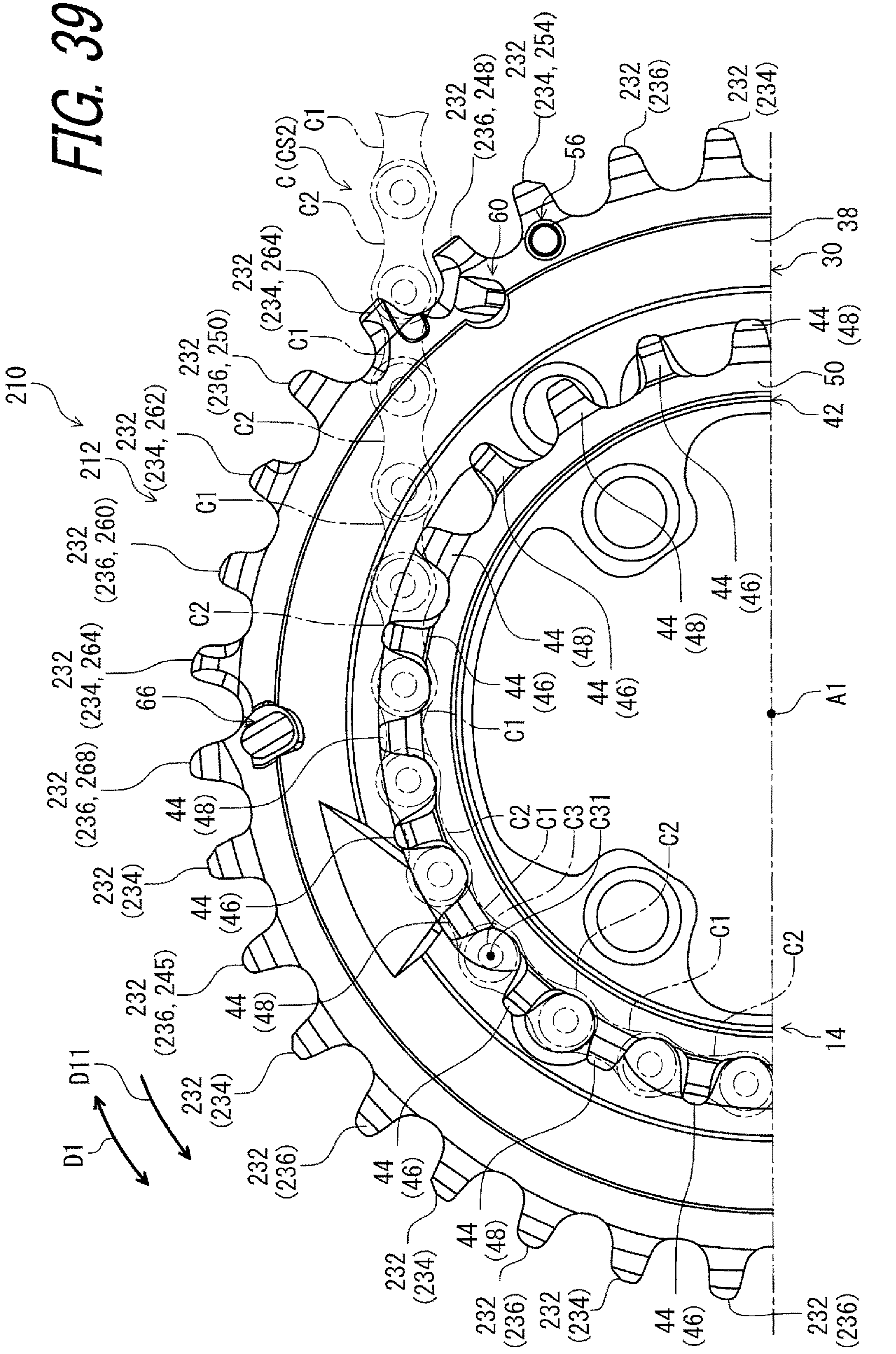
FIG. 39 is a partial side elevational view of the bicycle sprocket and the smaller sprocket of the bicycle crank assembly illustrated in FIG. 32 with the bicycle chain (second chain-phase state).

As seen in FIG. 39, the smaller sprocket 14 has a second chain-phase state CS2 defined by a circumferential positional relationship among the at least one third tooth 46, the pair of outer link plates C2, and the pair of inner link plates C1. In the second chain-phase state CS2, the third tooth 46 is received in the outer link space C21, and the fourth tooth 48 is received in the inner link space C11. As seen in FIG. 37, the smaller sprocket 14 comprises a second shifting facilitation area FA22 to facilitate a second shifting operation in which the bicycle chain C is shifted from the smaller sprocket 14 to the bicycle sprocket 212.

As seen in FIG. 34, the first shifting facilitation area FA21 at least partly overlaps with the third shifting facilitation area FA23 in the circumferential direction D1 defined about the rotational center axis A1. In this embodiment, the first shifting facilitation area FA21 partly overlaps with the third shifting facilitation area FA23 in the circumferential direction D1. The first shifting facilitation area FA21 is provided on an upstream side of the third shifting facilitation area FA23 in the driving rotational direction D11. However, the positional relationship between the first shifting facilitation area FA21 and the third shifting facilitation area FA23 is not limited to this embodiment. For example, the first shifting facilitation area FA21 can entirely overlap with the third shifting facilitation area FA23 in the circumferential direction D1. The first shifting facilitation area FA21 can be spaced apart from the third shifting facilitation area FA23 in the circumferential direction D1 without overlapping with the third shifting facilitation area FA23. The first shifting facilitation area FA21 can be provided on a downstream side of the third shifting facilitation area FA23 in the driving rotational direction D11.

As seen in FIG. 37, the plurality of sprocket teeth 232 includes a first derailing tooth 248 provided on the outer periphery 30A of the sprocket body 30 to first derail the bicycle chain C from the bicycle sprocket 212 in the first shifting operation. The plurality of sprocket teeth 232 further includes a second derailing tooth 246 provided on the outer periphery 30A of the sprocket body 30 to first derail the bicycle chain C from the bicycle sprocket 212 in the third shifting operation in which the bicycle chain C is shifted from the bicycle sprocket 212 toward the smaller sprocket 14. The third shifting operation is different from the first shifting operation concerning a chain phase of the bicycle chain C. The second derailing tooth 246 is adjacent to the first derailing tooth 248 without another tooth between the second derailing tooth 246 and the first derailing tooth 248 in the circumferential direction D1 defined about the rotational center axis A1. However, another tooth can be provided between the second derailing tooth 246 and the first derailing tooth 248 in the circumferential direction D1.

The second derailing tooth 246 is provided on a downstream side of the first derailing tooth 248 in the driving rotational direction D11. The at least one bump portion 60 is at least partly provided between the first derailing tooth 248 and the second derailing tooth 246 in the circumferential direction D1 defined about the rotational center axis A1. In this embodiment, the at least one bump portion 60 is at least partly provided closer to the first derailing tooth 248 than to the second derailing tooth 246 in the circumferential direction D1 defined about the rotational center axis A1. The second derailing tooth 246 is provided on a downstream side of the first derailing tooth 248 in the driving rotational direction D11 without another tooth between the first derailing tooth 248 and the second derailing tooth 246. However, the arrangement of the first derailing tooth 248 and the second derailing tooth 246 is not limited to this embodiment.

Figure 40:
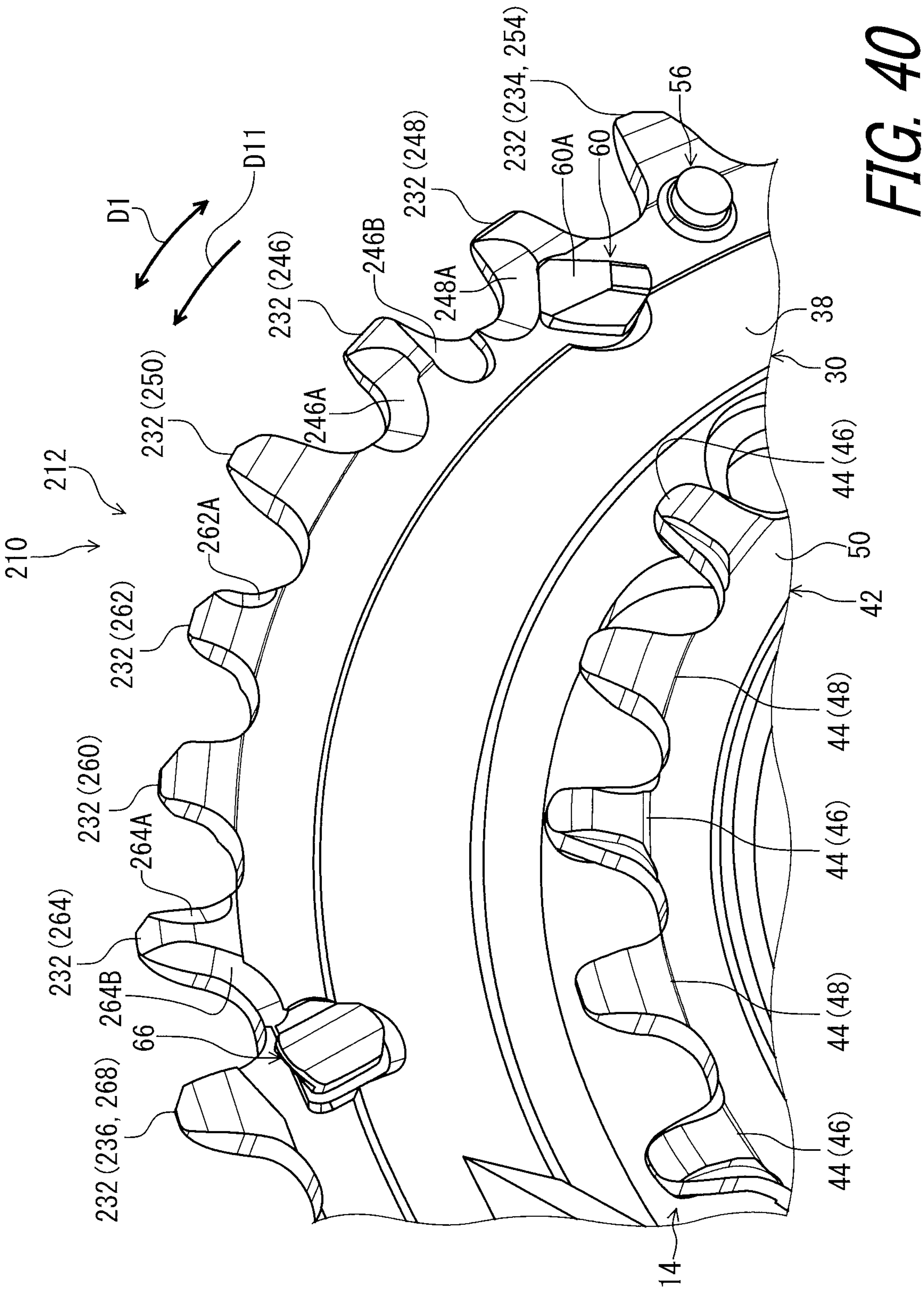
FIG. 40 is a partial perspective view of the bicycle sprocket and the smaller sprocket of the bicycle crank assembly illustrated in FIG. 32.
Figure 41:
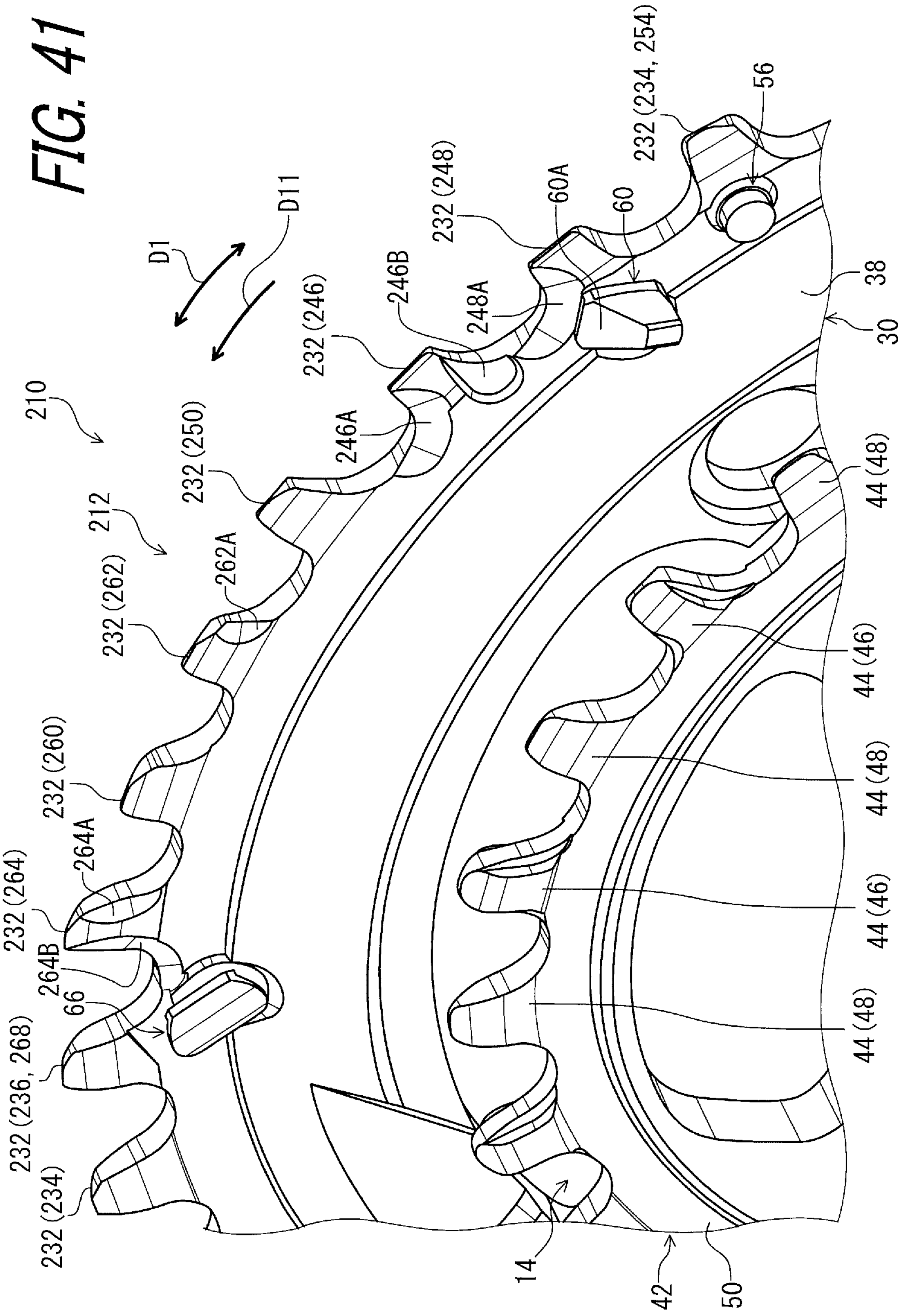
FIG. 41 is another partial perspective view of the bicycle sprocket and a smaller sprocket of the bicycle crank assembly illustrated in FIG. 32.

As seen in FIGS. 40 and 41, the first derailing tooth 248 includes a first downstream chamfer 248A provided on the first axial surface 38. The first downstream chamfer 248A is provided on a downstream side in the first derailing tooth 248 in the driving rotational direction D11 in which the bicycle crank assembly 210 rotates about the rotational center axis A1 during pedaling. The first downstream chamfer 248A reduces interference between the first derailing tooth 248 and the bicycle chain C (e.g., the inner link plate C1) when the first derailing tooth 248 first derails the bicycle chain C from the bicycle sprocket 212 in the first chain-phase state CS1. In other words, the first downstream chamfer 248A can guide the bicycle chain C to be derailed from the first derailing tooth 248 toward the smaller sprocket 14.

The second derailing tooth 246 includes a second downstream chamfer 246A provided on the first axial surface 38. The second downstream chamfer 246A is provided on a downstream side in the second derailing tooth 246 in the driving rotational direction D11. The second downstream chamfer 246A reduces interference between the second derailing tooth 246 and the bicycle chain C (e.g., the inner link plate C1) when the second derailing tooth 246 first derails the bicycle chain C from the bicycle sprocket 212 in the second chain-phase state CS2. In other words, the second downstream chamfer 246A can guide the bicycle chain C to be derailed from the second derailing tooth 246 toward the smaller sprocket 14.

The second derailing tooth 246 includes a second upstream chamfer 246B provided on the first axial surface 38. The second upstream chamfer 246B is provided on an upstream side in the second derailing tooth 246 in the driving rotational direction D11 in which the bicycle crank assembly 210 rotates about the rotational center axis A1 during pedaling. The second upstream chamfer 246B facilitates a bend of the bicycle chain C toward the smaller sprocket 14 in order to smoothly guide the bicycle chain C toward the smaller sprocket 14 in the first shifting operation.

Figure 42:
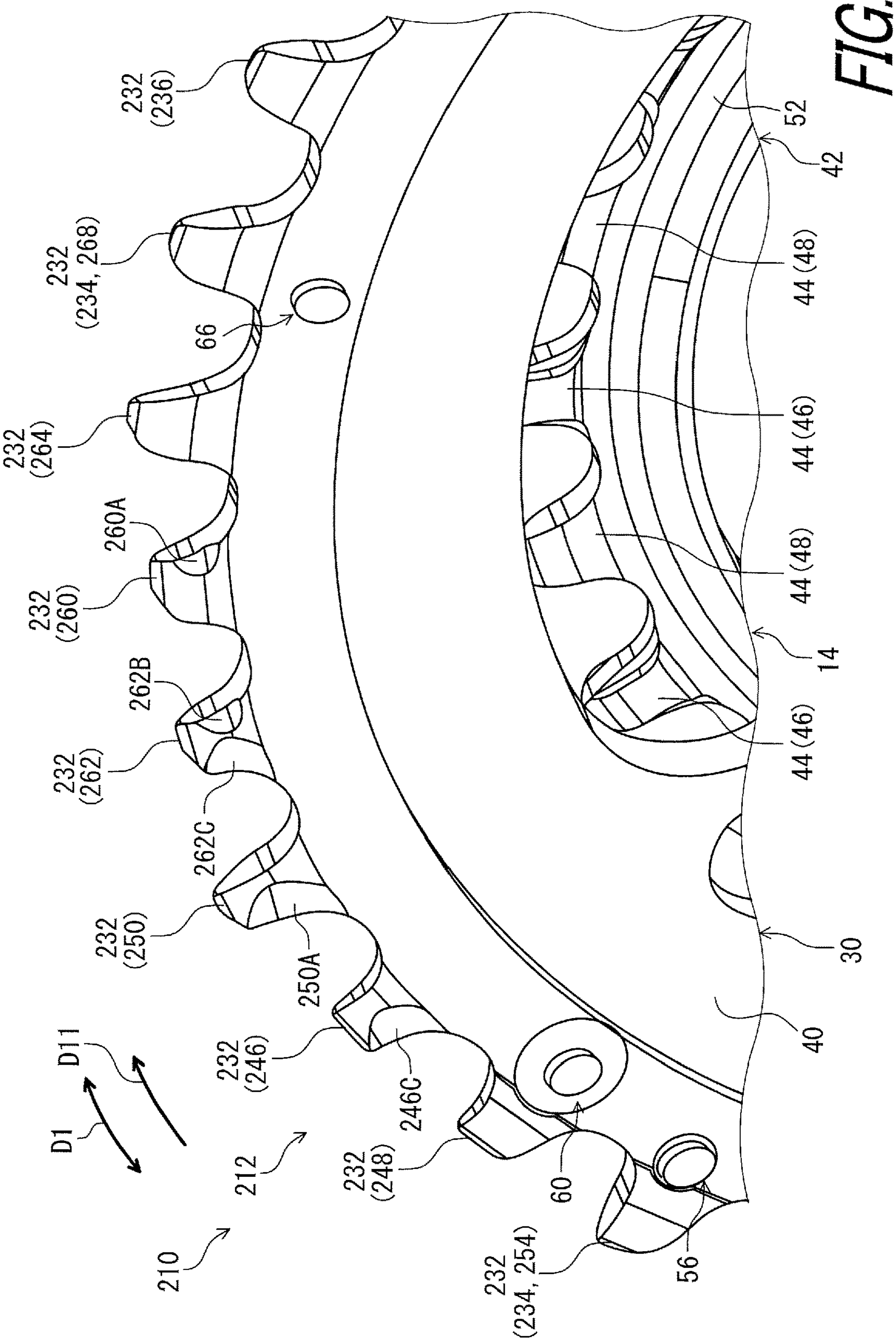
FIG. 42 is another partial perspective view of the bicycle sprocket and the smaller sprocket of the bicycle crank assembly illustrated in FIG. 32.

As seen in FIG. 42, the second derailing tooth 246 includes a second reverse upstream chamfer 246C provided on the first reverse axial surface 40. The second reverse upstream chamfer 246C is provided on an upstream side in the second derailing tooth 246 in the driving rotational direction D11 in which the bicycle crank assembly 210 rotates about the rotational center axis A1 during pedaling. The second reverse upstream chamfer 246C reduces interference between the first derailing tooth 248 and the bicycle chain C (e.g., the inner link plate C1) when the first derailing tooth 248 first derails the bicycle chain C from the bicycle sprocket 212 in the first chain-phase state CS1. In other words, the second reverse upstream chamfer 246C facilitates the bicycle chain C to be moved toward the smaller sprocket 14 in the third shifting operation.

In this embodiment, the second derailing tooth 246 includes the second downstream chamfer 246A, the second upstream chamfer 246B, and the second reverse upstream chamfer 246C. The first derailing tooth 248 includes the first downstream chamfer 248A. However, at least one of the second downstream chamfer 246A, the second upstream chamfer 246B, and the second reverse upstream chamfer 246C can be omitted from the second derailing tooth 246. The first downstream chamfer 248A can be omitted from the first derailing tooth 248.

As seen in FIG. 37, the plurality of sprocket teeth 232 includes a derailing facilitation tooth 250. The derailing facilitation tooth 250 is provided in the first shifting facilitation area FA21 to facilitate derailing of the bicycle chain C at the second derailing tooth 246 from the bicycle sprocket 212 in the first shifting operation. The derailing facilitation tooth 250 is also provided in the third shifting facilitation area FA23 to facilitate derailing of the bicycle chain C at the first derailing tooth 248 from the bicycle sprocket 212 in the third shifting operation. The derailing facilitation tooth 250 is provided on a downstream side of the second derailing tooth 246 in the driving rotational direction D11. The derailing facilitation tooth 250 is provided on a downstream side of the first derailing tooth 248 in the driving rotational direction D11. The derailing facilitation tooth 250 is adjacent to the second derailing tooth 246 without another tooth between the second derailing tooth 246 and the derailing facilitation tooth 250 in the circumferential direction D1. However, another tooth can be provided between the second derailing tooth 246 and the derailing facilitation tooth 250 in the circumferential direction D1.

The derailing facilitation tooth 250 includes a second reverse upstream chamfer 250A provided on the first reverse axial surface 40. The second reverse upstream chamfer 250A is provided on an upstream side in the derailing facilitation tooth 250 in the driving rotational direction D11. The second reverse upstream chamfer 250A reduces interference between the second derailing tooth 246 and the bicycle chain C (e.g., the inner link plate C1) when the second derailing tooth 246 first derails the bicycle chain C from the bicycle sprocket 212 in the first shifting operation. In other words, the second reverse upstream chamfer 250A facilitates the bicycle chain C to be moved toward the smaller sprocket 14 during the first shifting operation. The second reverse upstream chamfer 250A also reduces interference between the first derailing tooth 248 and the bicycle chain C (e.g., the inner link plate C1) when the first derailing tooth 248 first derails the bicycle chain C from the bicycle sprocket 212 in the third shifting operation. In other words, the second reverse upstream chamfer 250A facilitates the bicycle chain C to be moved toward the smaller sprocket 14 in the third shifting operation. However, the second reverse upstream chamfer 250A can be omitted from the derailing facilitation tooth 250.

As seen in FIG. 38, the plurality of sprocket teeth 232 includes an adjacent tooth 254 closest to the shifting facilitation projection 56 among the plurality of sprocket teeth 232. The first derailing tooth 248 is adjacent to the adjacent tooth 254 without another tooth between the first derailing tooth 248 and the adjacent tooth 254 in the driving rotational direction D11. The first derailing tooth 248 is provided on a downstream side of the adjacent tooth 254 in the driving rotational direction D11. However, the positional relationship between the shifting facilitation projection 56 and the first derailing tooth 248 is not limited to this embodiment. In a case where the smaller sprocket 14 and the bicycle sprocket 212 each have a predetermined total number of teeth, the positional relationship between the first derailing tooth 248 and the adjacent tooth 254 is not limited to this embodiment. In the case where the smaller sprocket 14 and the bicycle sprocket 212 each have the predetermined total number of teeth, the shifting facilitation projection 56 can be omitted from the bicycle sprocket 212.

As seen in FIGS. 40 and 41, the plurality of sprocket teeth 232 includes an outer-link receiving tooth 260 and an inner-link receiving tooth 262. The outer-link receiving tooth 260 is provided in a second shifting facilitation area FA22 to first receive the pair of outer link plates C2 of the bicycle chain C in the second shifting operation in which the bicycle chain C is shifted from the smaller sprocket 14 to the bicycle sprocket 212. The inner-link receiving tooth 262 is provided in the second shifting facilitation area FA22 to first receive the pair of inner link plates C1 of the bicycle chain C in the second shifting operation. Furthermore, the inner-link receiving tooth 262 is provided in the first shifting facilitation area FA21 to facilitate derailing of the bicycle chain C at the second derailing tooth 246 from the bicycle sprocket 212 in the first shifting operation.

The inner-link receiving tooth 262 is adjacent to the derailing facilitation tooth 250 without another tooth between the derailing facilitation tooth 250 and the inner-link receiving tooth 262 in the circumferential direction D1. The outer-link receiving tooth 260 is adjacent to the inner-link receiving tooth 262 without another tooth between the outer-link receiving tooth 260 and the inner-link receiving tooth 262 in the circumferential direction D1.

As seen in FIGS. 40 and 41, the inner-link receiving tooth 262 includes an inner-link upstream chamfer 262A provided on the first axial surface 38. The inner-link upstream chamfer 262A is provided on an upstream side in the inner-link receiving tooth 262 in the driving rotational direction D11. The inner-link upstream chamfer 262A reduces interference between the inner-link receiving tooth 262 and the bicycle chain C (e.g., the inner link plate C1) when the inner-link receiving tooth 262 first receives the pair of inner link plates C1 in the second shifting operation.

The inner-link receiving tooth 262 includes an inner-link downstream chamfer 262B provided on the first reverse axial surface 40. The inner-link downstream chamfer 262B is provided on a downstream side in the inner-link receiving tooth 262 in the driving rotational direction D11. The inner-link downstream chamfer 262B reduces interference between the inner-link receiving tooth 262 and the bicycle chain C (e.g., the inner link plate C1) when the inner-link receiving tooth 262 first receives the pair of inner link plates C1 in the second shifting operation.

As seen in FIG. 42, the inner-link receiving tooth 262 includes an inner-link reverse upstream chamfer 262C provided on the first reverse axial surface 40. The inner-link reverse upstream chamfer 262C is provided on an upstream side in the inner-link receiving tooth 262 in the driving rotational direction D11. The inner-link reverse upstream chamfer 262C reduces interference between the second derailing tooth 246 and the bicycle chain C (e.g., the outer link plate C2) when the second derailing tooth 246 first derails the bicycle chain C from the bicycle sprocket 212 in the second chain-phase state CS2. In other words, the inner-link reverse upstream chamfer 262C facilitates the bicycle chain C to be moved toward the smaller sprocket 14 during the first shifting operation.

In this embodiment, the inner-link receiving tooth 262 includes the inner-link upstream chamfer 262A, the inner-link downstream chamfer 262B, and the inner-link reverse upstream chamfer 262C. However, at least one of the inner-link upstream chamfer 262A, the inner-link downstream chamfer 262B, and the inner-link reverse upstream chamfer 262C can be omitted from the inner-link receiving tooth 262.

The outer-link receiving tooth 260 includes an outer-link downstream chamfer 260A provided on the first reverse axial surface 40. The outer-link downstream chamfer 260A is provided on a downstream side in the outer-link receiving tooth 260 in the driving rotational direction D11. The outer-link downstream chamfer 260A reduces interference between the outer-link receiving tooth 260 and the bicycle chain C (one of the outer link plates C2) when the outer-link receiving tooth 260 first receives the pair of outer link plates C2 in the second shifting operation. However, the outer-link downstream chamfer 260A can be omitted from the outer-link receiving tooth 260.

As seen in FIGS. 40 and 41, the plurality of sprocket teeth 232 includes a receiving facilitation tooth 264. The receiving facilitation tooth 264 is provided in the second shifting facilitation area FA22 to facilitate receiving of the bicycle chain C at the outer-link receiving tooth 260 and the inner-link receiving tooth 262 in the second shifting operation. The receiving facilitation tooth 264 is adjacent to the outer-link receiving tooth 260 without another tooth between the outer-link receiving tooth 260 and the receiving facilitation tooth 264 in the circumferential direction D1.

The receiving facilitation tooth 264 includes an upstream facilitation chamfer 264A and a downstream facilitation chamfer 264B. The upstream facilitation chamfer 264A is provided on an upstream side in the receiving facilitation tooth 264 in the driving rotational direction D11. The downstream facilitation chamfer 264B is provided on a downstream side in the receiving facilitation tooth 264 in the driving rotational direction D11. The upstream facilitation chamfer 264A is provided on the first axial surface 38 to reduce interference between the outer-link receiving tooth 260 and the bicycle chain C (the outer link plate C2) in the second shifting operation. The downstream facilitation chamfer 264B is provided on the first axial surface 38 to reduce interference between the receiving facilitation tooth 264 and the bicycle chain C (the outer link plate C2) in the second shifting operation.

As seen in FIG. 37, the bicycle sprocket 212 comprises an additional shifting facilitation projection 266 provided in the second shifting facilitation area FA22 to facilitate the second shifting operation. The additional shifting facilitation projection 266 is provided on a downstream side of the outer-link receiving tooth 260, the inner-link receiving tooth 262, and the receiving facilitation tooth 264 in the driving rotational direction D11. The additional shifting facilitation projection 266 projects from the first axial surface 38 of the sprocket body 30 in the axial direction D2 to contact the bicycle chain C (e.g., the outer link plate C2) in the second shifting operation.

The plurality of sprocket teeth 232 includes an additional adjacent tooth 268 closest to the additional shifting facilitation projection 266 among the plurality of sprocket teeth 232. The receiving facilitation tooth 264 is adjacent to the additional adjacent tooth 268 without another tooth between the receiving facilitation tooth 264 and the additional adjacent tooth 268 in the driving rotational direction D11. However, the positional relationship between the additional shifting facilitation projection 266 and the receiving facilitation tooth 264 is not limited to this embodiment.

In this embodiment, as seen in FIG. 38, the first shifting facilitation area FA21 is defined from a downstream circumferential end 74A of the shifting facilitation recess 74 to an upstream tooth bottom 262T1 of the inner-link receiving tooth 262 in the circumferential direction D1. The second shifting facilitation area FA22 is defined from the upstream tooth bottom 262T1 of the inner-link receiving tooth 262 to an upstream tooth bottom 254T of the adjacent tooth 254 in the circumferential direction D1. The third shifting facilitation area FA23 is defined from a downstream tooth bottom 262T2 of the inner-link receiving tooth 262 to an upstream tooth bottom 246T of the second derailing tooth 246 in the circumferential direction D1. However, the first shifting facilitation area FA21, the third shifting facilitation area FA23, and the second shifting facilitation area FA22 are not limited to this embodiment.

The first shifting operation, the second shifting operation, and the third shifting operation will be described in detail below referring to FIGS. 43 to 47.

Figure 43:
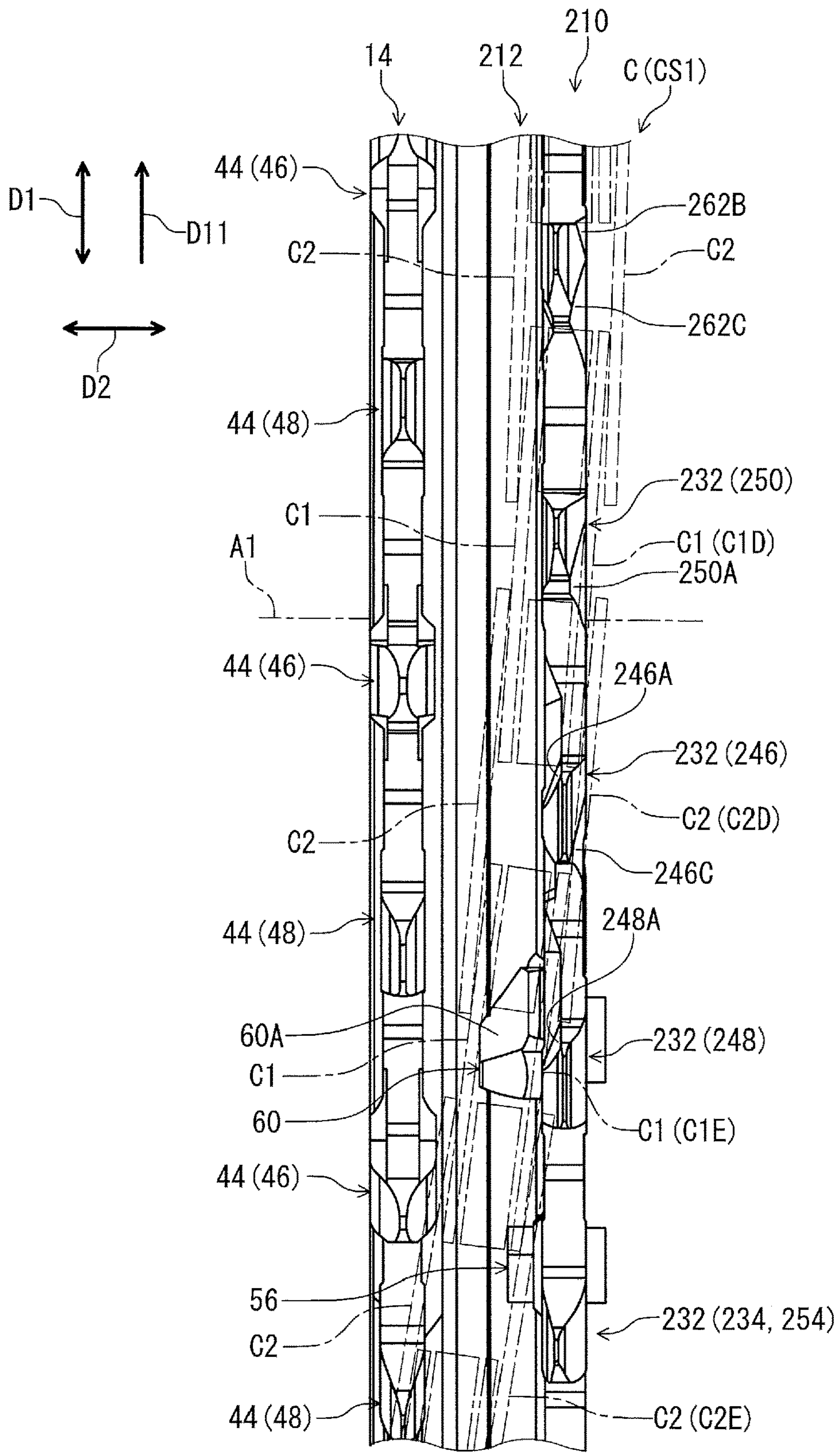
FIG. 43 is a plan view of the bicycle sprocket and the smaller sprocket of the bicycle crank assembly illustrated in FIG. 32 with the bicycle chain (first shifting operation).

As seen in FIG. 43, the bicycle chain C is shifted from the bicycle sprocket 212 toward the smaller sprocket 14 by the front derailleur (not shown) in the third shifting operation (in the first chain-phase state CS1). The second reverse upstream chamfer 250A facilitates an inclination of the inner link plate C1D toward the smaller sprocket 14 relative to the axial direction D2. The second reverse upstream chamfer 246C facilitates an inclination of the outer link plates C2D toward the smaller sprocket 14 relative to the axial direction D2. Furthermore, the first downstream chamfer 248A guides the inner link plate C1E toward the smaller sprocket 14 in the axial direction D2. Thus, the bicycle chain C is first derailed from the bicycle sprocket 212 at the first derailing tooth 248 in the third shifting operation.

Figure 44:
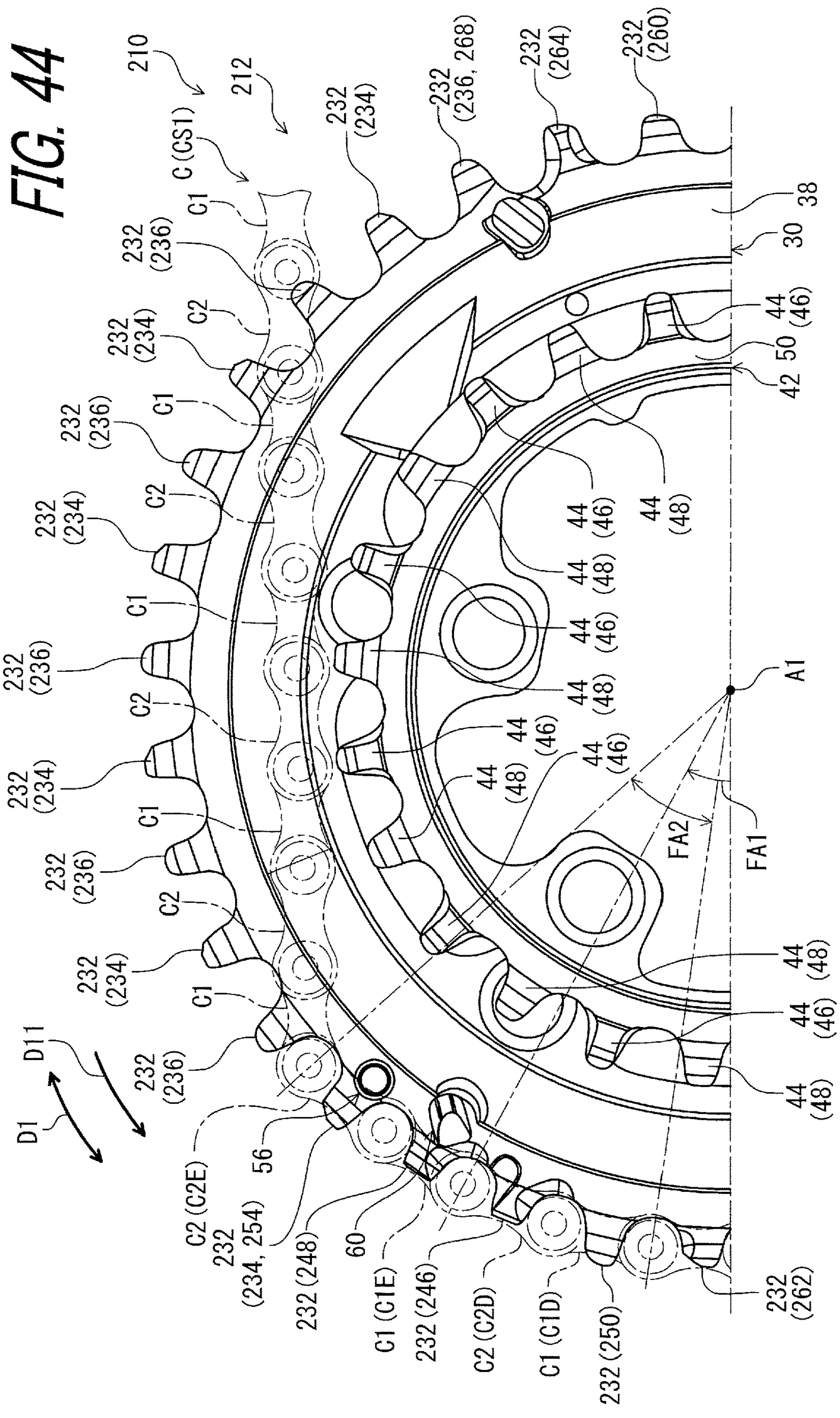
FIG. 44 is a partial side elevational view of the bicycle sprocket and the smaller sprocket of the bicycle crank assembly illustrated in FIG. 32 with the bicycle chain (first shifting operation).

In the third shifting operation, the inner link plate C1E is not guided by the contact surface 60A of the bump portion 60 toward the smaller sprocket 14 since the inner link plate C1E is adjacent to or in contact with the first derailing tooth 248. This brings the outer link plate C2E into contact with the shifting facilitation projection 56. Thus, as seen in FIG. 44, the outer link plate C2E is supported by the shifting facilitation projection 56. The bicycle chain C extends from the shifting facilitation projection 56 on a route different from the route of the bicycle chain C of the first shifting operation when viewed from the axial direction D2. This easily brings the bicycle chain C into engagement with the first teeth 234 when the bicycle chain C is in the first chain-phase state CS1. Accordingly, the third shifting facilitation area FA23 facilitates the third shifting operation in which the bicycle chain C is shifted from the bicycle sprocket 212 toward the smaller sprocket 14 in the first chain-phase state CS1.

Figure 45:
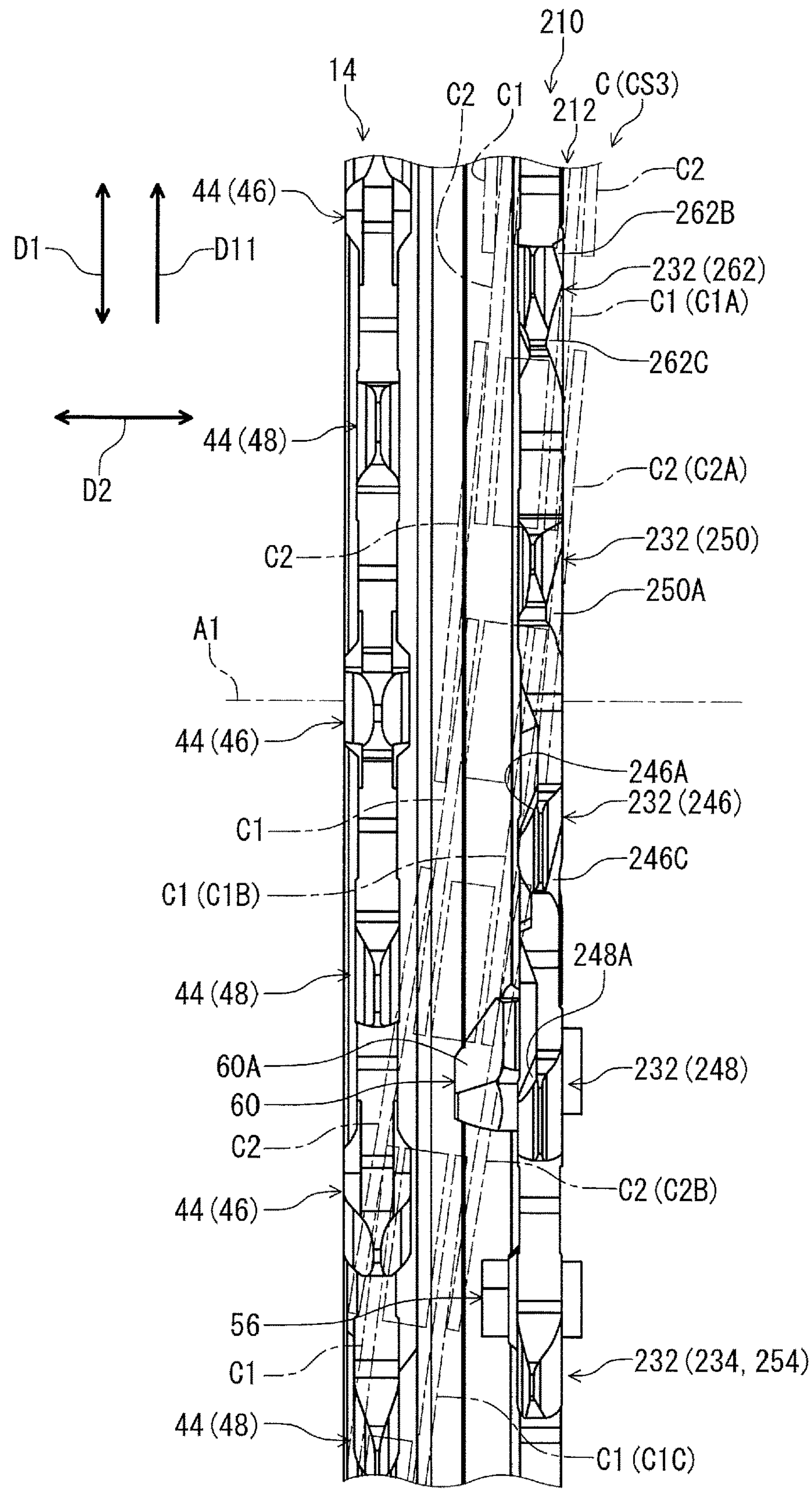
FIG. 45 is a plan view of the bicycle sprocket and the smaller sprocket of the bicycle crank assembly illustrated in FIG. 32 with the bicycle chain (third shifting operation).

As seen in FIG. 45, the bicycle chain C is shifted from the bicycle sprocket 212 toward the smaller sprocket 14 by the front derailleur (not shown) in the first shifting operation (in the second chain-phase state CS2). The inner-link reverse upstream chamfer 262C facilitates an inclination of the inner link plate C1A toward the smaller sprocket 14 relative to the axial direction D2. The second reverse upstream chamfer 250A facilitates an inclination of the outer link plates C2A toward the smaller sprocket 14 relative to the axial direction D2. Furthermore, the second downstream chamfer 246A guides the inner link plate C1B toward the smaller sprocket 14 in the axial direction D2. Thus, the bicycle chain C is first derailed from the bicycle sprocket 212 at the second derailing tooth 246 in the first shifting operation.

Figure 46:
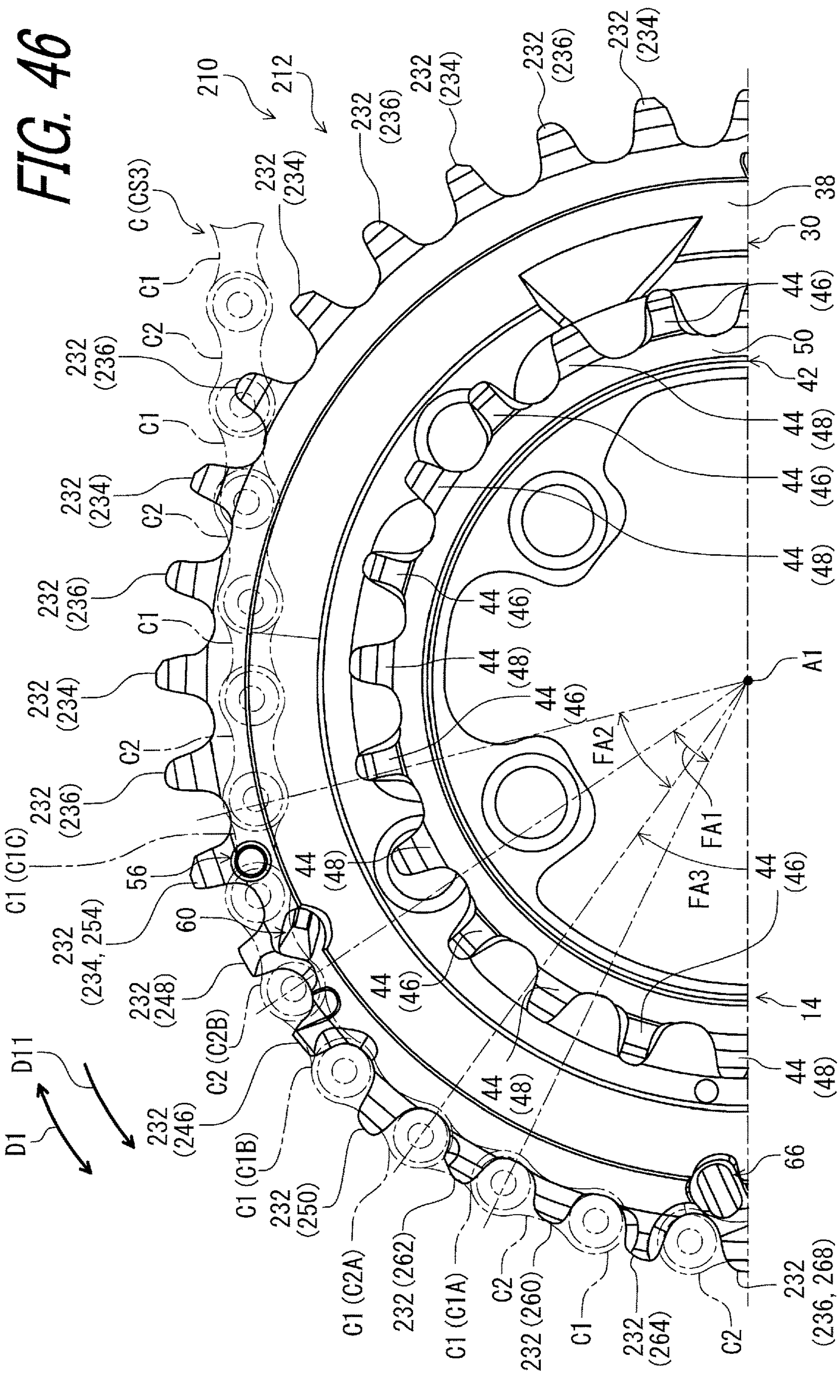
FIG. 46 is a partial side elevational view of the bicycle sprocket and the smaller sprocket of the bicycle crank assembly illustrated in FIG. 32 with the bicycle chain (third shifting operation).

As seen in FIG. 46, the outer link plate C2B is guided by the contact surface 60A of the bump portion 60 toward the smaller sprocket 14. This moves the inner link plate C1C away from the shifting facilitation projection 56 in the axial direction D2. Thus, as seen in FIG. 46, the bicycle chain C extends from the second derailing tooth 246 viewed from the axial direction D2. This easily brings the bicycle chain C into engagement with the first teeth 234 when the bicycle chain C is in the second chain-phase state CS2. Accordingly, the third shifting facilitation area FA23 facilitates the first shifting operation in which the bicycle chain C is shifted from the bicycle sprocket 212 toward the smaller sprocket 14 in the second chain-phase state CS2.

Figure 47:
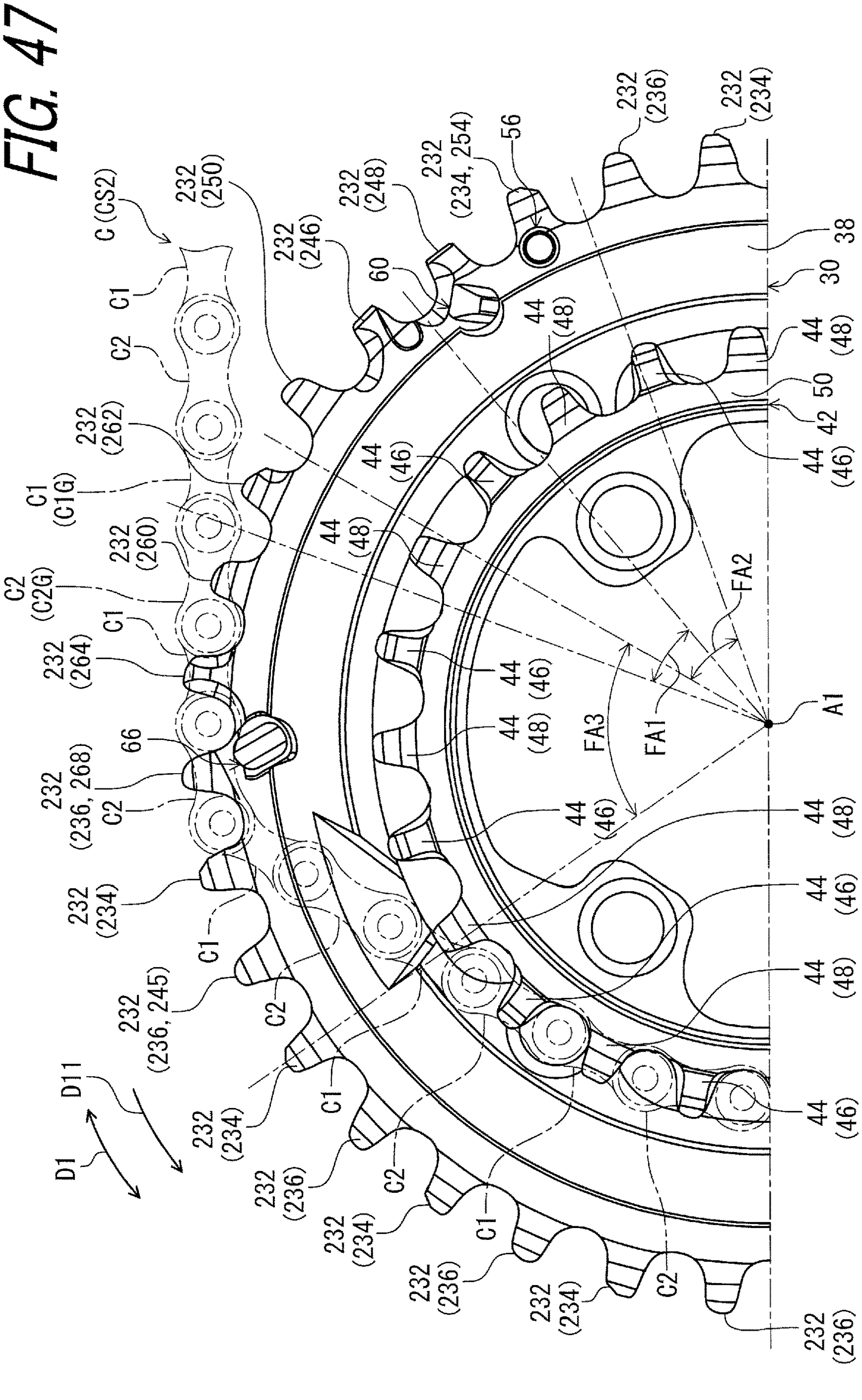
FIG. 47 is a partial side elevational view of the bicycle sprocket and the smaller sprocket of the bicycle crank assembly illustrated in FIG. 32 with the bicycle chain (second shifting operation).

As seen in FIG. 47, the bicycle chain C is lifted by the additional shifting facilitation projection 266 in the second shifting operation when the bicycle chain C is shifted from the bicycle sprocket 212 toward the smaller sprocket 14 by the front derailleur (not shown). This brings the outer link plates C2G into engagement with the outer-link receiving tooth 260 and brings the inner link plates C1G into engagement with the inner-link receiving tooth 262. The outer-link receiving tooth 260 first receives the bicycle chain C in the second shifting operation. Thus, the first shifting facilitation area FA21 facilitates the second shifting operation in which the bicycle chain C is shifted from the smaller sprocket 14 to the bicycle sprocket 212. The bicycle chain C is in the second chain-phase state CS2 (FIG. 37) after completion of the second shifting operation. In this embodiment, the bicycle chain C is necessarily in the second chain-phase state CS2 (FIG. 37) after completion of the second shifting operation since the smaller sprocket 14 has only the second chain-phase state CS2. The bicycle chain C is in the first chain-phase state CS1 when the user brings the bicycle chain C into engagement with the bicycle sprocket 212 to be in the first chain-phase state CS1 instead of the second chain-phase state CS2. The second chain-phase state CS2 can also be referred to as a regular chain-phase state CS1, and the first chain-phase state CS1 can also be referred to as an irregular chain-phase state CS2.

With the bicycle sprocket 212, it is possible to obtain substantially the same effect as that of the bicycle sprocket 12 of the first embodiment.

Third Embodiment

A bicycle crank assembly 310 including a bicycle sprocket 312 in accordance with a third embodiment will be described below referring to FIGS. 48 to 50. The bicycle sprocket 312 has the same structure as that of the bicycle sprocket 12 except for a bump portion. Thus, elements having substantially the same function as those in the above embodiments will be numbered the same here, and will not be described again in detail here for the sake of brevity.

Figure 48:
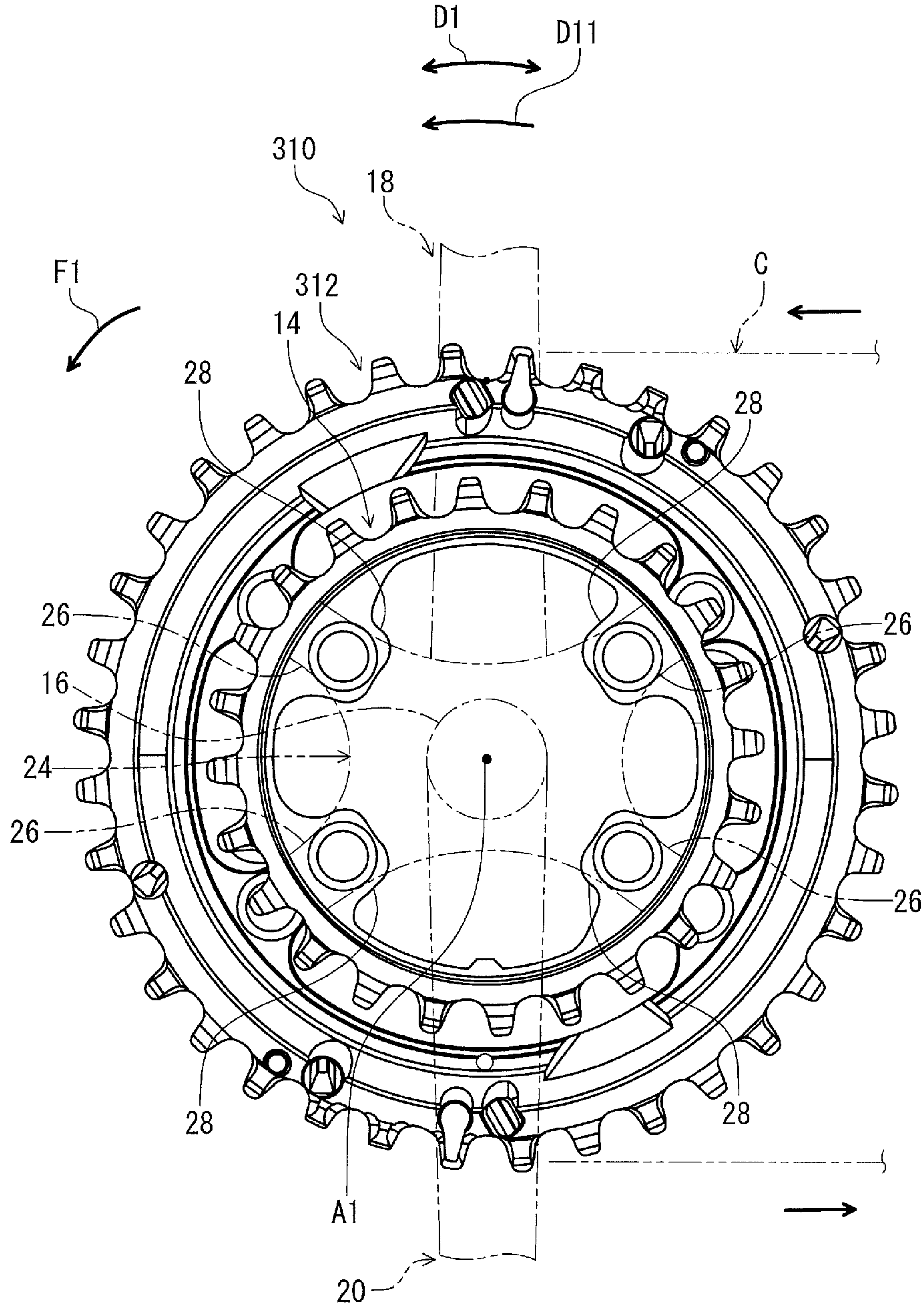
FIG. 48 is a side elevational view of a bicycle crank assembly including a bicycle sprocket in accordance with a third embodiment.
Figure 49:
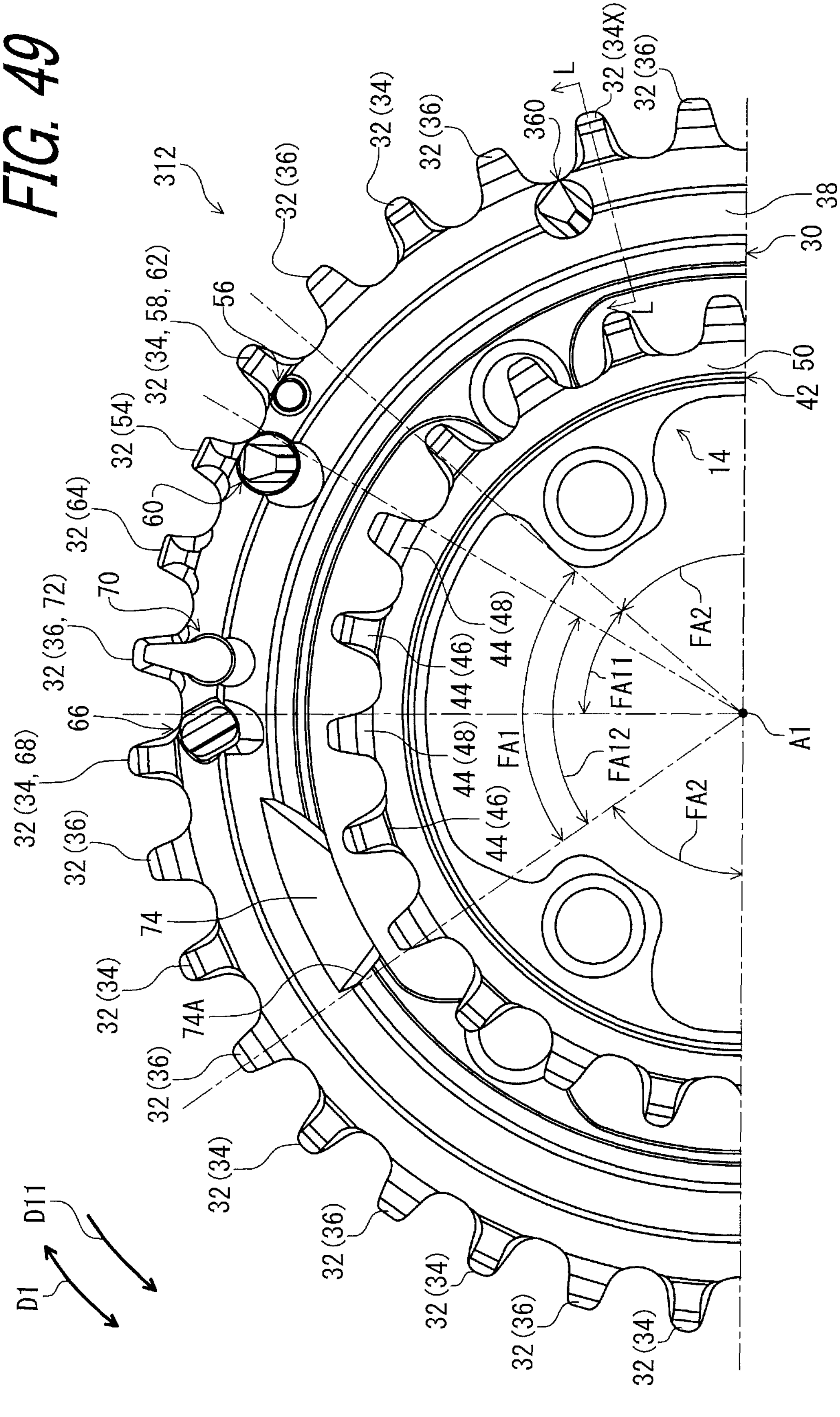
FIG. 49 is a side elevational view of the bicycle sprocket of the bicycle crank assembly illustrated in FIG. 48.
Figure 50:
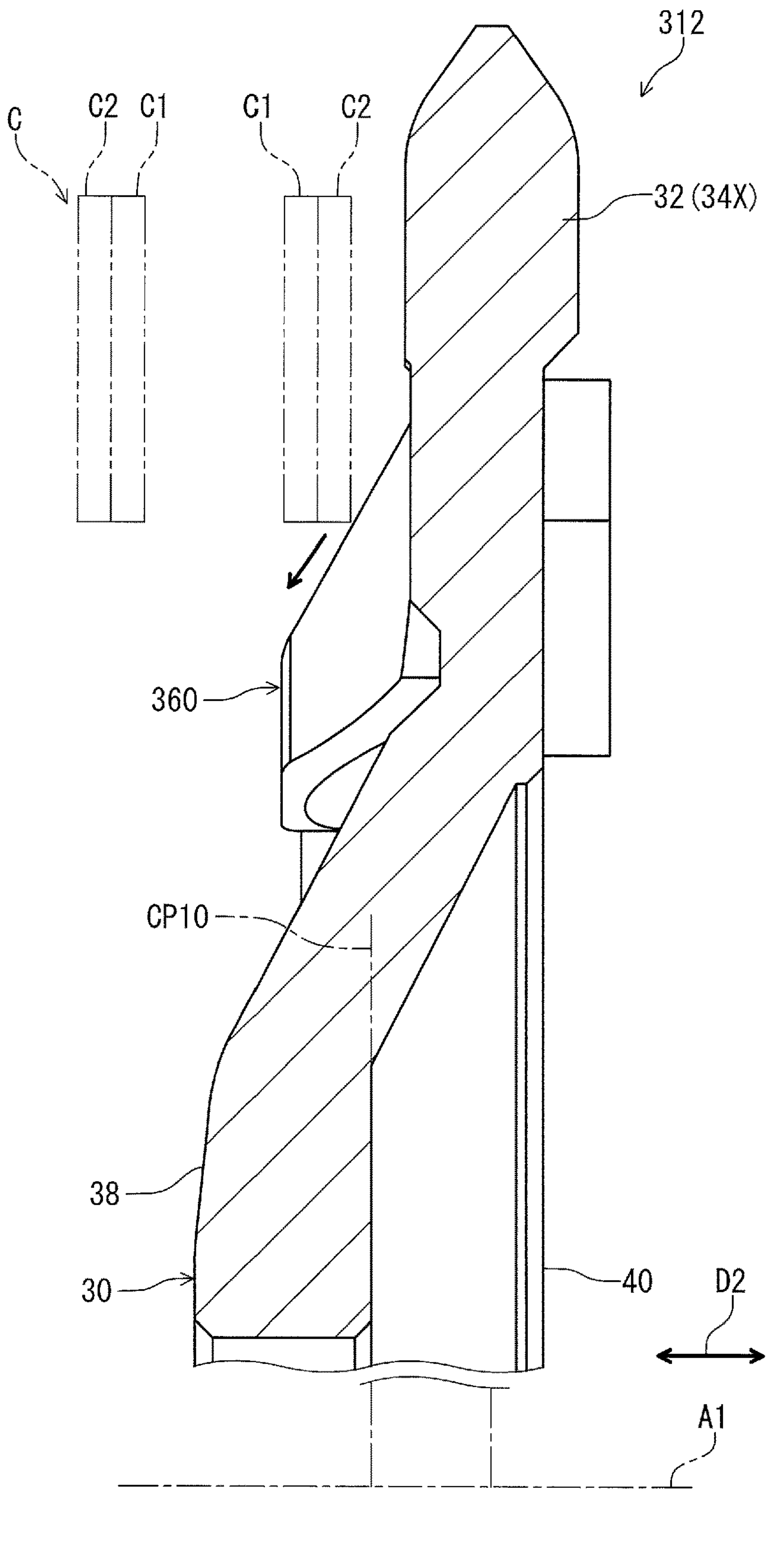
FIG. 50 is a cross-sectional view of the bicycle sprocket taken along line L-L of FIG. 49.

As seen in FIGS. 48 and 49, the bicycle sprocket 312 comprises the sprocket body 30, the plurality of sprocket teeth 32, the shifting facilitation projection 56, the bump portion 60, the second shifting facilitation projection 66, and the third shifting facilitation projection 70.

In this embodiment, as seen in FIG. 49, the bicycle sprocket 312 comprises at least one bump portion 360 provided in the at least one driving facilitation area FA2. The at least one bump portion 360 is provided on a downstream side of one of the at least one first tooth 34 in the driving rotational direction D11 in which the bicycle sprocket is rotated during pedaling. The at least one bump portion 360 includes a pair of bump portions 360. However, a total number of the bump portions 360 is not limited to this embodiment. The bump portion 360 has substantially the same structure as that of the bump portion 60 of the first embodiment. However, the bump portion 360 can have another structure (e.g., an angle of a contact surface and/or an axial height) different from those of the bump portion 60 if needed and/or desired.

As described in the first embodiment, the driving facilitation area FA2 is configured to facilitate holding and driving of the bicycle chain C rather than facilitating the shifting operation. Shifting facilitation performance of the driving facilitation area FA2 is lower than shifting facilitation performance of the shifting facilitation area FA1. In this embodiment, neither a shifting facilitation chamfer, a shifting facilitation recess, nor a shifting facilitation projection is provided in the driving facilitation area FA2. Thus, derailing and receiving of the bicycle chain C is less likely to smoothly occur in the driving facilitation area FA2 than in the shifting facilitation area FA1. The driving facilitation area FA2 is defined to include points which are respectively offset from a top dead center and a bottom dead center of the bicycle crank assembly 310 by 90 degrees in the circumferential direction D1. In other words, the driving facilitation areas FA2 do not include the top and bottom dead centers of the bicycle crank assembly 310 while the shifting facilitation areas FA1 include the top and bottom dead centers.

The bump portion 360 is provided on the downstream side of the first tooth 34X in the driving rotational direction D11 to reduce interference between the first tooth 34X and the bicycle chain C in the second shifting operation. This prevents the bicycle chain C from being unintentionally lifted up by the first tooth 34 and then dropping from the bicycle sprocket 312 in the second shifting operation. Namely, it is possible to certainly shift the bicycle chain C from the smaller sprocket 14 to the bicycle sprocket 312 in the second shifting operation. As seen in FIG. 50, the bump portion 360 moves the bicycle chain C away from the first tooth 34X in the second shifting operation as well as the bump portion 60.

With the bicycle sprocket 312, it is possible to obtain substantially the same effect as that of the bicycle sprocket 12 of the first embodiment.

Fourth Embodiment

A bicycle crank assembly 410 including a bicycle sprocket 412 in accordance with a fourth embodiment will be described below referring to FIGS. 51 to 65. The bicycle sprocket 412 has the same structure as that of the bicycle sprocket 12 except for the plurality of sprocket teeth 32 and the plurality of second sprocket teeth 44. Thus, elements having substantially the same function as those in the above embodiments will be numbered the same here, and will not be described again in detail here for the sake of brevity.

Figure 51:
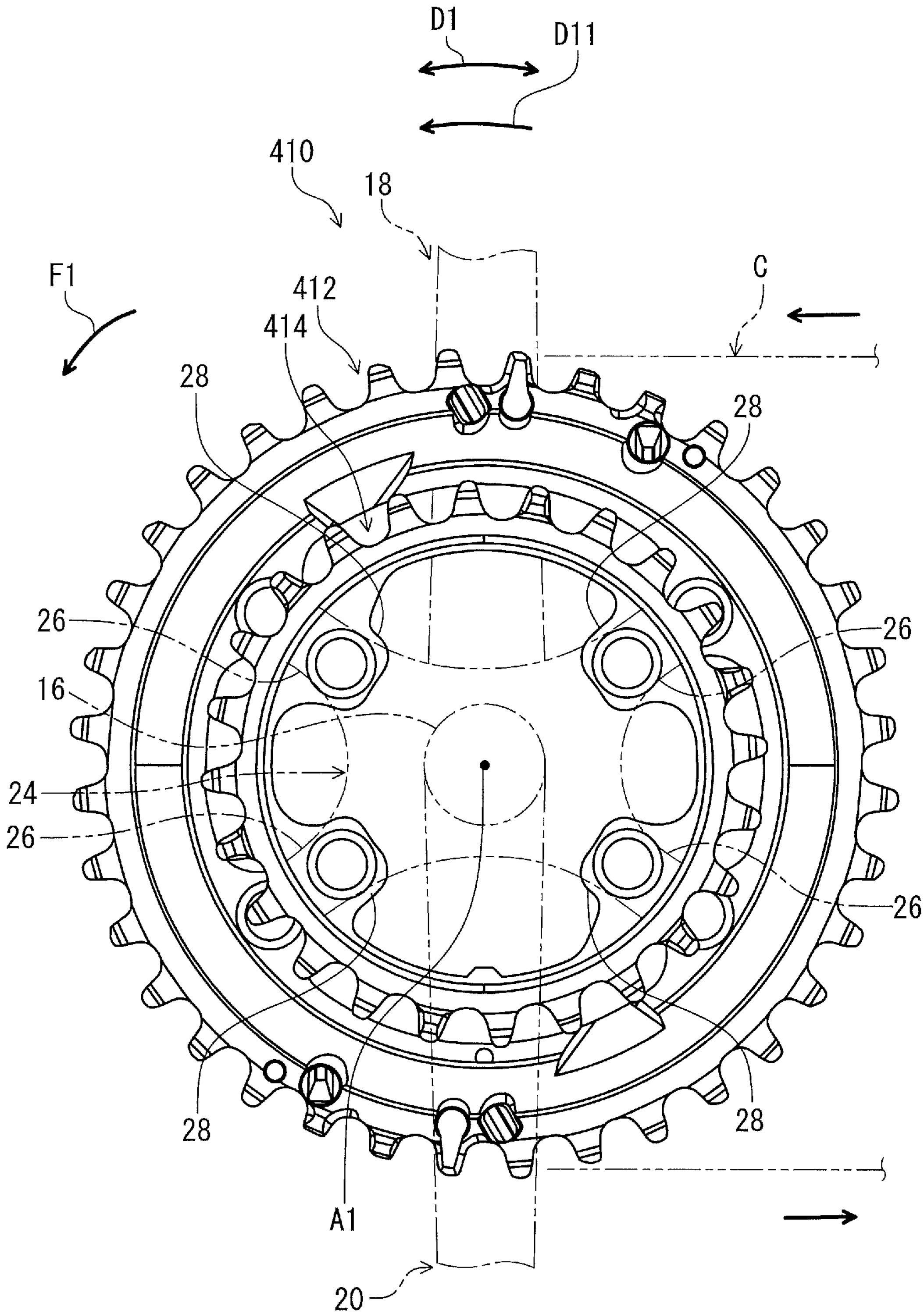
FIG. 51 is a side elevational view of a bicycle crank assembly including a bicycle sprocket in accordance with a fourth embodiment.
Figure 52:
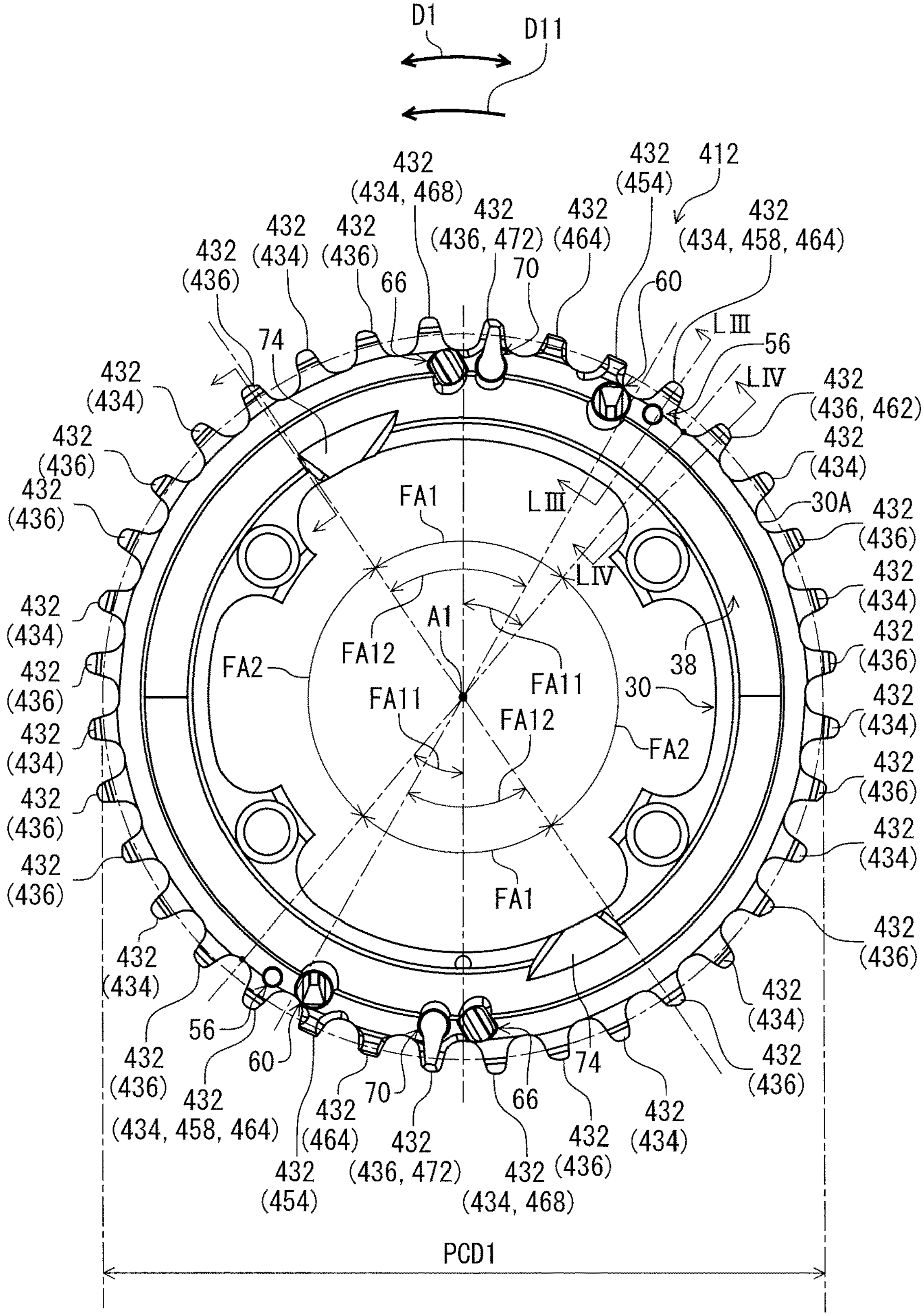
FIG. 52 is a side elevational view of the bicycle sprocket of the bicycle crank assembly illustrated in FIG. 51.

As seen in FIG. 51, the bicycle crank assembly 410 comprises the bicycle sprocket 412 and a smaller sprocket 414. As seen in FIG. 52, the bicycle sprocket 412 comprises the sprocket body 30, a plurality of sprocket teeth 432, the shifting facilitation projection 56, the bump portion 60, the second shifting facilitation projection 66, and the third shifting facilitation projection 70.

As seen in FIG. 52, the plurality of sprocket teeth 432 includes at least one first tooth 434 and at least one second tooth 436. The at least one first tooth 434 is provided on the outer periphery 30A to be engaged with the bicycle chain C. The at least one second tooth 436 is provided on the outer periphery 30A to be engaged with the bicycle chain C. In this embodiment, the at least one first tooth 434 includes a plurality of first teeth 434 provided on the outer periphery 30A to be engaged with the bicycle chain C. The at least one second tooth 436 includes a plurality of second teeth 436 provided on the outer periphery 30A to be engaged with the bicycle chain C. The plurality of first teeth 434 and the plurality of second teeth 436 are alternatingly arranged in the circumferential direction D1.

Figure 53:
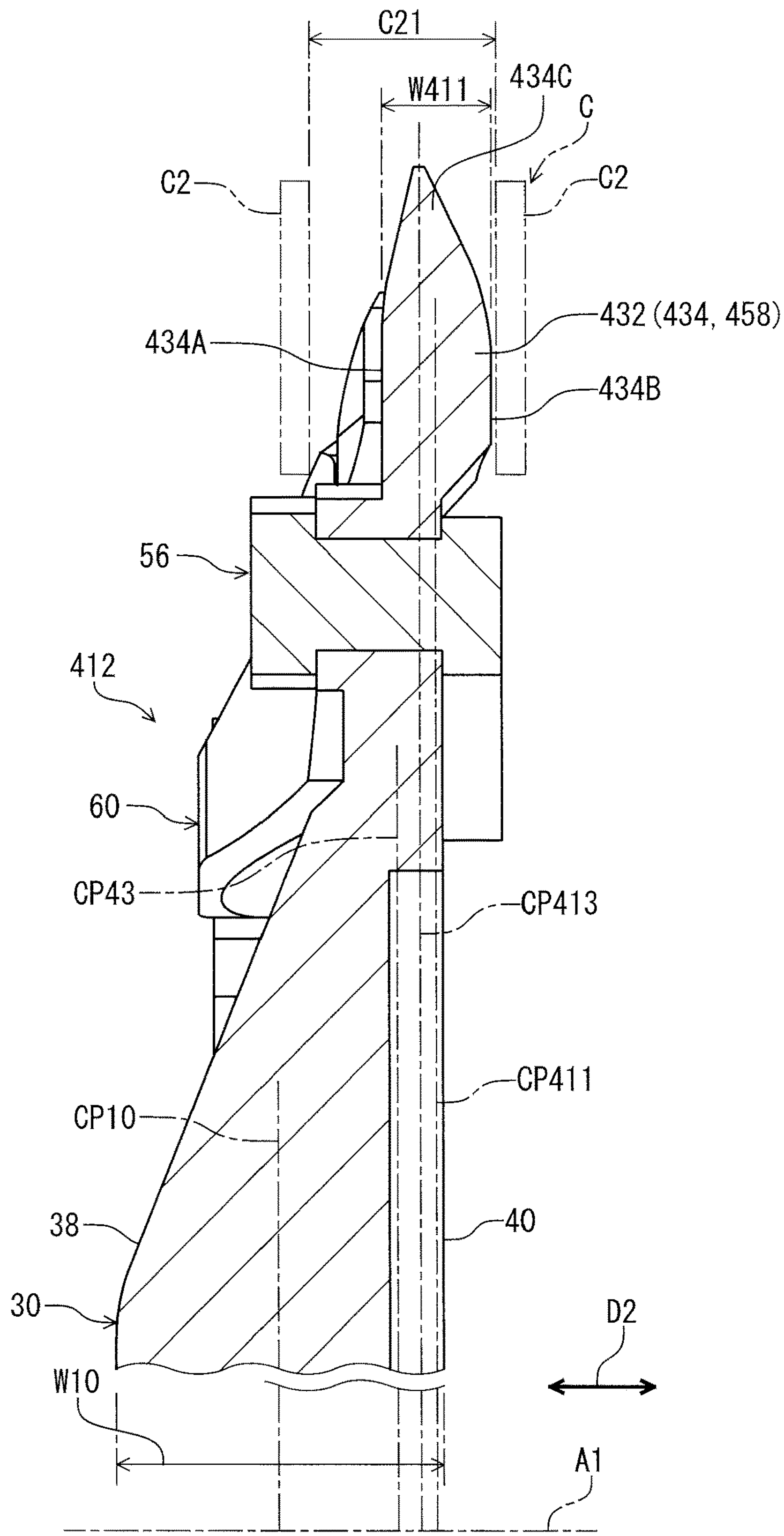
FIG. 53 is a cross-sectional view of the bicycle sprocket taken along line LIII-LIII of FIG. 52.

As seen in FIG. 53, the at least one first tooth 434 has a first chain engaging width W411 defined in the axial direction D2. In this embodiment, the first tooth 434 includes a first surface 434A and a first chain-engagement surface 434B. The first surface 434A faces in the axial direction D2. The first chain-engagement surface 434B faces in the axial direction D2 and is provided on a reverse side of the first surface 434A in the axial direction D2. The first chain-engagement surface 434B is contactable with the bicycle chain C (e.g., the outer link plate C2). The first chain engaging width W411 is defined between the first surface 434A and the first chain-engagement surface 434B in the axial direction D2.

The first tooth 434 has a first center plane CP411 defined to bisect the first chain engaging width W411 in the axial direction D2. The first center plane CP411 is perpendicular to the rotational center axis A1. The first center plane CP411 is offset from the first reference center plane CP10 in the axial direction D2. However, the first center plane CP411 can coincide with the first reference center plane CP10 in the axial direction D2.

The first tooth 434 includes a first tooth-tip 434C having a first tooth-tip center plane CP413. The first tooth-tip center plane CP413 is perpendicular to the rotational center axis A1. The first tooth-tip center plane CP413 is offset from the first reference center plane CP10 and the first center plane CP411 in the axial direction D2. However, the first tooth-tip center plane CP413 can coincide with at least one of the first reference center plane CP10 and the first center plane CP411 in the axial direction D2. The first tooth 434 has an asymmetrical shape with respect to the first center plane CP411 in the axial direction D2. However, the first tooth 434 can have a symmetrical shape with respect to the first center plane CP411 in the axial direction D2.

Figure 54:
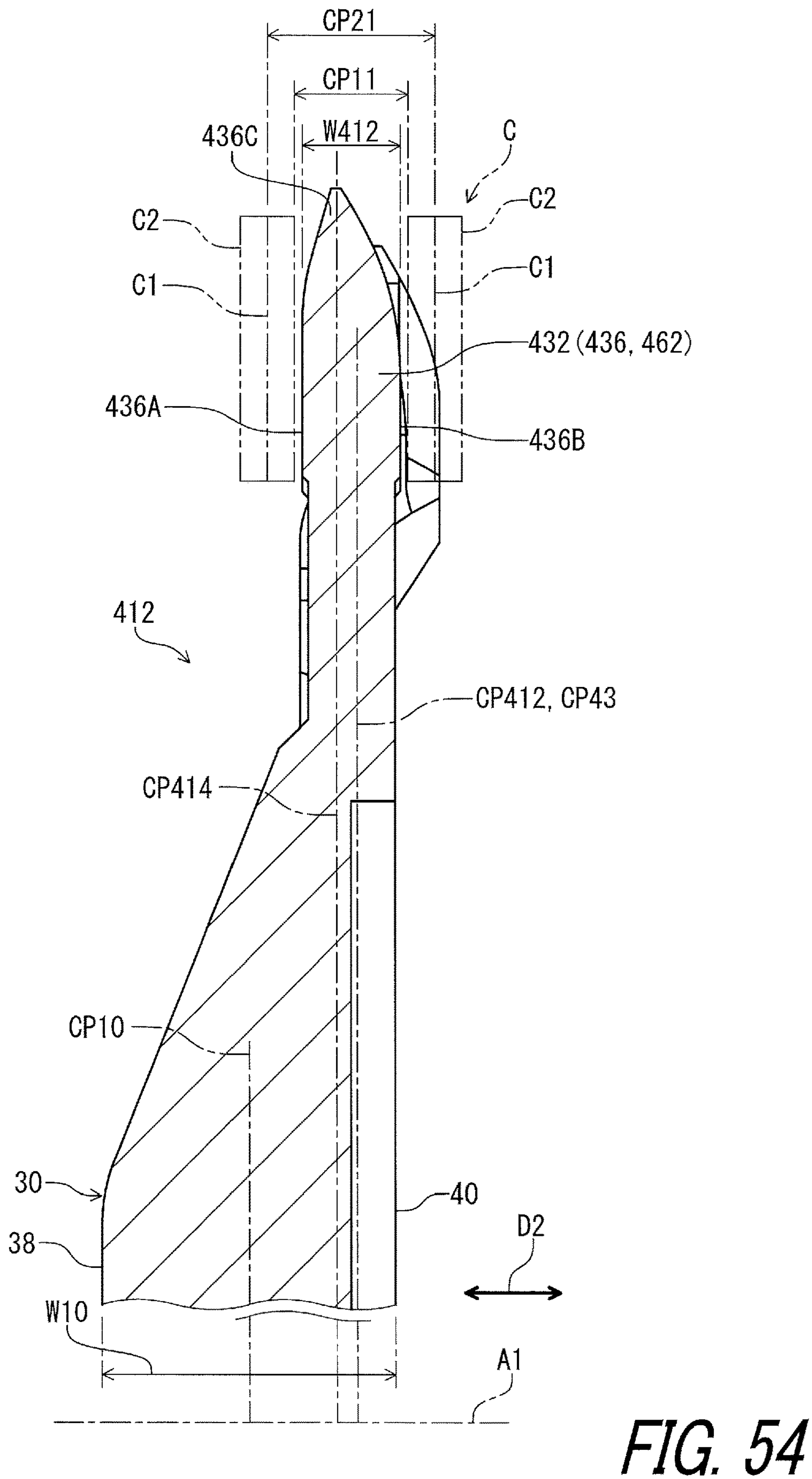
FIG. 54 is a cross-sectional view of the bicycle sprocket taken along line LIV-LIV of FIG. 52.

As seen in FIG. 54, the at least one second tooth 436 has a second chain engaging width W412 defined in the axial direction D2. In this embodiment, the second tooth 436 includes a second chain-engagement surface 436A and a second additional chain-engagement surface 436B. The second chain-engagement surface 436A faces in the axial direction D2 and is contactable with the bicycle chain C (e.g., the inner link plate C1). The second additional chain-engagement surface 436B faces in the axial direction D2 and is provided on a reverse side of the second chain-engagement surface 436A in the axial direction D2. The second additional chain-engagement surface 436B is contactable with the bicycle chain C (e.g., the inner link plate C1). The second chain engaging width W412 is defined between the second chain-engagement surface 436A and the second additional chain-engagement surface 436B in the axial direction D2.

The second tooth 436 has a second center plane CP412 defined to bisect the second chain engaging width W412 in the axial direction D2. The second center plane CP412 is perpendicular to the rotational center axis A1. The second center plane CP412 is offset from the first reference center plane CP10 in the axial direction D2. However, the second center plane CP412 can coincide with the first reference center plane CP10 in the axial direction D2. The second center plane CP412 coincides with the first center plane CP411. However, the second center plane CP412 can be offset from the first center plane CP411 in the axial direction D2.

The second tooth 436 includes a second tooth-tip 436C having a second tooth-tip center plane CP414. The second tooth-tip center plane CP414 is perpendicular to the rotational center axis A1. The second tooth-tip center plane CP414 is offset from the first reference center plane CP10 and the second center plane CP412 in the axial direction D2. However, the second tooth-tip center plane CP414 can coincide with at least one of the first reference center plane CP10 and the second center plane CP412 in the axial direction D2. The second tooth 436 has an asymmetrical shape with respect to the second center plane CP412 in the axial direction D2. However, the second tooth 436 can have a symmetrical shape with respect to the second center plane CP412 in the axial direction D2.

In this embodiment, the second chain engaging width W412 is equal to the first chain engaging width W411. The first chain engaging width W411 and the second chain engaging width W412 are smaller than the inner link space C11. However, the second chain engaging width W412 can be different from the first chain engaging width W411. One of the first chain engaging width W411 and the second chain engaging width W412 can be equal to or larger than the inner link space C11.

Figure 55:
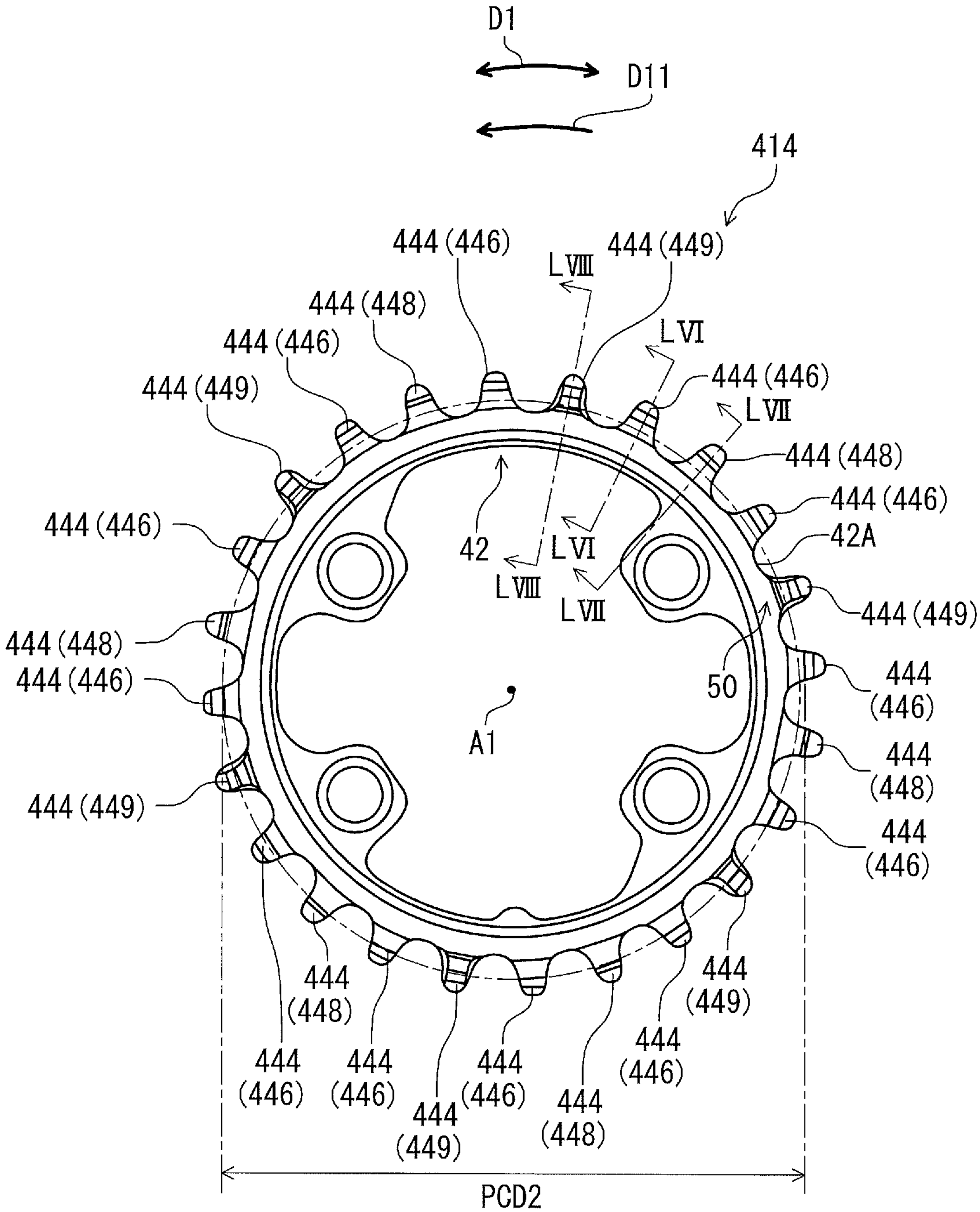
FIG. 55 is a side elevational view of the smaller sprocket of the bicycle crank assembly illustrated in FIG. 51.

As seen in FIG. 55, the smaller sprocket 414 comprises the second sprocket body 42 and a plurality of second sprocket teeth 444. The plurality of second sprocket teeth 444 is provided on the outer periphery 42A of the second sprocket body 42. The plurality of second sprocket teeth 444 includes at least one third tooth 446, at least one fourth tooth 448, and at least one fifth tooth 449. The at least one third tooth 446 is provided on the outer periphery 42A to be engaged with the bicycle chain C. The at least one fourth tooth 448 is provided on the outer periphery 42A to be engaged with the bicycle chain C. The at least one fifth tooth 449 is provided on the outer periphery 42A to be engaged with the bicycle chain C. In this embodiment, the at least one third tooth 446 includes a plurality of third teeth 446 provided on the outer periphery 42A to be engaged with the bicycle chain C. The at least one fourth tooth 448 includes a plurality of fourth teeth 448 provided on the outer periphery 42A to be engaged with the bicycle chain C. The at least one fifth tooth 449 includes a plurality of fifth teeth 449 provided on the outer periphery 42A to be engaged with the bicycle chain C. The plurality of fourth teeth 448 and the plurality of fifth teeth 449 are alternatingly arranged in the circumferential direction D1. The plurality of third teeth 446 are respectively disposed between the plurality of fourth teeth 448 and the plurality of fifth teeth 449 in the circumferential direction D1. However, at least one of the plurality of third teeth 446 can be replaced with one of the fourth tooth 448 and the fifth tooth 449. At least one of the plurality of fourth teeth 448 can be replaced with one of the third tooth 446 and the fifth tooth 449. At least one of the plurality of fifth teeth 449 can be replaced with one of the third tooth 446 and the fourth tooth 448.

Figure 56:
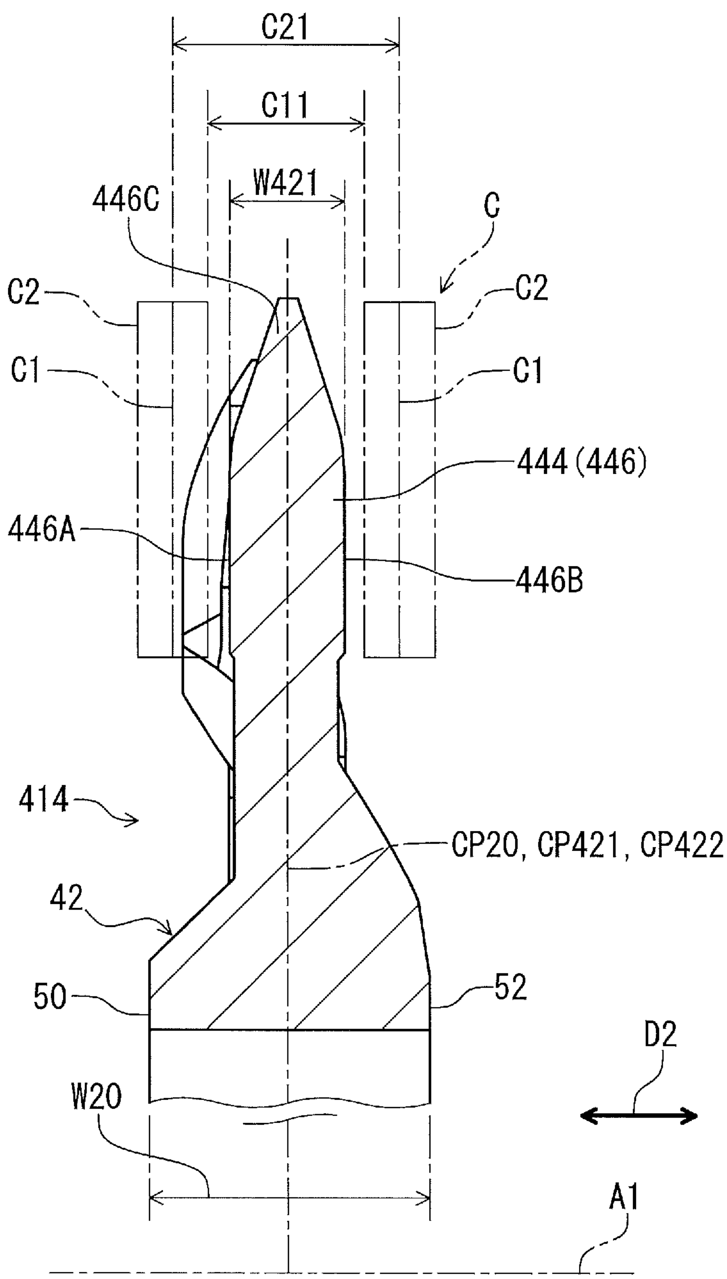
FIG. 56 is a cross-sectional view of the smaller sprocket taken along line LVI-LVI of FIG. 51.

As seen in FIG. 56, the at least one third tooth 446 has a third chain engaging width W421 defined in the axial direction D2. In this embodiment, the third tooth 446 includes a third chain-engagement surface 446A and a third additional chain-engagement surface 446B. The third chain-engagement surface 446A faces in the axial direction D2 and is contactable with the bicycle chain C (e.g., the inner link plate C1). The third additional chain-engagement surface 446B faces in the axial direction D2 and is provided on a reverse side of the third chain-engagement surface 446A in the axial direction D2. The third additional chain-engagement surface 446B is contactable with the bicycle chain C (e.g., the inner link plate C1). The third chain engaging width W421 is defined between the third chain-engagement surface 446A and the third additional chain-engagement surface 446B in the axial direction D2.

The third tooth 446 has a third center plane CP421 defined to bisect the third chain engaging width W421 in the axial direction D2. The third center plane CP421 is perpendicular to the rotational center axis A1. The third center plane CP421 coincides with the second reference center plane CP20 in the axial direction D2. However, the third center plane CP421 can be offset from the second reference center plane CP20 in the axial direction D2.

The third tooth 446 includes a third tooth-tip 446C having a third tooth-tip center plane CP422. The third tooth-tip center plane CP422 is perpendicular to the rotational center axis A1. The third tooth-tip center plane CP422 coincides with the second reference center plane CP20 and the third center plane CP421 in the axial direction D2. However, the third tooth-tip center plane CP422 can be offset from at least one of the second reference center plane CP20 and the third center plane CP421 in the axial direction D2. The third tooth 446 has a symmetrical shape with respect to the third center plane CP421 in the axial direction D2. However, the third tooth 446 can have an asymmetrical shape with respect to the third center plane CP421 in the axial direction D2.

Figure 57:
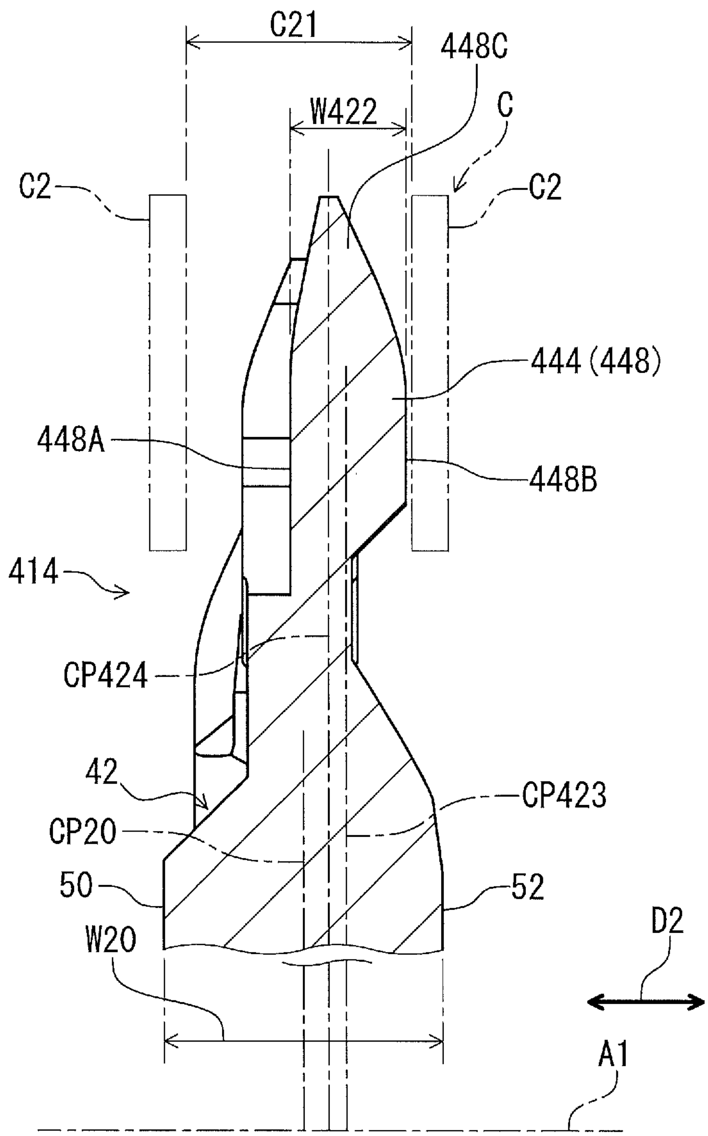
FIG. 57 is a cross-sectional view of the smaller sprocket taken along line LVII-LVII of FIG. 51.

As seen in FIG. 57, the at least one fourth tooth 448 has a fourth chain engaging width W422 defined in the axial direction D2. In this embodiment, the fourth tooth 448 includes a fourth surface 448A and a fourth chain-engagement surface 448B. The fourth surface 448A faces in the axial direction D2. The fourth chain-engagement surface 448B faces in the axial direction D2 and is provided on a reverse side of the fourth surface 448A in the axial direction D2. The fourth chain-engagement surface 448B is contactable with the bicycle chain C (e.g., the outer link plate C2). The fourth chain engaging width W422 is defined between the fourth surface 448A and the fourth chain-engagement surface 448B in the axial direction D2.

The fourth tooth 448 has a fourth center plane CP423 defined to bisect the fourth chain engaging width W422 in the axial direction D2. The fourth center plane CP423 is perpendicular to the rotational center axis A1. The fourth center plane CP423 is offset from the second reference center plane CP20 toward the bicycle sprocket 412 in the axial direction D2. However, the fourth center plane CP423 can coincide with the second reference center plane CP20 in the axial direction D2. The fourth center plane CP423 coincides with the third center plane CP421. However, the fourth center plane CP423 can be offset from the third center plane CP421 in the axial direction D2.

The fourth tooth 448 includes a fourth tooth-tip 448C having a fourth tooth-tip center plane CP424. The fourth tooth-tip center plane CP424 is perpendicular to the rotational center axis A1. The fourth tooth-tip center plane CP424 is offset from the second reference center plane CP20 and the fourth center plane CP423 in the axial direction D2. However, the fourth tooth-tip center plane CP424 can coincide with at least one of the second reference center plane CP20 and the fourth center plane CP423 in the axial direction D2. The fourth tooth 448 has an asymmetrical shape with respect to the fourth center plane CP423 in the axial direction D2. However, the fourth tooth 448 can have a symmetrical shape with respect to the fourth center plane CP423 in the axial direction D2.

Figure 58:
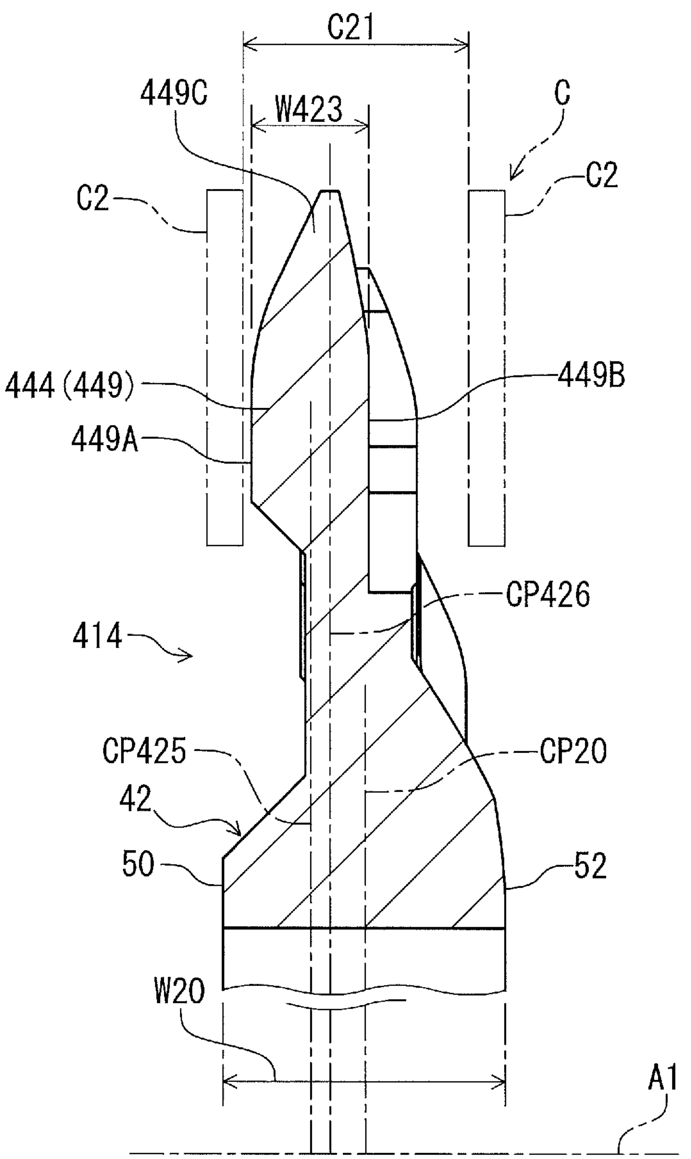
FIG. 58 is a cross-sectional view of the smaller sprocket taken along line LVIII-LVIII of FIG. 51.

As seen in FIG. 58, the at least one fifth tooth 449 has a fifth chain engaging width W423 defined in the axial direction D2. In this embodiment, the fifth tooth 449 includes a fifth chain-engagement surface 449A and a fifth surface 449B. The fifth chain-engagement surface 449A faces in the axial direction D2 and is contactable with the bicycle chain C (e.g., the outer link plate C2). The fifth surface 449B faces in the axial direction D2 and is provided on a reverse side of the fifth chain-engagement surface 449A in the axial direction D2. The fifth chain engaging width W423 is defined between the fifth chain-engagement surface 449A and the fifth surface 449B in the axial direction D2.

The fifth tooth 449 has a fifth center plane CP425 defined to bisect the fifth chain engaging width W423 in the axial direction D2. The fifth center plane CP425 is perpendicular to the rotational center axis A1. The fifth center plane CP425 is offset from the second reference center plane CP20 away from the bicycle sprocket 412 in the axial direction D2. However, the fifth center plane CP425 can coincide with the second reference center plane CP20 in the axial direction D2. The fifth center plane CP425 coincides with the third center plane CP421. However, the fifth center plane CP425 can be offset from the third center plane CP421 in the axial direction D2.

The fifth tooth 449 includes a fifth tooth-tip 449C having a fifth tooth-tip center plane CP426. The fifth tooth-tip center plane CP426 is perpendicular to the rotational center axis A1. The fifth tooth-tip center plane CP426 is offset from the second reference center plane CP20 and the fifth center plane CP425 in the axial direction D2. However, the fifth tooth-tip center plane CP426 can coincide with at least one of the second reference center plane CP20 and the fifth center plane CP425 in the axial direction D2. The fifth tooth 449 has an asymmetrical shape with respect to the fifth center plane CP425 in the axial direction D2. However, the fifth tooth 449 can have a symmetrical shape with respect to the fifth center plane CP425 in the axial direction D2.

In this embodiment, as seen in FIGS. 56 to 58, the fourth chain engaging width W422 and the fifth chain engaging width W423 are equal to the third chain engaging width W421. The third chain engaging width W421, the fourth chain engaging width W422, and the fifth chain engaging width W423 are smaller than the inner link space C11. However, at least one of the fourth chain engaging width W422 and the fifth chain engaging width W423 can be different from the third chain engaging width W421. At least one of the third chain engaging width W421, the fourth chain engaging width W422, and the fifth chain engaging width W423 can be equal to or larger than the inner link space C11.

In this embodiment, as seen in FIGS. 52 and 55, a total number of the plurality of sprocket teeth 432 is an even number, and a total number of the plurality of second sprocket teeth 444 is an even number. For example, the total number of the plurality of sprocket teeth 432 is thirty-six, and the total number of the plurality of second sprocket teeth 444 is twenty-four. However, a total number of the plurality of sprocket teeth 432 is not limited to this embodiment. A total number of the second sprocket teeth 444 is not limited to this embodiment.

As seen in FIG. 52, the bicycle sprocket 412 comprises at least one driving facilitation area FA2. In this embodiment, the at least one driving facilitation area FA2 includes a plurality of driving facilitation areas FA2. The driving facilitation area FA2 is provided outside the shifting facilitation area FA1 and is provided between the shifting facilitation areas FA1 in the circumferential direction D1. However, a total number of the driving facilitation areas FA2 is not limited to this embodiment.

Figure 59:
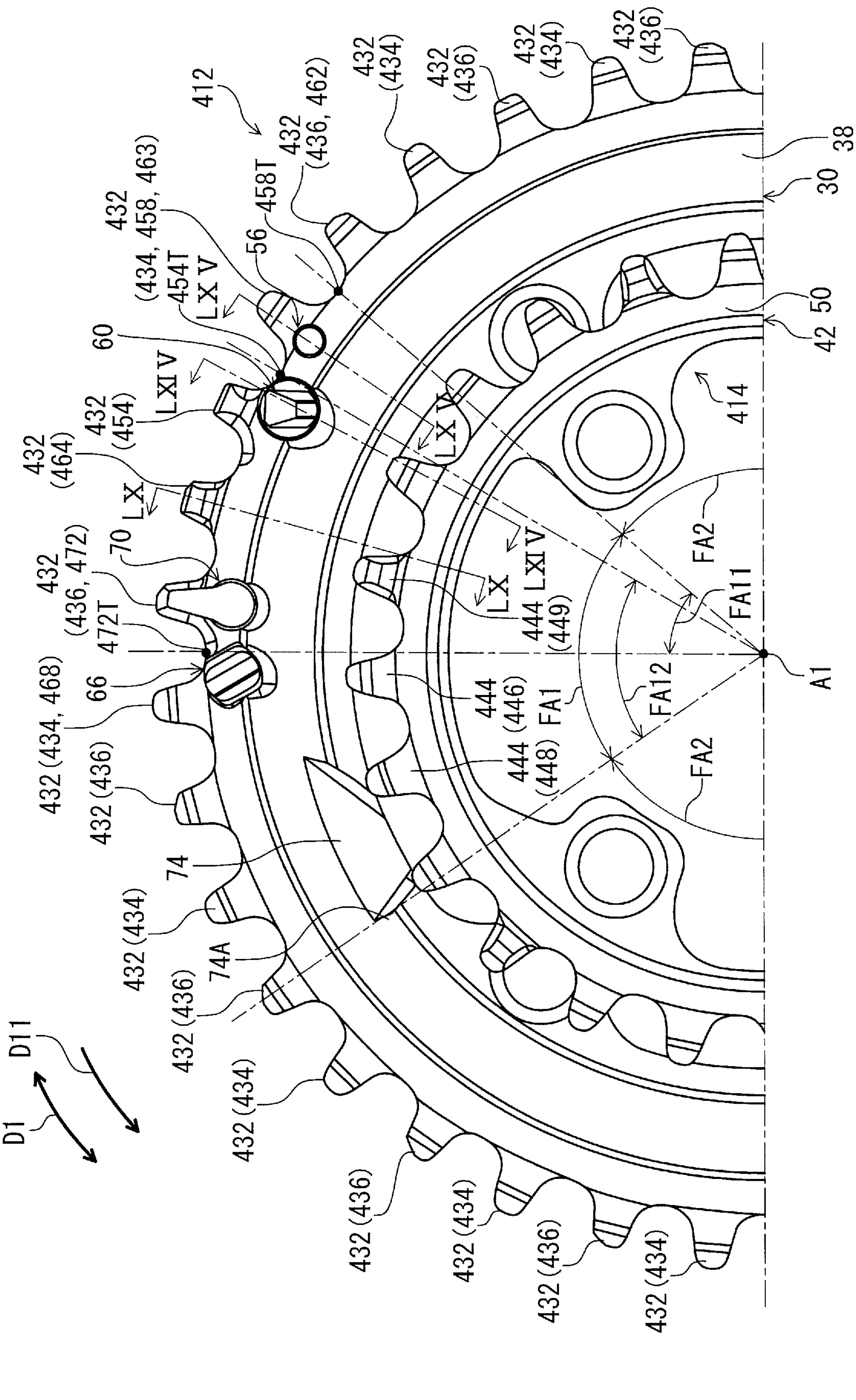
FIG. 59 is a partial side elevational view of the bicycle sprocket and the smaller sprocket of the bicycle crank assembly illustrated in FIG. 51.

As seen in FIG. 59, the plurality of sprocket teeth 432 includes a first derailing tooth 454 provided on the outer periphery 30A of the sprocket body 30 to first derail the bicycle chain C from the bicycle sprocket 412 in the first shifting operation. In this embodiment, as seen in FIG. 52, the plurality of sprocket teeth 432 includes a plurality of first derailing teeth 454 respectively provided in the shifting facilitation areas to first derail the bicycle chain C from the bicycle sprocket 412 in the first shifting operation. However, a total number of the first derailing teeth 454 is not limited to this embodiment.

As seen in FIG. 59, the at least one shifting facilitation projection 56 is at least partly provided closer to the rotational center axis A1 than the at least one first tooth 434. One of the at least one first tooth 434 is at least partly provided closest to the at least one shifting facilitation projection 56 among the at least one first tooth 434. In this embodiment, the plurality of sprocket teeth 432 includes a first adjacent tooth 458 closest to the shifting facilitation projection 56 among the plurality of sprocket teeth 432. In this embodiment, the at least one first tooth 434 includes the first adjacent tooth 458. The first derailing tooth 454 is adjacent to the first adjacent tooth 458 without another tooth between the first derailing tooth 454 and the first adjacent tooth 458 in the driving rotational direction D11. However, the positional relationship among the first derailing tooth 454, the shifting facilitation projection 56, and the first adjacent tooth 458 is not limited to this embodiment.

As seen in FIG. 54, the plurality of sprocket teeth 432 include a reference tooth 462 having a reference tooth center plane CP43 defined to bisect the maximum axial width W412 of the reference tooth 462 in the axial direction D2. In this embodiment, the reference tooth 462 is the second tooth 436. The reference tooth center plane CP43 coincides with the second center plane CP412 of the second tooth 436. As seen in FIG. 53, the first center plane CP411 of the first tooth 434 is offset from the reference tooth center plane CP43 away from the smaller sprocket 414 in the axial direction D2.

As seen in FIG. 59, the plurality of sprocket teeth 432 includes at least one receiving tooth 464 provided in the shifting facilitation area FA1 to first receive the bicycle chain C in the second shifting operation. The receiving tooth 464 first receives the opposed pair of outer link plates C2 of the bicycle chain C in the second shifting operation. The receiving tooth 464 is provided on a downstream side of the first derailing tooth 454 in the driving rotational direction D11 without another tooth between the receiving tooth 464 and the first derailing tooth 454. In this embodiment, as seen in FIG. 52, the at least one receiving tooth 464 includes a plurality of receiving teeth 464 respectively provided in the shifting facilitation areas FA1 to first receive the bicycle chain C in the second shifting operation. However, a total number of the receiving teeth 464 is not limited to this embodiment.

Figure 60:
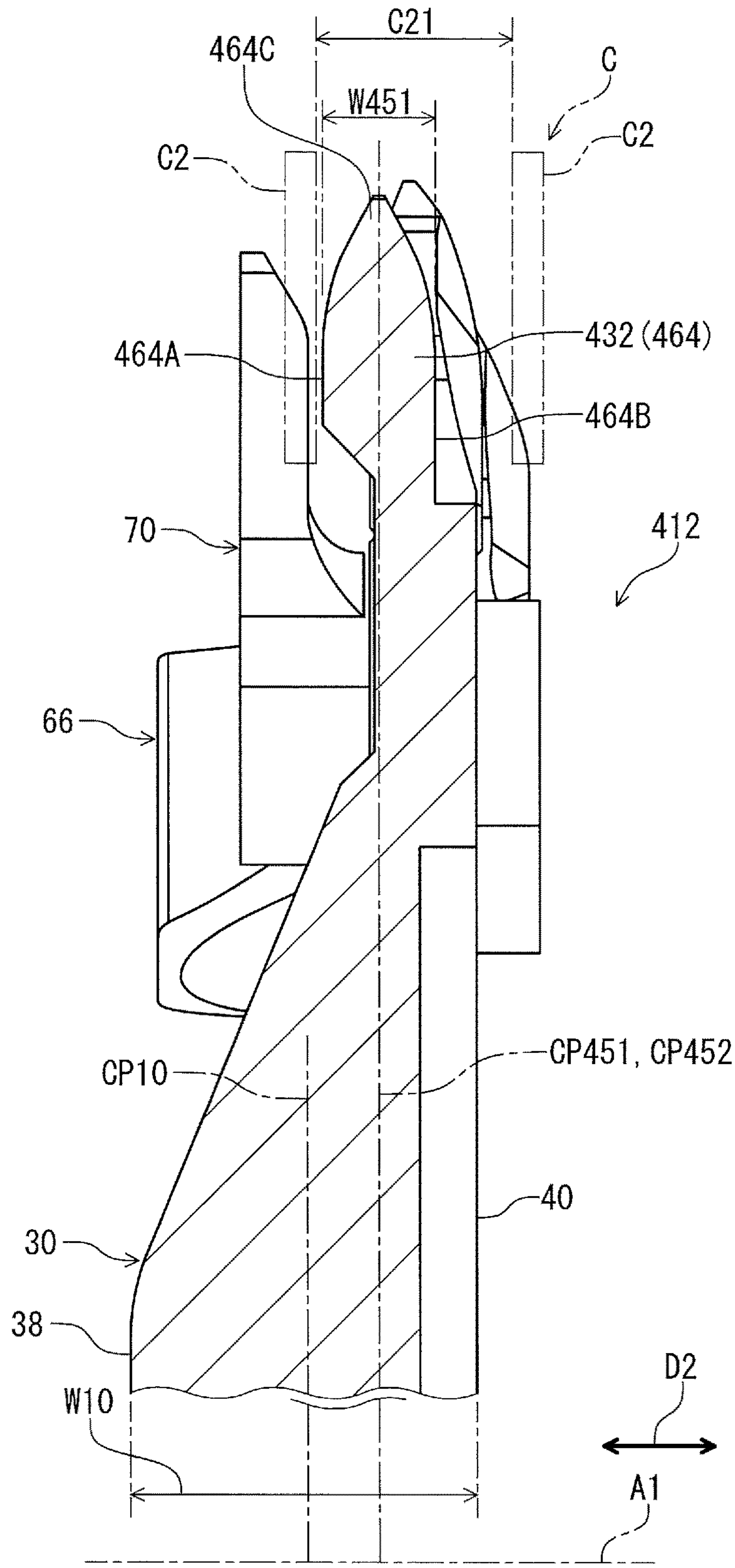
FIG. 60 is a cross-sectional view of the smaller sprocket taken along line LX-LX of FIG. 59.

As seen in FIG. 60, the at least one receiving tooth 464 has a chain engaging width W451 defined in the axial direction D2. In this embodiment, the receiving tooth 464 includes a chain-engagement surface 464A and a reverse surface 464B. The chain-engagement surface 464A faces in the axial direction D2 and is contactable with the bicycle chain C (e.g., the outer link plate C2). The reverse surface 464B faces in the axial direction D2 and is provided on a reverse side of the chain-engagement surface 464A in the axial direction D2. The chain engaging width W451 is defined between the chain-engagement surface 464A and the reverse surface 464B in the axial direction D2.

The receiving tooth 464 has a center plane CP451 defined to bisect the chain engaging width W451 in the axial direction D2. The center plane CP451 is perpendicular to the rotational center axis A1. The center plane CP451 is offset from the first reference center plane CP10 in the axial direction D2. However, the center plane CP451 can coincide with the first reference center plane CP10 in the axial direction D2.

The receiving tooth 464 includes a tooth-tip 464C having a tooth-tip center plane CP452. The tooth-tip center plane CP452 is perpendicular to the rotational center axis A1. The tooth-tip center plane CP452 is offset from the first reference center plane CP10 in the axial direction D2 and coincides with the center plane CP451 in the axial direction D2. However, the tooth-tip center plane CP452 can be offset from the center plane CP451 in the axial direction D2. The receiving tooth 464 has an asymmetrical shape with respect to the center plane CP451 in the axial direction D2. However, the receiving tooth 464 can have a symmetrical shape with respect to the center plane CP451 in the axial direction D2.

Figure 61:
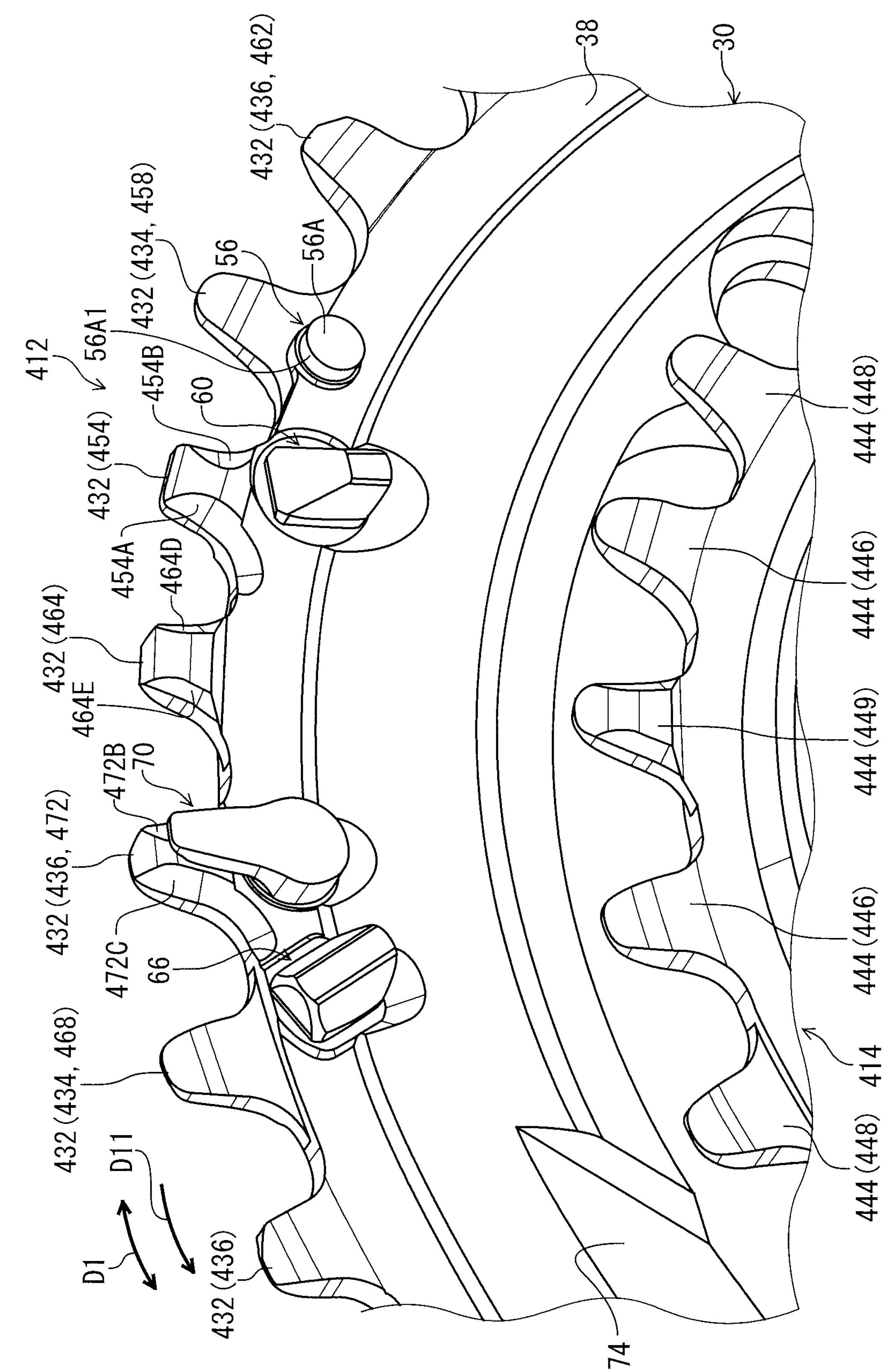
FIG. 61 is a partial perspective view of the bicycle sprocket and the smaller sprocket of the bicycle crank assembly illustrated in FIG. 51.
Figure 62:
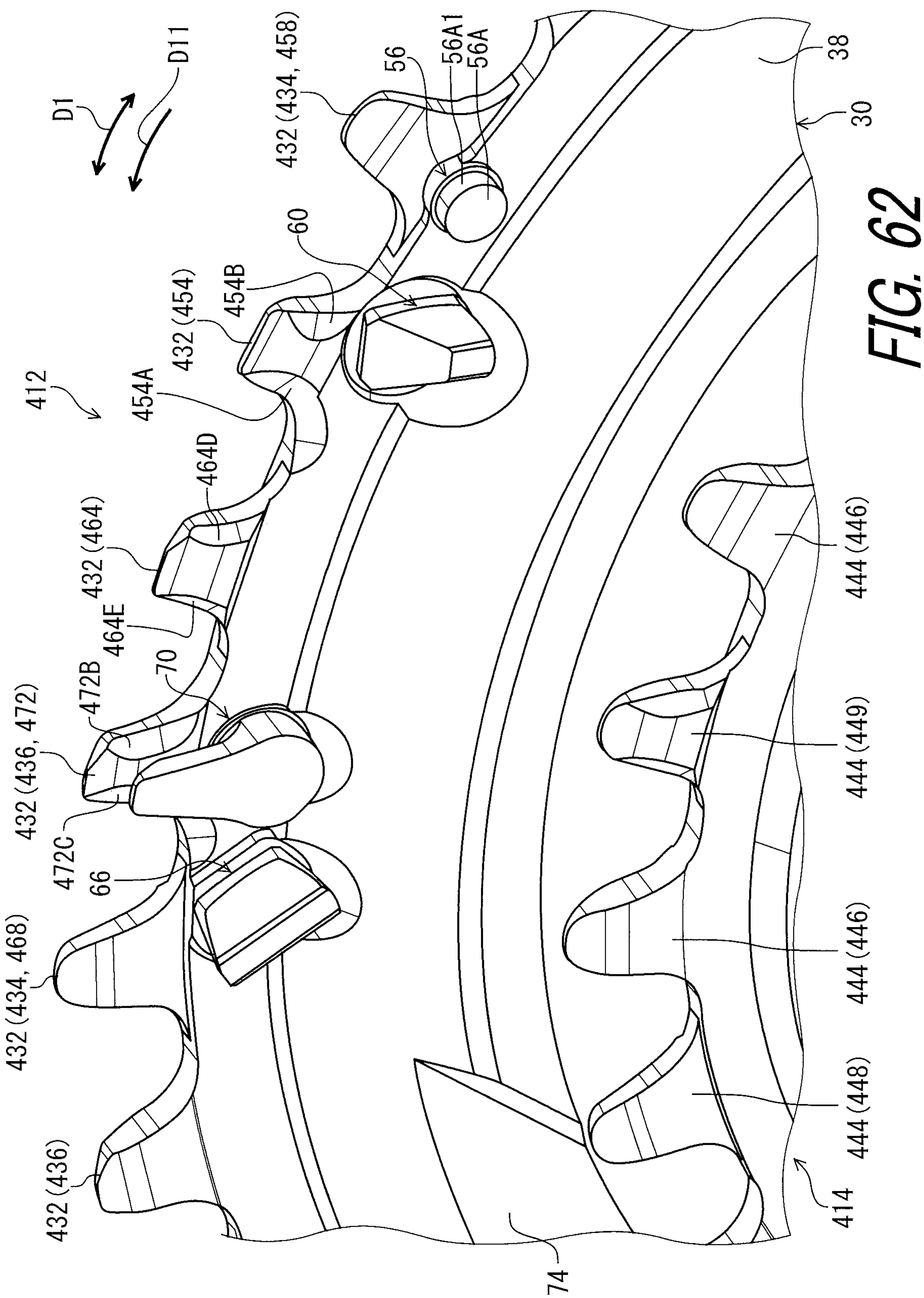
FIG. 62 is another partial perspective view of the bicycle sprocket and a smaller sprocket of the bicycle crank assembly illustrated in FIG. 51.

As seen in FIGS. 61 and 62, the first derailing tooth 454 includes a first derailing downstream chamfer 454A provided on the first axial surface 38. The first derailing downstream chamfer 454A is provided on a downstream side in the first derailing tooth 454 in the driving rotational direction D11. The first derailing downstream chamfer 454A reduces interference between the first derailing tooth 454 and the bicycle chain C (e.g., the inner link plate C1) when the first derailing tooth 454 first derails the bicycle chain C from the bicycle sprocket 412 in the first shifting operation.

The first derailing tooth 454 includes a first derailing upstream chamfer 454B provided on the first axial surface 38. The first derailing upstream chamfer 454B is provided on an upstream side in the first derailing tooth 454 in the driving rotational direction D11. The first derailing upstream chamfer 454B reduces interference between the first derailing tooth 454 and the bicycle chain C (e.g., the outer link plate C2) when the first derailing tooth 454 first derails the bicycle chain C from the bicycle sprocket 412 in the first shifting operation.

Figure 63:
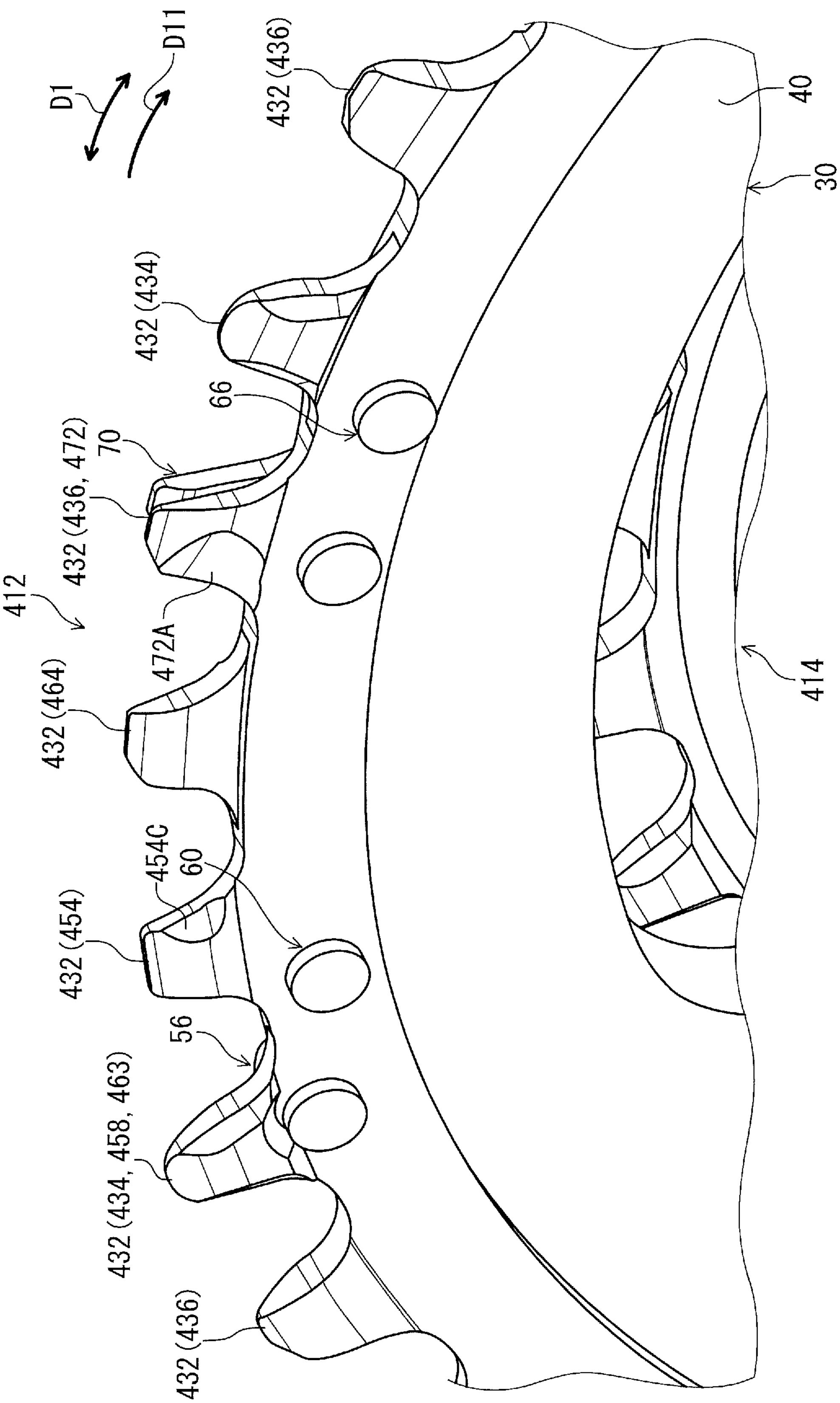
FIG. 63 is another partial perspective view of the bicycle sprocket and a smaller sprocket of the bicycle crank assembly illustrated in FIG. 51.

As seen in FIG. 63, the first derailing tooth 454 includes a first receiving downstream chamfer 454C provided on the first reverse axial surface 40. The first receiving downstream chamfer 454C is provided on a downstream side in the first derailing tooth 454 in the driving rotational direction D11. The first receiving downstream chamfer 454C reduces interference between the first derailing tooth 454 and the bicycle chain C (e.g., the inner link plate C1) when the receiving tooth 464 first receives the bicycle chain C in the second shifting operation. Namely, the first derailing tooth 454 facilitates receipt of the bicycle chain C at the receiving tooth 464 in the second shifting operation.

As seen in FIGS. 61 and 62, the receiving tooth 464 includes an additional downstream chamfer 464E provided on the first axial surface 38. The additional downstream chamfer 464E is provided on a downstream side in the receiving tooth 464 in the driving rotational direction D11.

The receiving tooth 464 includes an additional upstream chamfer 464D provided on the first axial surface 38. The additional upstream chamfer 464D is provided on an upstream side in the receiving tooth 464 in the driving rotational direction D11.

The at least one second shifting facilitation projection 66 is at least partly provided closer to the rotational center axis A1 than the at least one first tooth 434. One of the at least one first tooth 434 is at least partly provided closest to the at least one second shifting facilitation projection 66 among the at least one first tooth 434. In this embodiment, the at least one first tooth 434 includes a second adjacent tooth 468 closest to the second shifting facilitation projection 66 among the plurality of sprocket teeth 432. In this embodiment, the at least one first tooth 434 includes the second adjacent tooth 468. The first derailing tooth 454 is adjacent to the second adjacent tooth 468 without another tooth between the first derailing tooth 454 and the second adjacent tooth 468 in the driving rotational direction D11. However, the positional relationship among the first derailing tooth 454, the second shifting facilitation projection 66, and the second adjacent tooth 468 is not limited to this embodiment.

As seen in FIG. 59, the at least one third shifting facilitation projection 70 is at least partly provided closer to the rotational center axis A1 than the at least one second tooth 436. One of the at least one first tooth 434 is at least partly provided closest to the at least one third shifting facilitation projection 70 among the at least one first tooth 434. In this embodiment, the at least one second tooth 436 includes a third adjacent tooth 472 closest to the third shifting facilitation projection 70 among the plurality of sprocket teeth 432. In this embodiment, the at least one second tooth 436 includes the third adjacent tooth 472. The receiving tooth 464 is adjacent to the third adjacent tooth 472 without another tooth between the receiving tooth 464 and the third adjacent tooth 472 in the driving rotational direction D11. The third adjacent tooth 472 is provided between the receiving tooth 464 and the second adjacent tooth 468 in the circumferential direction D1. However, the positional relationship among the receiving tooth 464, the second shifting facilitation projection 66, and the third shifting facilitation projection 70, and the third adjacent tooth 472 is not limited to this embodiment.

As seen in FIG. 63, the third adjacent tooth 472 includes a third derailing upstream chamfer 472A provided on the first reverse axial surface 40. The third derailing upstream chamfer 472A is provided on an upstream side in the third adjacent tooth 472 in the driving rotational direction D11. The third derailing upstream chamfer 472A reduces interference between the third adjacent tooth 472 and the bicycle chain C (e.g., the inner link plate C1) when the first derailing tooth 454 first derails the bicycle chain C from the bicycle sprocket 412 in the first shifting operation.

As seen in FIGS. 61 and 62, the third adjacent tooth 472 includes a third receiving upstream chamfer 472B provided on the first axial surface 38. The third receiving upstream chamfer 472B is provided on a downstream side in the third adjacent tooth 472 in the driving rotational direction D11. The third receiving upstream chamfer 472B reduces interference between the third adjacent tooth 472 and the bicycle chain C (e.g., the inner link plate C1) when the receiving tooth 464 first receives the bicycle chain C in the second shifting operation.

The third adjacent tooth 472 includes an additional downstream chamfer 472C provided on the first axial surface 38. The additional downstream chamfer 472C is provided on a downstream side in the receiving tooth 464 in the driving rotational direction D11.

In this embodiment, as seen in FIG. 59, the shifting facilitation area FA1 is defined from an upstream tooth bottom 458T of the first adjacent tooth 458 to a downstream circumferential end 74A of the shifting facilitation recess 74 in the circumferential direction D1. The first shifting facilitation area FA1 is defined from the upstream tooth bottom 458T of the first adjacent tooth 458 to a downstream tooth bottom 472T of third adjacent tooth 472 in the circumferential direction D1. The second shifting facilitation area FA12 is defined from an upstream tooth bottom 454T of the first derailing tooth 454 to the downstream circumferential end 74A of the shifting facilitation recess 74 in the circumferential direction D1. However, the first shifting facilitation area FA11 and the second shifting facilitation area FA12 are not limited to this embodiment.

Figure 64:
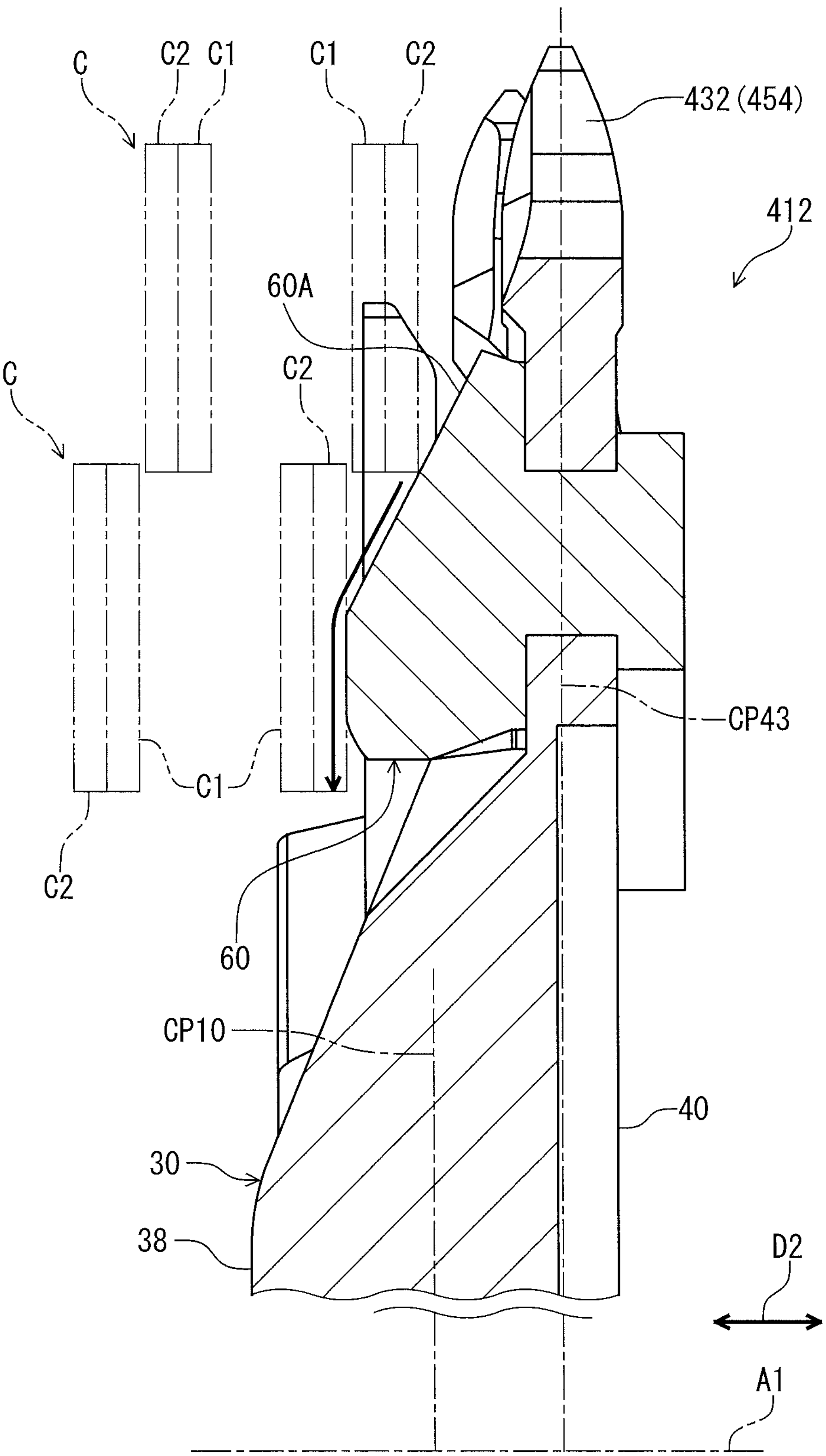
FIG. 64 is a cross-sectional view of the smaller sprocket taken along line LXIV-LXIV of FIG. 59.
Figure 65:
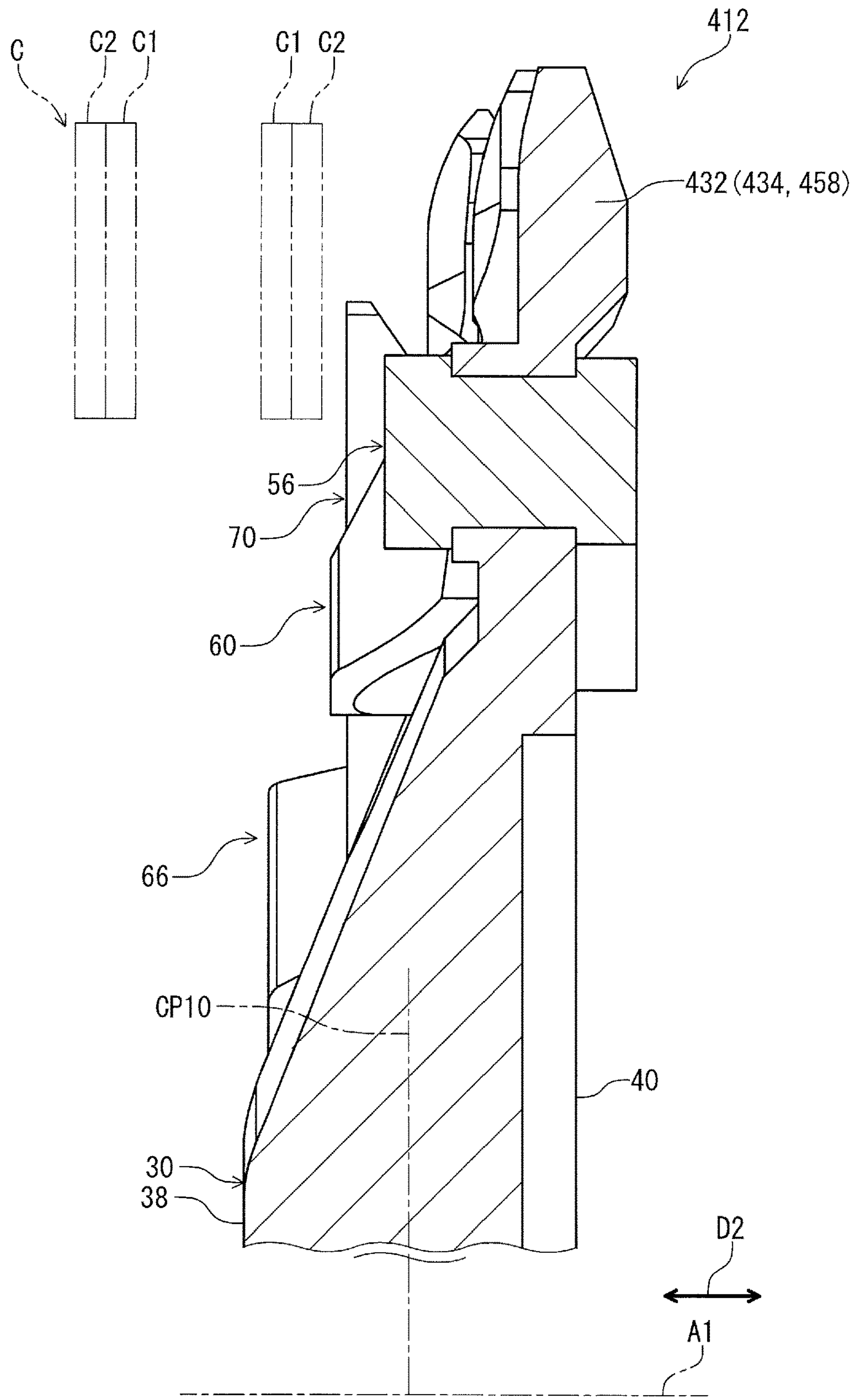
FIG. 65 is a cross-sectional view of the smaller sprocket taken along line LXV-LXV of FIG. 59.

Similarly to the second shifting operation of the first embodiment, as seen in FIG. 64, the outer link plate C2 of the bicycle chain C is moved by the contact surface 60A of the bump portion 60 away from the shifting facilitation projection 56 in the axial direction D2. As seen in FIG. 65, this prevents the bicycle chain C from contacting the shifting facilitation projection 56. Accordingly, the bicycle chain C can be certainly engaged with the second shifting facilitation projection 66 and the third shifting facilitation projection 70 in the second shifting operation without being lifted by the shifting facilitation projection 56.

Fifth Embodiment

A bicycle crank assembly 510 including a bicycle sprocket 512 in accordance with a fifth embodiment will be described below referring to FIGS. 66 to 68. The bicycle sprocket 512 has the same structure as that of the bicycle sprocket 412 except for the plurality of sprocket teeth 432 and a bump portion. Thus, elements having substantially the same function as those in the above embodiments will be numbered the same here, and will not be described again in detail here for the sake of brevity.

Figure 66:
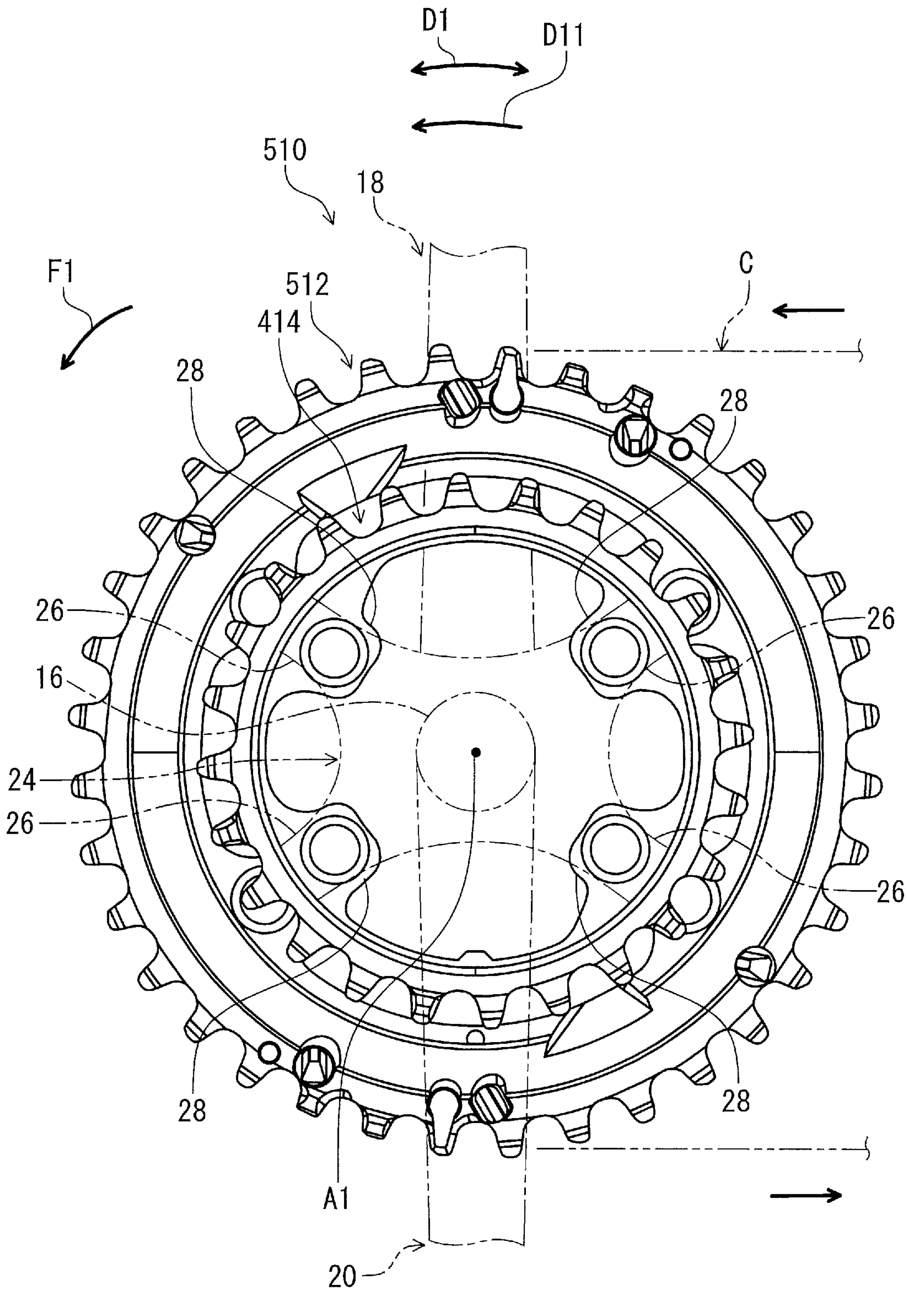
FIG. 66 is a side elevational view of a bicycle crank assembly including a bicycle sprocket in accordance with a fifth embodiment.
Figure 67:
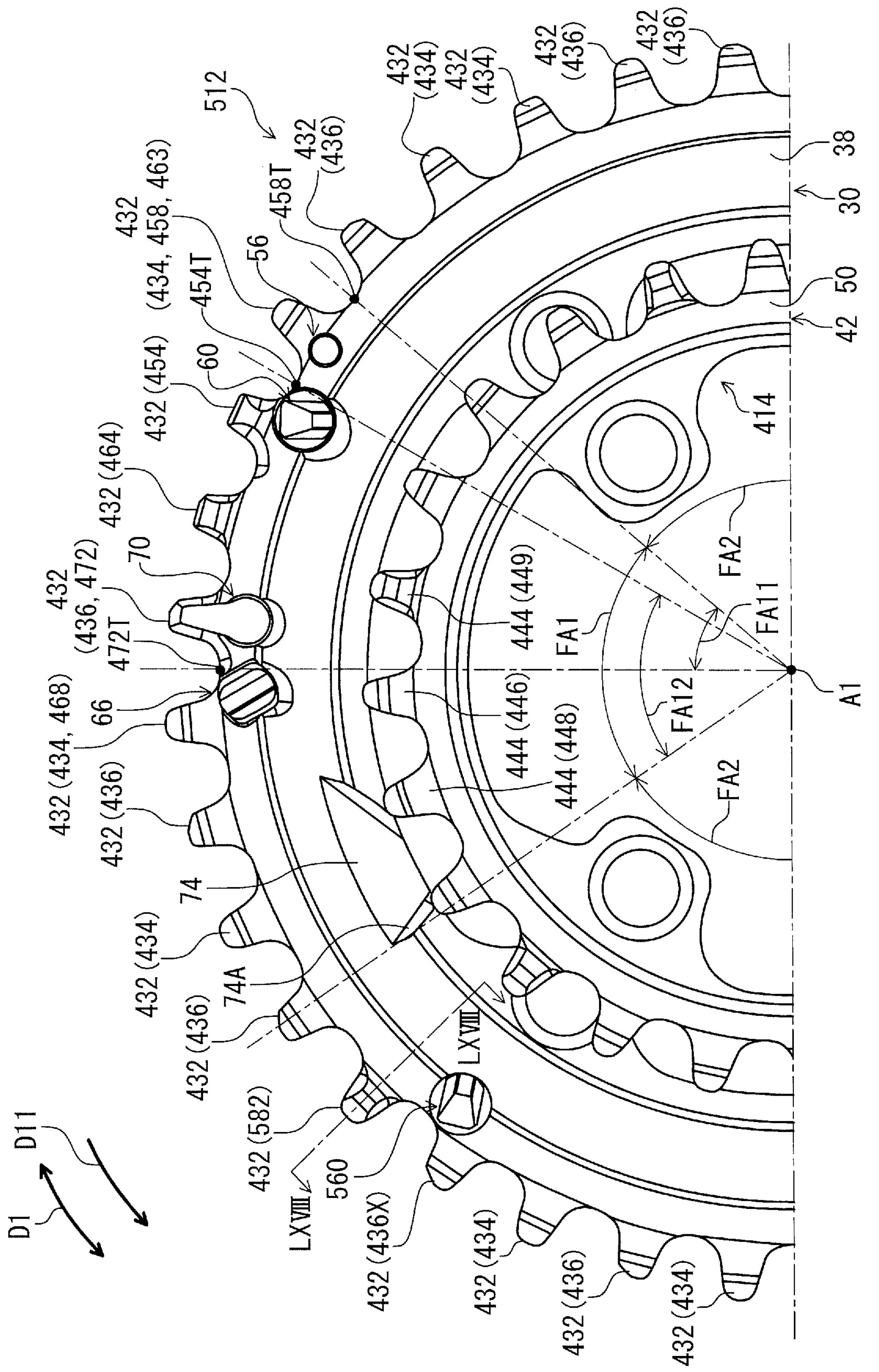
FIG. 67 is a side elevational view of the bicycle sprocket of the bicycle crank assembly illustrated in FIG. 66.

As seen in FIGS. 66 and 67, the bicycle sprocket 512 comprises the sprocket body 30, the plurality of sprocket teeth 432, the shifting facilitation projection 56, the bump portion 560, the second shifting facilitation projection 66, and the third shifting facilitation projection 70. In this embodiment, as seen in FIG. 67, the plurality of sprocket teeth 432 include an offset tooth 582.

Figure 68:
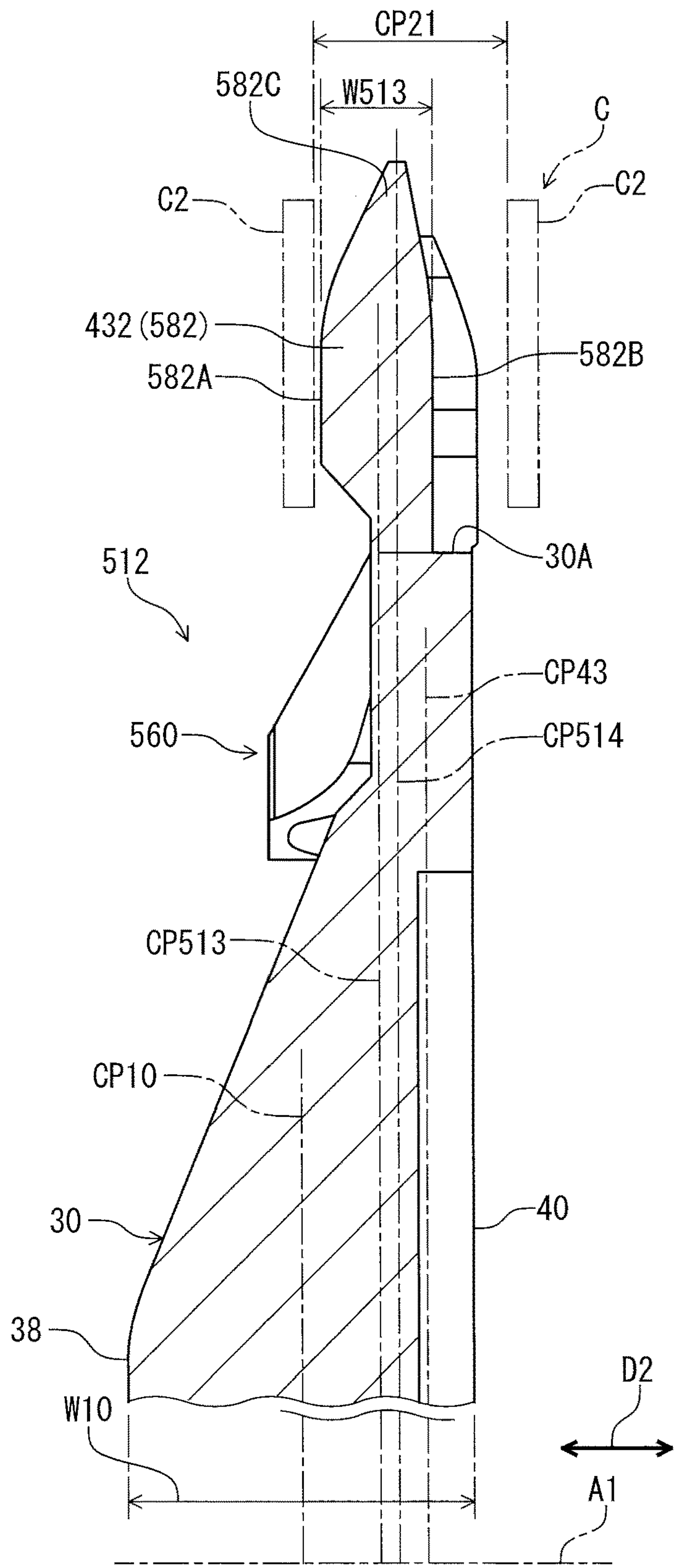
FIG. 68 is a cross-sectional view of the bicycle sprocket taken along line LVIII-LVIII of FIG. 67.

As seen in FIG. 68, the offset tooth 582 has a maximum axial width W513 defined in the axial direction D2. In this embodiment, the offset tooth 582 includes a sixth chain-engagement surface 582A and a sixth surface 582B. The sixth chain-engagement surface 582A faces in the axial direction D2 and is contactable with the bicycle chain C (e.g., the outer link plate C2). The sixth surface 582B faces in the axial direction D2 and is provided on a reverse side of the sixth chain-engagement surface 582A in the axial direction D2. The maximum axial width W513 is defined between the sixth chain-engagement surface 582A and the sixth surface 582B in the axial direction D2.

The offset tooth 582 has an offset tooth center plane CP513 defined to bisect a maximum axial width W513 of the offset tooth 582 in the axial direction D2. The offset tooth center plane CP513 is perpendicular to the rotational center axis A1. The offset tooth center plane CP513 is offset from the reference tooth center plane CP43 of the reference tooth 462 toward the smaller sprocket 414 in the axial direction D2. However, the offset tooth center plane CP513 can coincide with the first reference center plane CP10 in the axial direction D2.

The offset tooth 582 includes a sixth tooth-tip 582C having a offset tooth-tip center plane CP514. The offset tooth-tip center plane CP514 is perpendicular to the rotational center axis A1. The offset tooth-tip center plane CP514 is offset from the first reference center plane CP10 and the offset tooth center plane CP513 away from the smaller sprocket 414 in the axial direction D2. The offset tooth-tip center plane CP514 is provided between the first reference center plane CP10 and the offset tooth center plane CP513 in the axial direction D2. However, the offset tooth-tip center plane CP514 can coincide with at least one of the first reference center plane CP10 and the offset tooth center plane CP513 in the axial direction D2. The offset tooth 582 has an asymmetrical shape with respect to the offset tooth center plane CP513 in the axial direction D2. However, the offset tooth 582 can have a symmetrical shape with respect to the offset tooth center plane CP513 in the axial direction D2.

In this embodiment, as seen in FIG. 67, the bicycle sprocket 512 comprises at least one bump portion 560 provided in the at least one driving facilitation area FA2. The at least one bump portion 560 includes a pair of bump portions 560. However, a total number of the bump portions 560 is not limited to this embodiment. The bump portion 560 has substantially the same structure as that of the bump portion 60 of the first embodiment.

The at least one bump portion 560 is provided on a downstream side of the offset tooth 582 in the driving rotational direction D11 in which the bicycle sprocket 512 is rotated during pedaling. The second tooth 436X is closest to the bump portion 560 in the plurality of sprocket teeth 432. The second tooth 436X is provided on a downstream side of the offset tooth 582 in the driving rotational direction D11 without another tooth between the second tooth 436X and the offset tooth 582 in the circumferential direction D1.

The bump portion 560 is provided on the downstream side of the first tooth 34X in the driving rotational direction D11 to reduce interference between the first tooth 34X and the bicycle chain C in the second shifting operation. The bump portion 560 moves the bicycle chain C away from the offset tooth 582 in the second shifting operation. The function of the bump portion 560 is substantially the same as that of the bump portion 60. Thus, it will not be described in detail here for the sake of brevity.

It will be apparent to those skilled in the bicycle field from the present disclosure that the above embodiments can be at least partly combined with each other if needed and/or desired. For example, the bicycle sprockets 12, 212, 312, 412, and 512 can be combined with each of the smaller sprockets 14 and 414.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
a sprocket body;
a plurality of sprocket teeth provided on an outer periphery of the sprocket body;
at least one shifting facilitation area to facilitate at least one of
  a first shifting operation in which a bicycle chain is shifted from the bicycle sprocket toward a smaller sprocket adjacent to the bicycle sprocket in an axial direction parallel to a rotational center axis of the bicycle sprocket without another sprocket between the bicycle sprocket and the smaller sprocket, and
  a second shifting operation in which the bicycle chain is shifted from the smaller sprocket toward the bicycle sprocket;
at least one driving facilitation area; and
at least one bump portion having a contact surface configured to at least laterally move the bicycle chain toward the smaller sprocket in the second shifting operation to prevent interference with at least one tooth of the sprocket during the second shifting operation, the at least one bump portion being provided in the at least one driving facilitation area and provided outside the at least one shifting facilitation area.

2. The bicycle sprocket according to claim 1, wherein
the plurality of sprocket teeth includes
  at least one first tooth having a first chain engaging width defined in the axial direction, and
  at least one second tooth having a second chain engaging width defined in the axial direction, the second chain engaging width being smaller than the first chain engaging width, and
the at least one bump portion is provided on a downstream side of one of the at least one first tooth in a driving rotational direction in which the bicycle sprocket is rotated during pedaling.

3. The bicycle sprocket according to claim 2, wherein
the first chain engaging width is larger than an inner link space defined between an opposed pair of inner link plates of the bicycle chain and is smaller than an outer link space defined between an opposed pair of outer link plates of the bicycle chain, and
the second chain engaging width is smaller than the inner link space.

4. The bicycle sprocket according to claim 1, wherein
the plurality of sprocket teeth includes
  a reference tooth having a reference tooth center plane defined to bisect a maximum axial width of the reference tooth in the axial direction, and
  an offset tooth having an offset tooth center plane defined to bisect a maximum axial width of the offset tooth in the axial direction, the offset tooth center plane being offset from the reference tooth center plane of the reference tooth toward the smaller sprocket in the axial direction, and
the at least one bump portion is provided on a downstream side of the offset tooth in a driving rotational direction in which the bicycle sprocket is rotated during pedaling.

* * * * *